US012764534B2

(12) United States Patent
Ozanian

(10) Patent No.: US 12,764,534 B2
(45) Date of Patent: Oct. 13, 2026

(54) SYSTEMS AND METHODS FOR MOBILE PEER-TO-PEER CONTENT SHARING

(71) Applicant: Generation Finance Technology, Inc., Short Hills, NJ (US)

(72) Inventor: Rhonda G. Ozanian, Short Hills, NJ (US)

(73) Assignee: Generation Finance Technology, Inc., Short Hills, NJ (US)

( * ) Notice: Subject to any disclaimer, the term of this patent is extended or adjusted under 35 U.S.C. 154(b) by 0 days.

(21) Appl. No.: 19/548,794

(22) Filed: Feb. 24, 2026

(65) Prior Publication Data

US 2026/0205814 A1 Jul. 16, 2026

Related U.S. Application Data

(63) Continuation-in-part of application No. 19/370,033, filed on Oct. 27, 2025, which is a continuation of
(Continued)

(51) Int. Cl.
*H04L 29/06* (2006.01)
*G06N 3/04* (2023.01)
(Continued)

(52) U.S. Cl.
CPC .............. *H04W 12/08* (2013.01); *G06N 3/04* (2013.01); *G06N 3/08* (2013.01); *H04L 9/3213* (2013.01);
(Continued)

(58) Field of Classification Search
CPC ........... H04W 12/08; G06N 3/04; G06N 3/08; H04L 9/3213; H04L 63/0428;
(Continued)

(56) References Cited

U.S. PATENT DOCUMENTS 7,127,613 B2 10/2006 Pabla
7,788,686 B1 8/2010 Andrews
(Continued)

FOREIGN PATENT DOCUMENTS

WO WO 2012048347 A1 4/2012
WO WO 2012122175 A1 9/2012
(Continued)

OTHER PUBLICATIONS

Oh, Byeong-Thaek, Sang-Bong Lee, and Ho-Jin Park. "A peer mutual authentication method on super peer based peer-to-peer network." 2008 IEEE International Symposium on Consumer Electronics. IEEE, 2008. (Year: 2008).
(Continued)

*Primary Examiner* — Shawnchoy Rahman
(74) *Attorney, Agent, or Firm* — Knobbe, Martens, Olson & Bear LLP

(57) ABSTRACT

Systems and methods are disclosed for providing secure digital communications using a relationship based trust framework. A relationship object associated with a relationship identifier and relationship scoped validation material governs communication acceptance or rejection based on a structured relationship state model. Communications referencing the relationship identifier are evaluated deterministically and accepted or rejected prior to delivery. Continuity and trust events are recorded in a relationship scoped ledger. The framework optionally avoids reliance on identity authentication, shared secrets, or probabilistic risk scoring and enables delegation, suspension, and revocation without affecting unrelated relationships. Optionally, delegated authority binding enables workflow integration without converting the relationship into an identity account.

24 Claims, 44 Drawing Sheets

Related U.S. Application Data application No. 18/660,114, filed on May 9, 2024, now Pat. No. 12,483,891, which is a continuation of application No. 18/341,605, filed on Jun. 26, 2023, now Pat. No. 12,022,291, which is a continuation of application No. 17/446,421, filed on Aug. 30, 2021, now Pat. No. 11,716,625, which is a continuation of application No. 17/176,792, filed on Feb. 16, 2021, now Pat. No. 11,115,821, which is a continuation of application No. 17/063,546, filed on Oct. 5, 2020, now Pat. No. 10,932,134, which is a continuation of application No. 16/830,818, filed on Mar. 26, 2020, now Pat. No. 10,805,803.

(60) Provisional application No. 62/828,657, filed on Apr. 3, 2019.

(51) Int. Cl.

| | |
|---|---|
| ***G06N 3/08*** | (2023.01) |
| ***H04L 9/32*** | (2006.01) |
| ***H04L 9/40*** | (2022.01) |
| ***H04L 67/1074*** | (2022.01) |
| ***H04L 67/1087*** | (2022.01) |
| ***H04W 12/08*** | (2021.01) |

(52) U.S. Cl.
CPC ...... *H04L 63/0428* (2013.01); *H04L 63/0884* (2013.01); *H04L 63/102* (2013.01); *H04L 67/1078* (2013.01); *H04L 67/1091* (2013.01)

(58) Field of Classification Search
CPC ............... H04L 63/0884; H04L 63/102; H04L 67/1078; H04L 67/1091
See application file for complete search history.

(56) References Cited

U.S. PATENT DOCUMENTS

| | | | | |
|---|---|---|---|---|
| 9,071,967 | B1 | 6/2015 | Davies | |
| 9,197,700 | B2 | 11/2015 | Brouwer | |
| 9,887,973 | B2 | 2/2018 | Burba et al. | |
| 10,341,326 | B2 | 7/2019 | Rivers | |
| 10,462,832 | B2 | 10/2019 | Chiang | |
| 10,652,248 | B2 | 5/2020 | Maycotte | |
| 10,924,274 | B1 | 2/2021 | Piriyath | |
| 2002/0073204 | A1 | 6/2002 | Dutta | |
| 2003/0028610 | A1 | 2/2003 | Pearson | |
| 2003/0046586 | A1 | 3/2003 | Bheemarasetti | |
| 2003/0135859 | A1 | 7/2003 | Putterman | |
| 2004/0034776 | A1 | 2/2004 | Fernando | |
| 2006/0090202 | A1 | 4/2006 | Liu | |
| 2008/0155614 | A1 | 6/2008 | Cooper | |
| 2013/0110971 | A1 | 5/2013 | Williams | |
| 2014/0220937 | A1* | 8/2014 | Kang | H04W 12/06 455/411 |
| 2016/0248785 | A1 | 8/2016 | Petry | |
| 2016/0359821 | A1 | 12/2016 | Burba | |
| 2017/0150349 | A1 | 5/2017 | Huh | |
| 2017/0171180 | A1 | 6/2017 | Britt | |
| 2018/0034824 | A1 | 2/2018 | Maycotte | |
| 2018/0174122 | A1 | 6/2018 | Mattingly | |
| 2020/0022129 | A1 | 1/2020 | Dunne et al. | |
| 2020/0042674 | A1 | 2/2020 | Marshall | |
| 2020/0042725 | A1 | 2/2020 | Bolkhovitin et al. | |
| 2020/0043047 | A1 | 2/2020 | Walton et al. | |
| 2020/0053619 | A1 | 2/2020 | Sartori et al. | |
| 2020/0076916 | A1 | 3/2020 | Hudson et al. | |
| 2020/0092365 | A1 | 3/2020 | Periyalwar et al. | |
| 2021/0217001 | A1* | 7/2021 | Harrison | H04L 9/50 |

FOREIGN PATENT DOCUMENTS

| | | | | |
|---|---|---|---|---|
| WO | WO-2013104027 A1 * | 7/2013 | | H04L 63/12 |
| WO | WO-2019160479 A1 * | 8/2019 | | H04L 63/0861 |

OTHER PUBLICATIONS

S. Wang, Y. Zhang and Y. Zhang, "A Blockchain-Based Framework for Data Sharing With Fine-Grained Access Control in u Decentralized Storage Systems," in IEEE Access, vol. 6, pp. 38437-38450, 2018, doi: 10.1109/ACCESS.2018.2851611. (Year: 2018).

Zhang, Aiqing, et al. "SeDS: Secure data sharing strategy for D2D communication in L TE-Advanced networks." IEEE Transactions on Vehicular Technology 65.4 (2015): 2659-2672. (Year: 2015).

* cited by examiner

Check Registration/Use Third-Party Credentials

Authenticate Access to Third-Party Service/ Account

Organize Electronic Records -
Authenticate with Third Party Service/Account

Organize Electronic Records - Get Records from Third Party Service/ Account

Create Exchange Protocol to Exchange Electronic Records

Remove User Access to Records Being Exchanged

Reactivate a User Account

| | Data belongs to user, Not exchanged/ shared | Data belongs to user, exchanged/ shared | Data does not belong to User | Effects on database | Effects on views and access |
|---|---|---|---|---|---|
| Dismiss data from activity feed | yes | yes | yes | Retained | Intact |
| Delete data from collection | yes | Warning | Yes | Delete from database | Mask PII |
| Delete collection | yes | Warning | Yes | Delete from database | Data retained |
| Delete views | No | No Mask PII | No Mask PII | No Mask PII | Mask PII |
| Delete third party source | Yes | Yes | No | Data retained | Data retained |
| Delete other user | N/A | Yes | Yes | Delete from database | Mask PII |
| Delete account | yes | Warning | yes | Delete from database | Mask PII |

FIG. 17

Engagement Flow

Revocation Flow

Delegated Relationship Authority

SYSTEMS AND METHODS FOR MOBILE PEER-TO-PEER CONTENT SHARING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 1 CFR 1.57.

BACKGROUND

The present invention is generally related to peer-to-peer content sharing over networks, including sharing content via wireless mobile devices over a wireless network.

DESCRIPTION OF THE RELATED ART

With the increasing capabilities of mobile devices, mobile devices are frequently the main portal for creating and accessing content. However, conventional approaches fail to provide adequate mechanisms for secure and selective peer-to-peer sharing of content among mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the disclosure relates to systems and methods that enable data sharing across networks, including secure peer-to-peer sharing of content over wireless networks using mobile devices. A database may store content associated with a first mobile device user. A request from a requester mobile device for content associated with the user of the first mobile device may be received at a cloud-based system. The encrypted request may be transmitted by the cloud-based system to the first mobile device which may decrypt the request. An authorization token may be transmitted by the first mobile device to the cloud-based system which may then enable the requesting mobile device to access the requested content, which may be accessed from the first mobile device and/or a cloud storage system.

An aspect of the present disclosure relates to a peer-to-peer communication management system comprising: a computing device; a network interface; a non-transitory data media configured to store instructions that when executed by the computing device, cause the computing device to perform operations comprising: receiving using the network interface via at least one encrypted channel a first data sharing request from a first peer device, the first data sharing request specifying at least a first destination identifier and a first requested data type; transmitting using the network interface the first sharing request via at least one encrypted channel to a second peer device associated with the first destination identifier; receiving using the network interface via at least one encrypted channel, from an application hosted on the second peer device, an approval of the first data sharing request from a first peer device and a data sharing protocol, the data sharing protocol specifying at least a third party data source, a selection of one or more data types, and a data sharing start date and a data sharing end; transmitting using the network interface a message to the first peer device comprising an indication of the acceptance of the first sharing request and the data sharing protocol; determining that an acceptance of the data sharing protocol is received from the first peer device; and at least partly in respond to determining that an acceptance of the data sharing protocol is received from the first peer device, enabling the first peer device to access the selected one or more data types from the third party data source in accordance with the data sharing protocol.

An aspect of the present disclosure relates to a computer-implemented method, the method comprising: receiving over a network via at least one encrypted channel a first data sharing request from a first peer device, the first data sharing request specifying at least a first requested data type; transmitting the first sharing request via at least one encrypted channel to a second peer device; receiving, via at least one encrypted channel, from the second peer device, an approval of the first data sharing request from a first peer device and a data sharing protocol, the data sharing protocol specifying at least a third party data source, a selection of one or more data types, and a data sharing start date and a data sharing end; transmitting a message to the first peer device comprising an indication of the acceptance of the first sharing request and the data sharing protocol; and enabling the first peer device to access the selected one or more data types from the third party data source in accordance with the data sharing protocol.

An aspect of the present disclosure relates to a peer-to-peer communication management system comprising: a computing device; a network interface; a non-transitory data media configured to store instructions that when executed by the computing device, cause the computing device to perform operations comprising: receiving using the network interface via at least one encrypted channel a first data sharing invitation from a first peer device, the first data sharing invitation specifying at least a first data sharing protocol specifying a first data type to be shared and a sharing time period specification; transmitting using the network interface the first sharing invitation including the first data sharing protocol via at least one encrypted channel to a second peer device; receiving, via at least one encrypted channel, from the second peer device, an acceptance of the first data sharing invitation, including the first data sharing protocol received from the first peer device; transmitting a message to the first peer device comprising an indication of the acceptance of the first sharing invitation; and enabling the second peer device to access the first data type from the third party data source in accordance with the first data sharing protocol.

An aspect of the present disclosure relates to a system for governing digital communications, comprising: a processing device comprising registers and arithmetic logic units; non-transitory computer readable storage medium storing computer-executable instructions that, in response to execution by the processing, cause the processing device to perform operations, comprising: establish a relationship object representing a trust relationship between communicating parties; generate relationship-scoped validation material associated with the relationship object; maintain a trust ledger configured to store event-driven, non-identity metadata associated with the relationship; maintain a relationship state model defining a plurality of relationship states and permitted communication behavior associated with respective states; and instantiate a communication validation component configured to: receive, prior to delivery or presentation, a communication associated with the relationship object; evaluate the communication using the relationship-scoped validation material and expected continuity data derived from the trust ledger; and deterministically accept, reject, or restrict the communication based at least in part on the relationship state and continuity evaluation, wherein communication handling is performed at run-time independently of identity authentication, shared secrets, or probabilistic threat scoring.

Optionally, the relationship object comprises a unique relationship identifier that does not encode, expose, or require personally identifying information for communication evaluation. Optionally, the trust ledger stores non identity metadata including one or more of: relationship initialization events, validated communication events, continuity updates, relationship state transitions, delegation actions, suspension events, or revocation events. Optionally, the continuity indicators comprise one or more of: rotating or tumbling values, incremented or derived sequence values, ledger referenced positional indicators, time based or epoch based freshness markers, or hash or checksum based derived indicators. Optionally, the continuity indicators comprise a tumbling value generated according to a deterministic progression algorithm, and wherein the communication validation component is further configured to: derive an expected tumbling value from the relationship-scoped validation material and continuity metadata stored in the trust ledger; compare the expected tumbling value to a tumbling value included within or derived from the received communication; and update the trust ledger to store a next expected tumbling value upon successful validation, wherein deviations from the expected tumbling value cause the communication to be rejected or restricted prior to delivery or presentation, thereby preventing replay, reordering, or stale message injection.

Optionally, the communication validation component compares continuity indicators contained in or derived for the communication to expected values obtained from the trust ledger and accepts the communication when the indicators conform and rejects or restricts the communication when the indicators deviate Optionally, the relationship state model comprises at least an unestablished state, an initialized state, an engaged state, an active state, a delegated state, a suspended state, and a revoked state. Optionally, the operations further comprises deriving secondary validation material to authorize delegated communication authority for additional devices, agents, and/or third parties without transferring ownership of the relationship, the delegated communication authority being suspendable or revocable. Optionally, the operations further comprise transitioning the relationship into a suspended state in response to a continuity violation, invalid validation material, policy defined threshold, and/or explicit suspension instructions, and restricting communications referencing the suspended relationship until resumption criteria are satisfied. Optionally, revocation permanently invalidates relationship scoped validation material, terminates continuity mechanisms for the relationship, and causes subsequent communications referencing the relationship to be rejected without further evaluation. Optionally, the operations further comprise validating, at a point of origin, communications selected for delivery through a relationship bound communication option and to deterministically reject communications that fail relationship based evaluation prior to presentation.

An aspect of the present disclosure relates to a method for governing communications in a relationship based trust framework, comprising: establishing a relationship object associated with a communicating party; assigning relationship scoped validation material; maintaining a trust ledger that records relationship events; maintaining a relationship state corresponding to the relationship object; receiving a communication associated with the relationship object; validating the communication using the relationship validation material and continuity indicators derived from the trust ledger; and deterministically accepting, rejecting, or restricting the communication based on the relationship state and continuity evaluation, wherein the validating and accepting or rejecting are performed independently of global identity, or account credentials.

Optionally, assigning the relationship validation material comprises generating a rotating or tumbling continuity value configured to provide replay resistance and sequencing integrity. Optionally, the continuity indicators comprise a tumbling value generated according to a deterministic progression algorithm, and wherein the communication validation component is further configured to: derive an expected tumbling value from relationship validation material and continuity metadata stored in the trust ledger; compare the expected tumbling value to a tumbling value included within or derived from the received communication; and update the trust ledger to store a next expected tumbling value upon successful validation, wherein the tumbling value is configured to prevent replay, reordering, or stale message injection by ensuring that deviations from the expected value cause the communication to be rejected or restricted. Optionally, validating the communication further comprises comparing a continuity indicator contained within the communication to an expected continuity value derived from the trust ledger. Optionally, the continuity indicator comprises a sequence counter that incrementally advances following a given validated communication. Optionally, maintaining the trust ledger comprises recording initialization events, validated communication events, continuity updates, relationship state transitions, suspension events, and/or revocation events. Optionally, the relationship state comprises an unestablished state, an initialized state, an engaged state, an active state, a delegated state, a suspended state, or a revoked state, and deterministically accepting or rejecting the communication includes applying behavior rules associated with a current state.

Optionally, the method further comprises transitioning the relationship to a suspended state in response to detecting a continuity violation or invalid validation material. Optionally, the method further comprises resuming communication under the relationship in response to receiving remediation or re verification input following a suspension event. Optionally, deterministically rejecting the communication comprises rejecting the communication prior to delivery to a receiving device. Optionally, validating the communication is performed independently of identity authentication, shared secrets, email addresses, phone numbers, or device identifiers. Optionally, the method further comprises deriving secondary validation material to authorize delegated communication authority for one or more delegate devices or agents. Optionally, receiving the communication comprises receiving a communication originating from a messaging system, notification system, automated system, or real time voice system for pre delivery verification.

BRIEF DESCRIPTION OF THE DRAWINGS

Embodiments will now be described with reference to the drawings summarized below. Throughout the drawings, reference numbers may be re-used to indicate correspondence between referenced elements. The drawings are provided to illustrate example embodiments described herein and are not intended to limit the scope of the disclosure.

FIG. 17 illustrates an example rules matrix

DESCRIPTION

Figure 1:
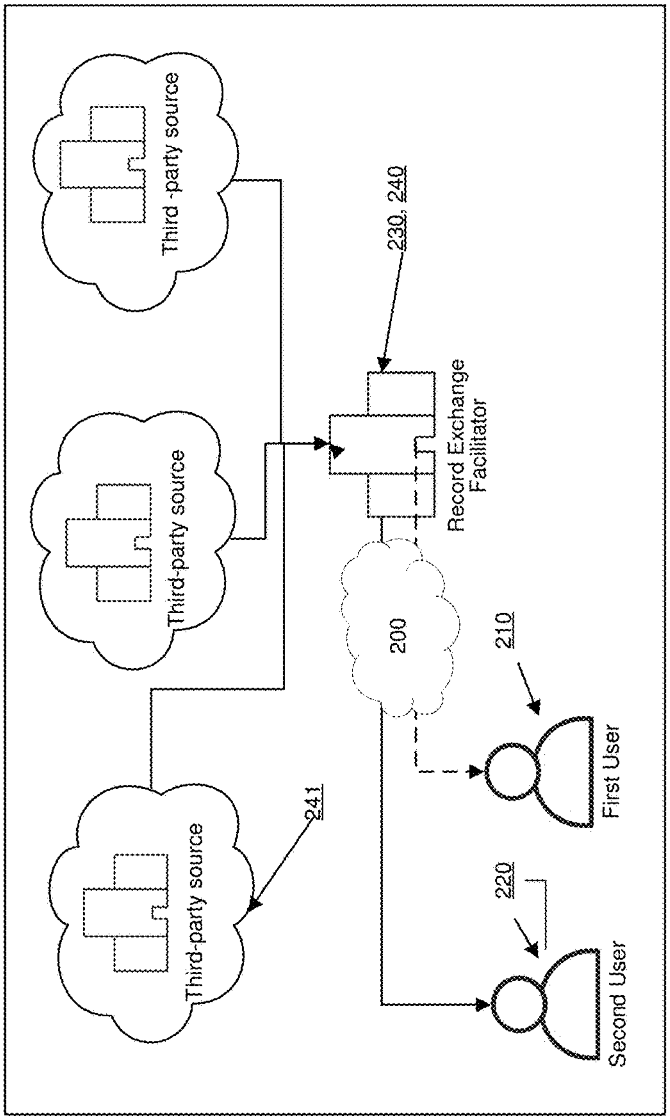
FIG. 1 illustrates an example data exchange process.

Systems and methods are described that enable secure sharing of content and other data over networks, optionally including peer-to-peer sharing of content.

A wireless network or wired network that enables peer-to-peer (P2P) data exchanges and sharing are disclosed. The phrase peer, as used herein, refers to a device connected to a network that shares data or that receives shared data, or users of such devices. For example, the wireless network may include cellular networks (e.g., 3G, 4G, or 5G cellular networks) and/or WLAN wireless local area networks (e.g., WiFi). By way of illustration a WiFi network may operate in infrastructure mode (where end user devices communicate through an access point that serves as a bridge to other networks (e.g., the Internet or other LAN). The WiFi network may instead or in addition operate in ad hoc or WiFi direct mode (where devices transmit directly peer-to-peer).

Conventional approaches in the third-party exchange of electronic data fail to adequately address the growing need for consumers to exchange their data electronically in peer-to-peer networks.

By contrast, systems and methods described herein that enable users (e.g., consumers) to securely, electronically, exchange third-party data (e.g., user account data generated and maintained by a third party system) may create significant benefits. For example, such secure exchange of third-party data, may, by way of example, improve visibility and/or portability of personal user data. Further, the disclosed systems and methods may enhance trust in peer-to-peer-networks. Still further, the disclosed systems and methods may enable efficient planning of activities (e.g., keeping track of dates and/or other related data needed for coordinating with peers).

In addition, the disclosed systems and methods may improve control over electronically stored data (e.g., personal data) using a database that structures and stores data in more granular forms, so that the data may be more easily and selectively exchanged between networked systems. By way of example, rather than requiring that large amounts of related data to be exchanged when only a portion is needed or is safe to share, systems and methods described herein enables a vastly reduced subset of the related data to be exchanged (e.g., a single data element or transaction rather than an entire account statement), thereby reducing the amount of processing power and network bandwidth utilized to share or exchange data, and the amount of memory needed by a system receiving the data to store the data. In addition, because less data is being transferred, the actual desired data may be transmitted more quickly from the data source to the recipient system. Still further, by filtering the data presented to a user requesting such data, display real estate is more efficiently used and navigation or scrolling through user interfaces may be greatly reduced Still further, the disclosed systems and methods may enable data to be acquired and assembled across peer systems to create network views, facilitating the fast and/or easy transfer of information on demand, in a manner which is currently very difficult to achieve using conventional systems.

In addition, the disclosed techniques for sharing data may enhance security and reduce improper access of third-party systems by, among other reasons, reducing the practice of password sharing.

Yet further, the disclosed systems and methods may enable data to be disseminated more efficiently and quickly over a network, facilitating information flow to new users (e.g., disseminating information regarding services that a third-party may provide to new users).

As noted above, conventional techniques for sharing data suffer from many technical deficiencies. Conventional techniques for the exchange of third-party data associated with a consumer typically require that the exchange be initiated by a third-party via a third party computer system, where, for example, consumer data may be stored in one or more data repositories.

By way of illustration, conventionally a third-party system may exchange consumer data electronically with other third-party systems to support third-party objectives (e.g., target advertising or exchange data in a secondary analytics market), rather than the consumer's objectives. A third-party system may conventionally facilitate the electronic sharing of consumer data between consumers where the consumers are closely related (e.g., family members) via a joint account or family sharing plan, in which consumers that share data may be third-party account-holders. A third-party system may exchange consumer data directly with a consumer through records (e.g., account activity statements or transactions records). However, the delivery, form and/or structure of the data may limit its utility in a conventional data sharing/exchange network. For example, too many steps, too much processing resources, too much memory, and/or too much network bandwidth may be required to exchange such data. In addition, too much or too little data may be exchanged, and/or the exchanged data may not be structured to be assembled or aggregated in an efficient manner for use by a receiving system. Still further, often data may only be shared by third party systems hosting an account of a consumer with recipients identified by the consumer if the recipient is listed on the consumer's account.

If a third-party system exchanges consumer data directly with the consumer, the third party system may be exposing itself to having or other security risks. In addition, the third-party system operator may not comprehend the risk and/or inconvenience that users, whose data is being shared, when electronic data may be delivered in a form and/or structure that may not be easily or safely exchanged.

For example, a third-party system may collect data from a user (e.g., a consumer) that has an account with the third-party (e.g., for a service being provided by the third party, such as a utility service, a financial service, a shopping service, or the like). The third party system may periodically generate a report of user account activity from data that may be stored in a data repository. The data on account activity may be extracted from the data repository, processed and/or merged by a computer operation into a report template. A file may be generated that may be delivered to the user (e.g., electronic delivery through an email link to a file accessible through the online account; or physical delivery of the statement printed and/or mailed to the customer).

Conventionally, to exchange or share third-party data in a peer-to-peer network that may have been printed and/or mailed to the user (e.g., a consumer), the user may need to receive the statement from the third-party, and/or deliver it by hand to a recipient, or scan the statement into a computer using an optical character recognition process that may be subject to errors and that may require a scanner, and/or the user may need to email an electronic image of the statement to a recipient.

By way of further example, to exchange or share third-party data with a recipient that may have been delivered to the user as a link in an email, conventionally the user may need to open the email, access the statement from the online account, download the statement, and/or email it, or print it and/or hand deliver it to the recipient. The user may find these options are time consuming, cumbersome, unreliable, and hence are not sustainable for third-party data that may be exchanged on a recurring basis.

Given the difficulty in sharing data using the foregoing conventional techniques, the user may find it easier and quicker to exchange or share third-party data with a recipient by providing the user's online account password, enabling the recipient to access the third-party data directly while disadvantageously greatly degrading security.

With respect to security risks engendered by certain conventional data sharing techniques, the form of the data that may be generated by a third-party system (e.g., a statement of account activity that may contain personal data (e.g., account number, address, detailed account activity that spans a fixed time period); or an online account dashboard or screenshot that contains the user's complete data (e.g., account number, address, entire account history, activity data), being shared with a recipient may give the recipient access to the user's personal and sensitive information rather than just the needed data. The data that may be generated by a third-party system, which may be viewed, transacted, altered or stolen, when exchanged with a recipient, as situations require, exposes the user to data privacy and financial risks and/or may expose the third-party to system security risks.

Regardless of the delivery mechanism, and/or the form in which the data it may be received, the structure of the data that the third-party system may exchange with the user may limit its portability, thus, for example, preventing the user from adequately controlling the third-party data precisely in a peer-to-peer exchange, or inhibiting technological advances to further improve processes in a peer-to-peer collaboration. In addition, if the third-party data is in certain file formats (e.g., HTML or PDF), the user may need the technological resources (e.g., computer, a computer software application, network access, etc.) to extract the data and/or store each data element in a useful format (e.g., rows and/or columns via a spreadsheet or database), in order to parse individual data elements the user may wish to exchange; customize time parameters during which to exchange specific data elements; and/or use the data for further computing processing (e.g., aggregating, summarizing, and/or performing data analysis at a peer-network level).

The limitations engendered by the structure of the data that the user may receive from a third-party may prevent the user from organizing and/or aggregating the data in useful new ways to benefit peer-to-peer network coordination, for network data collection, a collaboration dashboard, and/or otherwise.

As noted above, to overcome the drawbacks in how data associated with a user (e.g., user account data for an account with a third party) is made accessible by third party systems to a user, a user may provide access to more data than may be needed by the recipient by giving out online account password access, which may add to privacy or activity risk for the consumer, and/or create security risk for the third-party system.

Alternately, given the difficulty and risks of sharing such data, a consumer may opt not to exchange personal data in a peer-to-peer network. While this approach may offer better privacy protection for the consumer and/or may help protect third-party systems from security risks, such an antiquated approach may prevent collaboration in a peer-to-peer network. Thus, asymmetric information conditions may result, and the user and potential receiving system may be deprived of certain benefits. Further, in the absence of adequate user data, a data requester (e.g., the operator of the receiving system) may be unable or unwilling to provide the user with certain services or products, and may reduce the data requester's willingness to participate in a peer-to-peer network with the consumer.

Consumers expend billions of hours in activity each year through consumer peer-to-peer networks. For example, consumers engage and/or participate together in activities, interests, events; they perform obligations on behalf of others; and/or they jointly consume goods and/or services through their personal networks. Critically, much consumer activity is enabled through the sharing of information associated with a consumer.

Communication breaks down when the information (e.g., account information associated with a given consumer) necessary to coordinate, consume, and/or verify details, may be stored by a third-party in third-party database system, where the data may be directly accessible to an account-holder, but not to a non-account-holder. Another problem arises when the form of the information that may be exchanged (e.g., an account statement or activity record), exposes more personal information about the account-holder than may be necessary, such as an account number, a phone number, individual transactions, or account activity unrelated to the needs of the peer-network. Still additional problems arise when the structure of the data available does not adequately enable a consumer to selectively control the data being shared, for the purpose of employing it to mutually benefit the peer network.

Additional problems may occur when a consumer needs to combine information that may be held in different third party systems (e.g., to provide a more comprehensive view of certain aspects of the consumer's activities, health, or finances). For example, for the purposes of providing an overview of the consumer's health practices, it may be desirable to combine information from two fitness service accounts (e.g., showing information such as calories burned, time spent performing certain exercise routines, etc.) and one diet service (e.g., showing how many calories have been consumed and the type of food consumed).

Improving on the security, delivery, form and/or structure of data delivered to consumers may improve privacy, reduce security risks, provide consumers with greater control, offer greater reliability and/or credibility of data, facilitate new ways to collaborate, and/or enable easy, efficient, and/or safe exchange of data in peer to peer networks.

Certain aspects will now be discussed with references to the figures. In the following examples, user commands and/or other inputs may be received via a user interface provided by a dedicated application (an "app") installed on a user device or from a browser via a user interface accessed by the browser. Similarly, information may be communicated to a user via a user interface provided an app or a browser installed on the user device. Optionally, user inputs may be received via a voice input converted to text. Optionally, a user interface may provide information to the user visually and/or audibly (e.g., via text-to-speech, or via feedback tones).

Referring to FIG. 1, an example data exchange architecture and data flow are illustrated. In an optional implementation, a method of exchanging third-party data in a peer-to-peer network may comprise enabling a request by a first user (210) (sometimes referred to herein as the non-account-holder-user), entered into a computing device and transmitted by the computing device over one or more wired or wireless networks (200) to a remote computer system (230) that acts as a data record exchange/sharing facilitator (and is sometimes referred to as a data exchange facilitator computer system), for permission to receive data associated with a second user (220).

By way of example, the wireless networks (200) may include a cellular network (e.g., a 3G, 4G, or 5G cellular network) and/or a WLAN (e.g., a WiFi network). A computing or user device as referred to herein may be in the form of a mobile smart phone, a tablet computer, a desktop computer, a set top box, a smart television, a game console, a wearable (e.g., a smart watch, networked eyeglasses, networked jewelry, or smart clothing), a networked car, and/or the like.

Where the network(s) (200) include a cellular network, the cellular network may include distributed base stations, one or more switches, and one or more Mobile Switching Center (MSC) that manage cell towers and base stations in respective coverage areas. End-user devices, such as user mobile stations (e.g., mobile phones, tablet computers, wearable device, etc.) or stationary stations may communicate and share data and/or provide instructions via the wireless network (200) to remote data stores to share data.

Network security may be enhanced using mutual authentication, with the end-user devices being authenticated and with a determination made as to which user had which Internet Protocol address at which time. The network (200) may also be authenticated to enable end-user devices verify that the end-user devices are connected to a legitimate network. Data traffic over the network may be encrypted, where end-user data is encrypted as it passes through the network (200) to prevent improper access to the data.

Where the network(s) 200 include a WiFi network or other WLAN, the wireless network (200) may include an access point (e.g., a wireless router connected to the Internet) that provides user devices with access to the Internet or other network. Communications over the network(s) may be encrypted using one or more encryption techniques. For example, AES-256 or SHA-384 hashes may be used. Counter Mode Cipher Block Chaining Message Authentication Code Protocol (CCMP) may be utilized with respect to performing encrypted communication. Optionally, Simultaneous Authentication of Equals (SAE) may be utilized to provide a secure password-based authentication and password-authenticated key exchange.

The data exchange facilitator computer system (230) may comprise a hosted computing environment that includes a collection of physical computing resources that may be remotely accessible and may be rapidly provisioned as needed (sometimes referred to as a "cloud" computing environment), thereby providing higher system uptime and reliability and a more flexible and dynamic allocation of computer resources. The remote computer system (230) may also include a data store. The data store is optionally a hosted storage environment that includes a collection of physical data storage devices that may be remotely accessible and may be rapidly provisioned as needed (sometimes referred to as "cloud" storage) to reduce idle resources.

The requested data (e.g., associated with an account of the second user (220)) may be maintained and/or accessible through a third-party source (241), with which the second user (220) may be an account-holder (sometimes referred to herein as the account-holder-user). The third party source (241) may comprise one or more servers and may comprise a cloud-based computing system and data store. The third party source (241) may include a distributed blockchain, where the data (e.g., transaction data) may be recorded across large numbers of computer, where a record cannot be altered retroactively, without the alteration of all subsequent blocks.

Optionally, in addition or instead, a process of sharing data may be initiated by a user associated with an account of with a third party data, where the third party account data is being shared with another user (a peer) in a peer-to-peer network. For example, the second user (220) may initiate an invitation to the first user (210) to enable the first user (210) to receive data that may be accessible through a third-party source (241), for which the second user (220) is an account holder.

For example the invitation may be entered into a computing device by the second user (220) (e.g., via a user interface presented by an application), and transmitted directly or via the record exchange facilitator to a computing device associated with the first user (210). The invitation may be presented to the first user (210) by an application hosted on the first user's computing system.

The data that may be requested by the first user (210) or that is offered for sharing by the second user (220) may be classified in various ways (e.g., type, source, date, and/or identification markings) and such classification may be presented to the user (210) in association with the shared data. The computer system (230) may facilitate the exchange of data between users. For example, the computer system (230) may optionally perform some or all of the following: identifying the third-party data source, transmitting user credentials, receiving confirmation of access rights, requesting the data, transmitting the data over a network to a receiving user device, updating data, managing security through authentication, controlling access through traceability, implementing data-exchange protocols for user-select parameters (e.g., time to begin and/or end the exchange of data), and/or implementing other processes (e.g., managing, utilizing and/or dispositioning data that is exchanged, managing security settings for privacy, alerts or notifications; storing data to protect authenticity, and/or processing new data to enhance user workflows).

The account-holder-user (220) may use a computing device to invite, grant or deny permission to the non-account-holder-user (210) via corresponding user interfaces (e.g., which may be accessed via a dedicated application hosted on the computer device or which may be accessed via a browser from a remote webserver). If the account-holder-user (220) invites or grants permission to the non-account-holder-user (210) to access data, the account-holder-user (220) may be presented with user interfaces via which the account-holder-user (220) may select or add one or more third-party data sources (241) for the data that may be requested. Example user interfaces are discussed in greater detail elsewhere herein.

Of course, two users may invite each other to share data or request access to the other user's data. Optionally, the two users may store combined shared data in a collection. Optionally, the two users may share a collection of combined data.

The data exchange facilitator computer system (230) may connect to the third-party data source (241) through an application interface (API) (240), may verify that the account-holder-user (220) has access rights to the data (e.g., that the data is associated with an account of the account-holder-user (220)), may transmit or initiate the transmission of the requested third-party sourced data to the account-holder-user's (220) computing device (e.g., for presentation by an application hosted on the account-holder-user's (220) computing device). The account-holder-user (220) may select, via a corresponding user interface, the requested data elements to be shared with the requesting non-account-holder-user (210) and/or may select data-exchange protocols to be used by the data exchange facilitator computer system (230).

The data exchange facilitator computer system (230) may process the account-holder-user (220) request to exchange/share corresponding structured data using the specified sharing protocol with the non-account-holder-user (210), may confirm that the non-account-holder-user (210) accepts the specified sharing protocols via an acceptance indication received from the non-account-holder-user (210) via her computing device, and/or may access and transmit the structured data to the non-account-holder-user's computing device (210). Consistent with the data-exchange protocols that may be selected by the account-holder-user (220) and/or may be accepted by the non-account-holder-user (210), the computer system (230) may perform matching operations to automatically populate a data store and/or user interface on the non-account-holder's computing device with new occurrences of the structured data as may be specified and permitted by the account-holder user (220). For example, new occurrences of the structured data may be accessed and transmitted periodically (e.g., daily, weekly, monthly), in response to detecting a specified event (e.g., detecting a new account statement from the third party source 241), or in response to detecting a specified type of new data.

Figure 2:
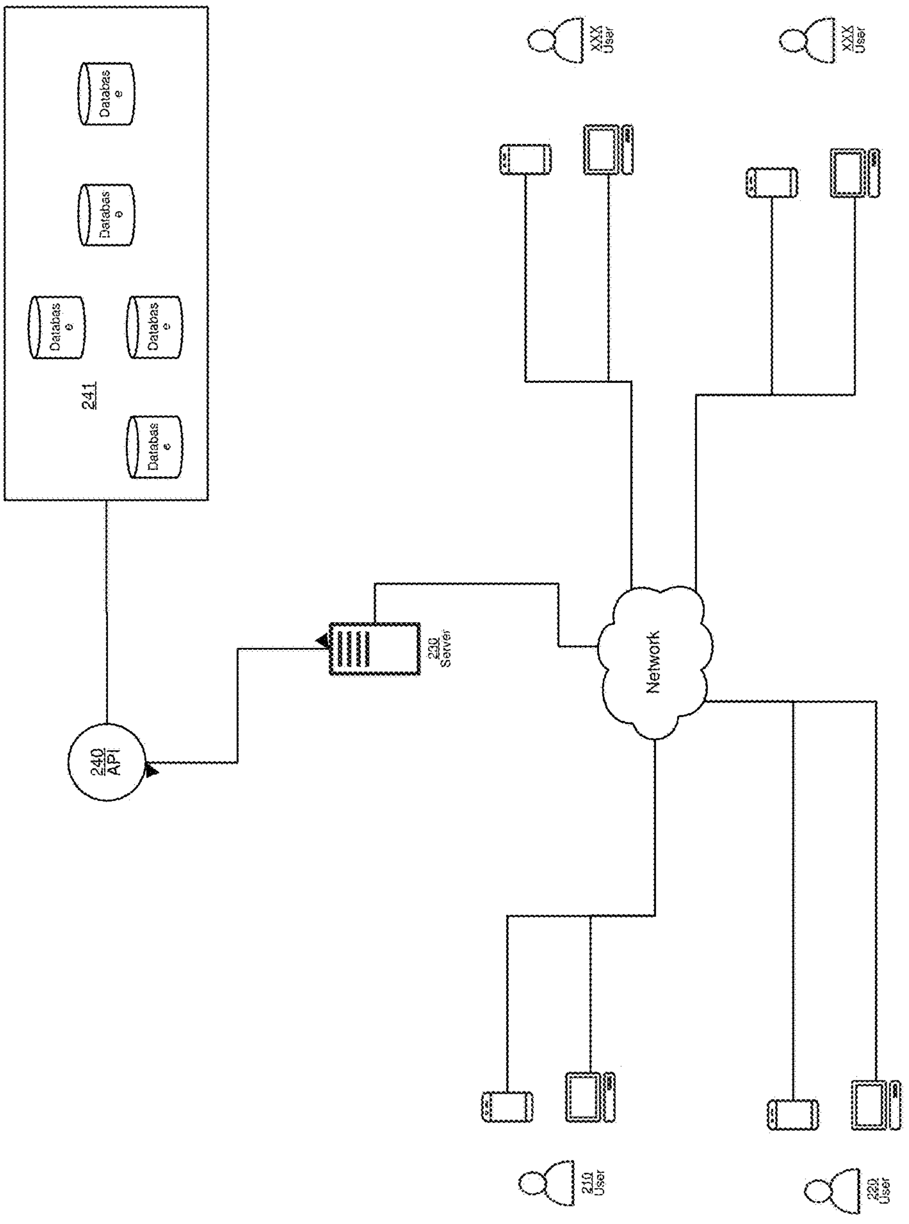
FIG. 2 illustrates an example networked environment.

FIG. 2 illustrates the example networked environment in greater detail. FIG. 2 illustrates, by way of example, how multiple users and/or computing devices may be linked over one or more networks (e.g., the wireless or wired networks that may provide access to the Internet, other wide area network, and/or one or more intra-networks) into peer-to-peer networks. As similarly discussed above with reference to FIG. 1, the user (210) may request data from via a computing device. The request may be transmitted via the network to the data exchange facilitator computer system (230). The data exchange facilitator computer system (230) may transmit the request via the network to the user (220). The user (220) may accept or reject the request. The acceptance or rejection may be transmitted through via the network to the data exchange facilitator computer system (230). In response the computer system (230) may perform operations to access via the API (240) and/or process the requested data stored in one or more remote data stores (241). The requested data may be returned to the second user (220) to approve. The request may be validated with the first user (210). The requested data may be processed and/or presented to the first user (210).

Figure 1B:
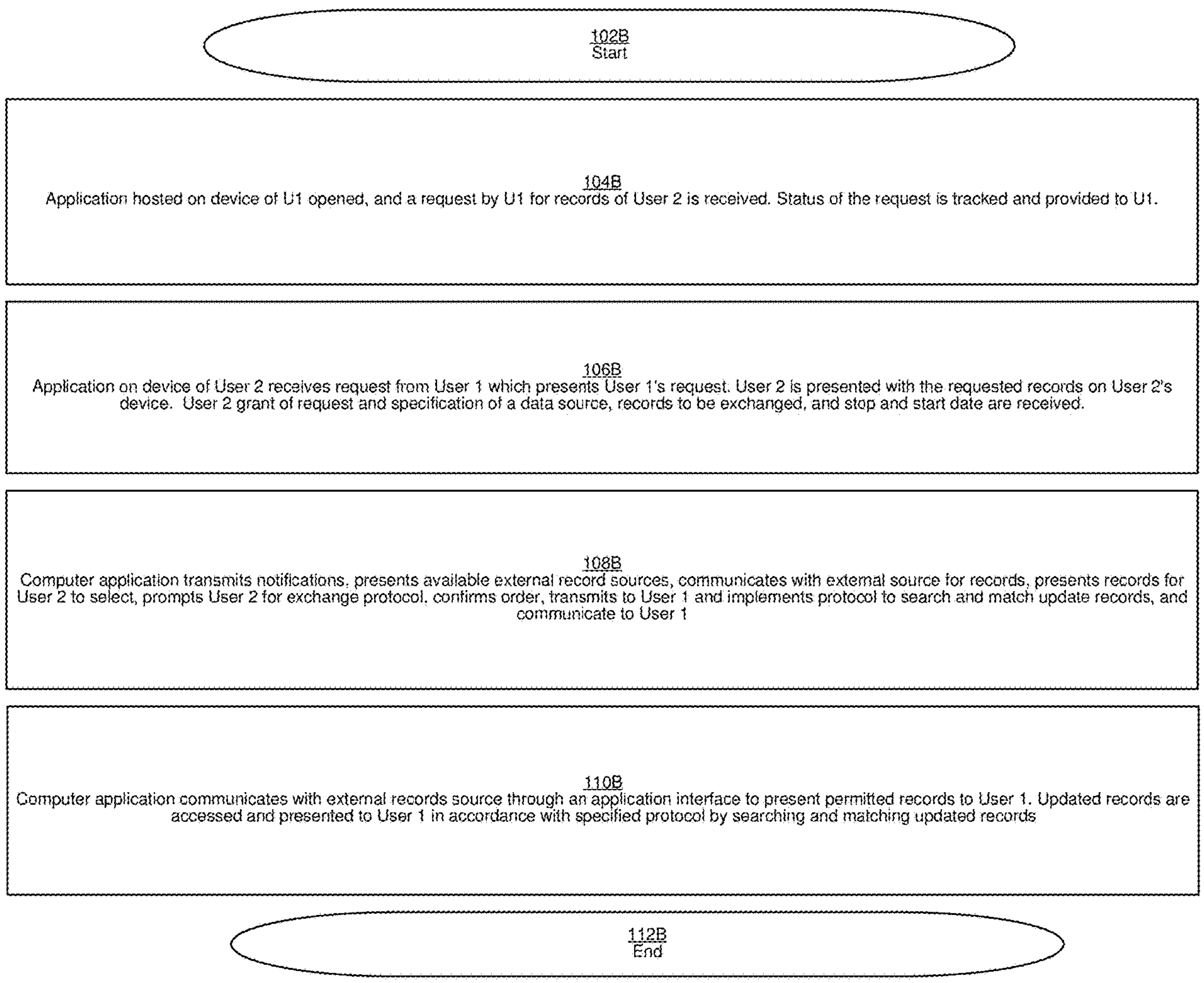
FIG. 1B illustrates example data sharing processes.

FIG. 1B illustrates example data sharing processes beginning at 102B via which a first user may selectively share specified fields of data form specified sources with a specified recipient, which may be a second user. The first user may utilize a computing device, such as a mobile device (e.g., a smart phone), in accessing user interfaces that enable the first user to specify the data source, the data fields/types to be shared, and the user being permitted to access the shared data. As discussed elsewhere herein, the user interfaces may be presented via a dedicated application hosted on the computing device or may be accessed from a remote source (e.g., a webserver) by a browser hosted on the computing device. In the illustrated example scenarios, it will be assumed that User 1 (Bob in this example) and User 2 (Mary in this example) are partners that may live together and may share expenses, but where only one user (Mary in this example) has an account with a third party that supplies services (e.g., utility services) used by both users.

Referring to 104B, an electricity service account with the electricity service provider may be in Mary's name (Mary (User 2) is the account-holder. Bob (User 1) may use his computing device to access a software program (a dedicated data sharing application that generates user interfaces or a browser that accesses user interfaces from a remote server, such as a webserver). At 104B, Bob may communicate to Mary (e.g., via an instant message or an invitation transmitted by the application hosted on Bob's computing device to an application hosted on the computer device of Mary's) that he would like to access and track information on electricity usage in their apartment (which may be stored in the form of one or more records by the electricity service provider).

The status of Bob's request (e.g., awaiting review, approved, disapproved, shared data available, data sharing protocol change, etc.) may be detected and communicated to Bob's computer device in real time. The status may be presented in real time and/or in response to an instruction from Bob via the application hosted on Bob's computing device. Bob's request may be transmitted from Bob's computer device to the data record exchange facilitator system and/or Mary may be notified of the request through an alert on her computing device.

For example, at 106B, Mary receives the data request which may be presented via a dedicated application or browser hosted on Mary's computing device. The dedicated application may generate user interfaces, provide notifications, and receive commands. If a browser is utilized, the browser may access user interfaces from a remote server, such as a webserver associated with the data exchange facilitator computer system, via which Mary may receive notifications or data and via which Mary may provide commands or other inputs.

In conjunction with the request, at 108B the requested data may be automatically accessed from the electricity service provider via the data record exchange facilitator system. Mary may accept the data request and grant Bob, via a corresponding user interface, access to the electricity usage data from the account with the electricity service provider, but Mary may inhibit the sharing of other account data, such as the amount owed, payments received, payment instrument data, and/or the like.

For example a user interface may enable Mary to select a data source (the electricity service provider in this example), the specific records to be shared, and start and stop dates or statements to limit sharing of such data to dates or statements corresponding to the specified start and stop dates and/or statements. The data record exchange facilitator system may receive Mary's selections from Mary's computer device. The data record exchange facilitator system may then access the permitted data for sharing with Bob or may enable the data source to directly share the permitted data with Bob. Of course, Mary may decline the request from Bob, in which case the requested data will not be shared.

At 110B, Bob may be then be presented with access to the requested electricity usage information, as permitted by Mary, on Bob's computer device (e.g., via user interfaces presented by the dedicated application or via a browser), which may be served to Bob's computer device by the data record exchange facilitator system, as will be described.

In particular, Bob's request made may be transmitted from Bob's computer device to the data record exchange facilitator system and/or Mary may be notified through a request alert generated on her computing device. For example, Mary may use the application hosted on her computing device to accept Bob's data request. Mary may use the application to retrieve the data requested by Bob.

The computer application may access and present to Mary a list of external data sources associated with Mary (e.g., electricity utility account, water utility account, car loan account, etc. Of Mary). Mary may select an account from the list of data sources. The list of data sources may include data sources previously specified by Mary via a corresponding user interface. Optionally, a search interface may be provided via which Mary can enter a search query (e.g., the name of a utility). The search query may be transmitted to a search engine which may identify and rank potential matches. The identified matches may be returned for presentation on Mary's device, and Mary may select a data source from the search results.

In specifying the data sources, Mary may have provided or selected a data source name (e.g., the name of the utility), her account number, and/or authentication credentials (e.g., user name, password, or other authentication token). The application installed on Mary's computer device may request data directly from the selected external data source or the request may be routed to the data record exchange facilitator system, which may in turn route the request to the selected external data source.

The application installed on Mary's computer device may access and present the requested data from the selected external data source to Mary. The data may be structured so as to present the data field names and current corresponding data. Mary may select, via a user interface, the data that is to be shared with Bob. In this example, Mary may select a record corresponding to the electricity usage. As discussed above, Mary may enter a start and/or stop date corresponding to the data that is to be shared, which may correspond to Bob's request. For example, Bob's request may indicate that Bob would like to be able to access and review the electricity usage data each month. The user interface may enable Mary to specify that the electricity usage data is to be automatically transmitted to Bob in response to detecting new electricity usage data.

In response to Mary's agreement to share data, the application transmits a corresponding confirmation of the request to share the data and the confirmation may be transmitted to Bob to confirm the request. The confirmation may include sharing protocols specified by Mary (e.g., which may identify what data that will be shared, data sharing start and stop dates, enable automatic sharing, specify statements that will be shared, etc.).

Bob receives the notification and/or accepts or declines the data sharing protocols. If Bob accepts the data sharing protocols, the application hosted by Bob's computer device may prepare the data to present to Bob (e.g., "For the month of September, 867 kilowatt hours of electricity was consumed"). The data may include current data and previously exchanged data that may be combined into one or more data collections. The application installed on Bob's computer device may enable Bob to view, filter, summarize or arrange the data that may be available. The process may end at 112B.

Optionally, instead of Bob issuing a data request to Mary, Mary may have initiated the sharing of the data by initiating a data sharing invitation, selecting the invitation recipient (Bob in this example), selecting a data source, selecting the specific records to be shared, and specifying sharing start and stop dates or statements (limiting sharing of such data to dates or statements corresponding to the specified start and stop dates and/or statements). The data sharing invitation may then be transmitted to Bob's computer device. Bob may accept or decline the invitation, and the data may be shared (or not shared) accordingly.

Figure 3:
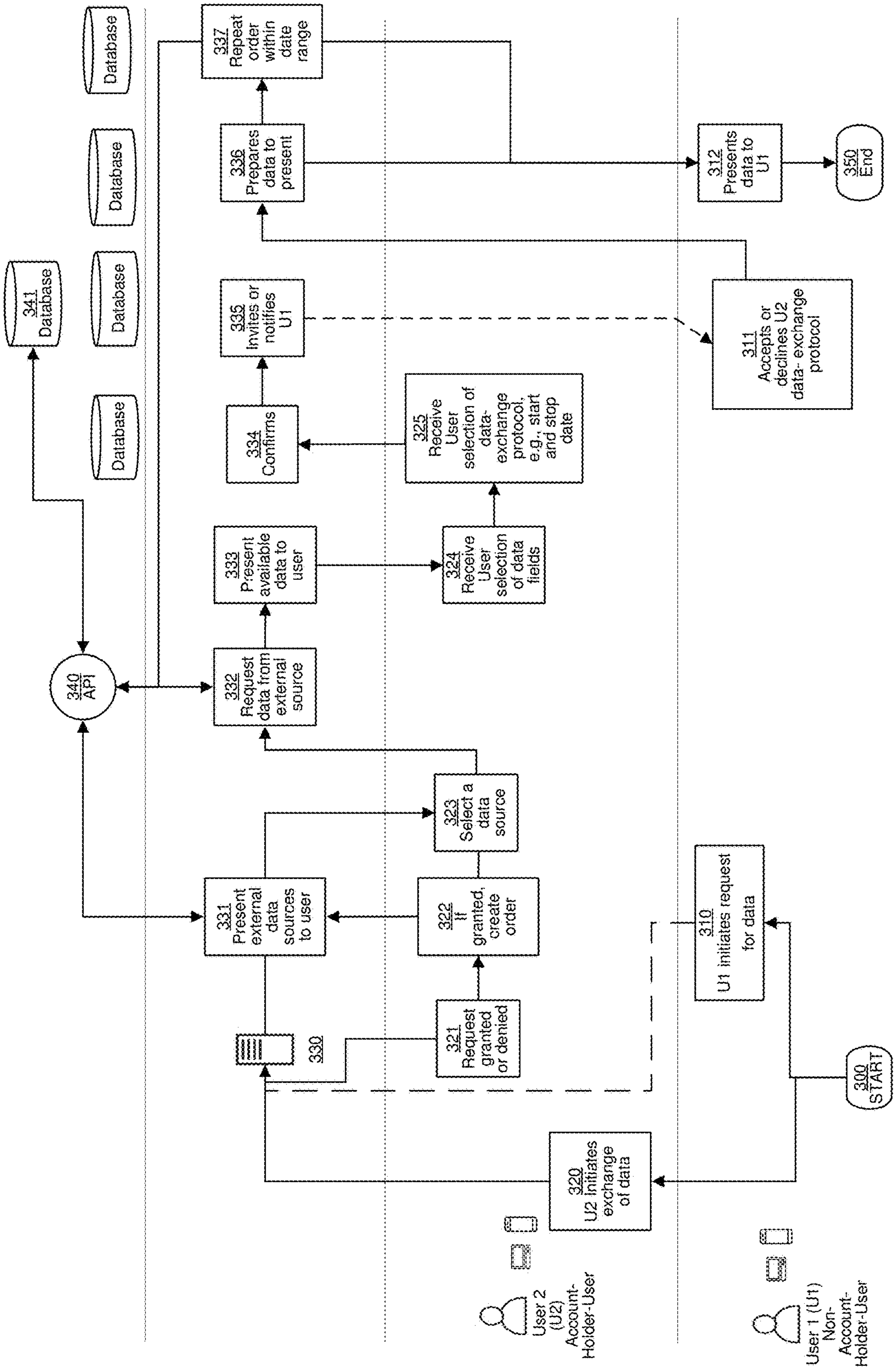
FIG. 3 illustrates an example process.

FIG. 3 illustrates an example data sharing process in greater detail. Although certain operations may be described as being performed by computer system (330), certain of those operations may be performed by instantiations of a data sharing application hosted on respective computer devices of the users U1 or U2.

The example process begins at (300). In this example, User 1 may initiate, at (310), a request for data associated with User U2, or User U2 may initiate, at (320), an invitation to U1 inviting U1 to receive data associated with U2. For example, the data associated with U2 may be associated with an account U2 has with a third party service provider or other data source.

U1's data request may be received at a computer system (e.g., a data exchange facilitator computer system (330)). The request may be forwarded to the computing device of U2 and may be presented to U2 via an data sharing application. At block (321), the computer system receives from (via the data sharing application hosted on the computing device of U2) an approval or denial of the request from U2. At block (322), if a determination is made that U2 has granted U1's data request, U2 may be prompted via an alert or notification to create a data sharing order (e.g., defining data sources, data fields, sharing start and stop dates, data sharing frequency, etc.).

At block (323), U2 may be prompted to select a data source. For example, the list of data sources may include data sources previously specified by U2 via a corresponding user interface and/or the U2 may be enabled to search for a data source as described elsewhere herein. Optionally, a user interface may be presented to U2 by the data sharing application that enables U2 to specify a new data source not included in a list and may provide an account identifier and authentication credentials (e.g., user identifier, password, and/or other authentication token) to access the account. The data source selection may be received by the computer system (330).

At block (332), the computer system (330) may request data from the selected data source (341) via an API (Application Programming Interface 340). For example, the computer system (330) may use authentication credentials and an account identifier provided by U2 to access the data from the selected data source. The computer system (330) may also receive field data and/or other metadata associated with the data that identifies/describes the data subject matter (e.g., energy usage, amount due, amount paid, etc.).

At block (333), the accessed data and/or data identifiers may be transmitted to and presented to U2 via the data sharing application. For example, the data identifiers may be presented as fields in association with the corresponding field data to provide content. At block 324 the U2 selection of data fields to be shared is received by the computer system (330) via the data sharing application.

At block (325), U2's specification of a data-exchange protocol is received via the data sharing application. For example, the data-exchange protocol may specify a start and/or stop date in which data corresponding to the selected fields will be shared with U1. By way of further example, the data-exchange protocol may specify how many and/or which account statements from which data corresponding to the selected fields will be shared with U1. By way of still further example, the data-exchange protocol may specify a recurring sharing period (e.g., once an hour, once a day, once a week, once a month, once a year, etc.). At block (335), U2 may be prompted via the data sharing application to confirm U2's selection of the data source, selection of data fields, and specified data-exchange protocol, where the via the data sharing application may present a confirmation user interface displaying U2's selection of the data source, the selected data fields, and the data-exchange protocol. U2 may be provided the option to edit and change the selection of the data source, the selection of data fields, and/or the specified data-exchange protocol.

If U2 provides a confirmation indication (e.g., via a confirmation control), the confirmation indication may be received by the computer system (330) and a corresponding confirmation notification may be generated and transmitted to U1. The corresponding confirmation notification may be received and presented by the data sharing application hosted on the computing device of U1. The confirmation notification may include some or all of the data-exchange protocol so that U1 can evaluate if the data-exchange protocol satisfies the needs of U1.

For example, if U1 is a lender, and needs to see cash flow information from a financial account of U2 in order to determine whether or not to grant a loan to U2, if U2 did not agree to share enough past data, U1 may reject the protocol At block (311) an acceptance or rejection of the data-exchange protocol is received at the computer system (330) data sharing application hosted on the computing device of U1.

At block (336), the data to be shared in accordance with the data-exchange protocol may be accessed via the API (340) from the data source database (341) and prepared for presentation to U1. At block (312) the prepared data is transmitted for presentation to U1 via the data sharing application hosted on the computing device of U1.

The process of obtaining data from the selected data source, preparing the obtained data for presentation to U1, and presenting he prepared data to U1 may repeat in accordance with the data-exchange protocol if, at block (337), a determination is made that the current date falls within the date range specified by the data-exchange protocol and satisfies the other data-exchange protocol criteria (e.g., a repeat time period, an event trigger, etc.). Otherwise, the process may end at block (350).

Figure 4:
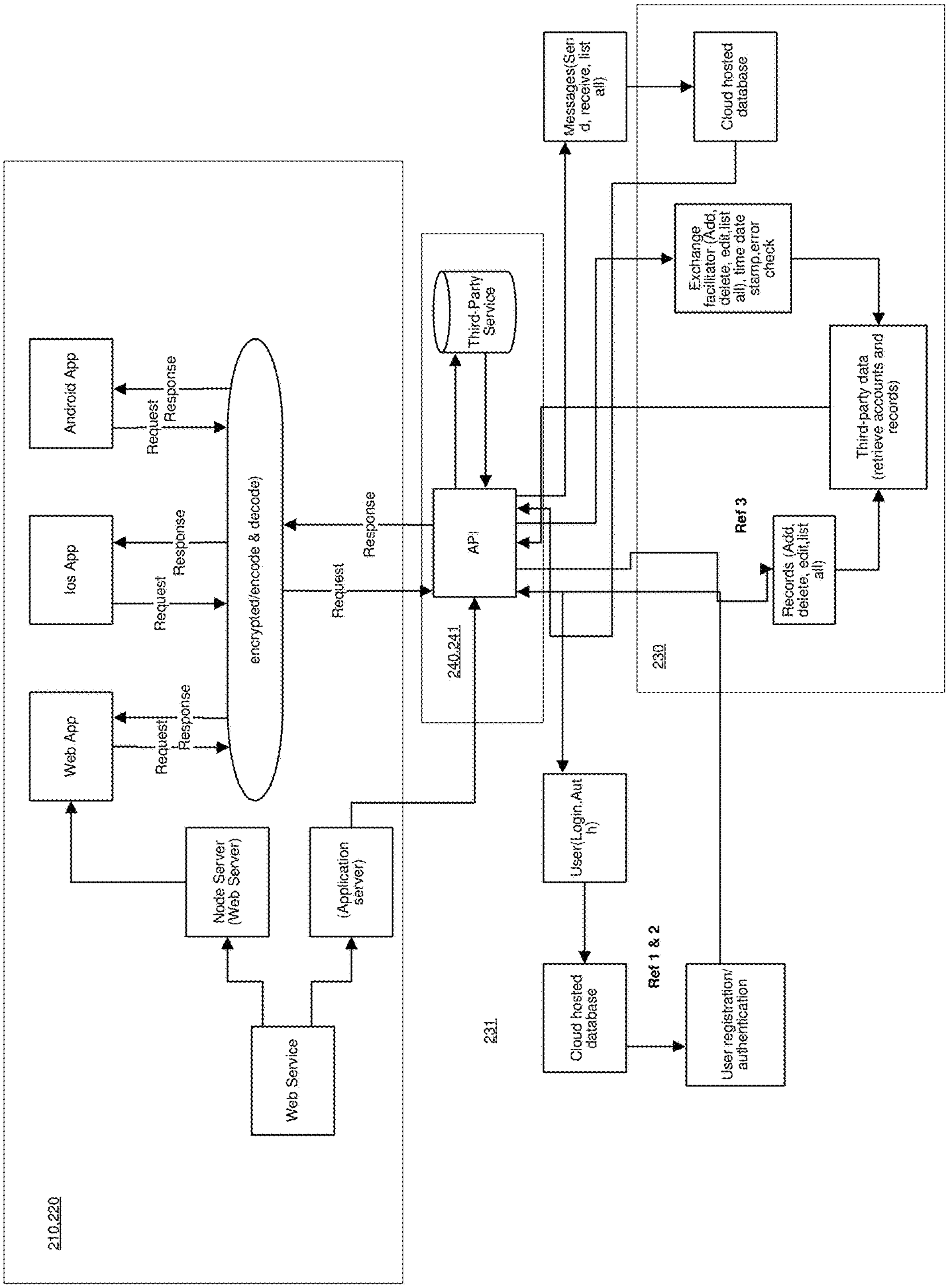
FIG. 4 illustrates an example architecture.

FIG. 4 illustrates an example architecture in detail. As illustrated, the architecture of the account-holder-user computing device (220) may optionally have the same or similar architecture as the non-account-holder-user computing device (210) with respect to the data sharing functionality. The computing device (210 or 220) may optionally include a web application configured to communicate with a server or cloud system through a web application framework. In addition, the computing device (210 or 220) may optionally include a mobile application suited for a mobile device that may be employed to communicate with the computer system (240). The mobile application, sometimes referring to as a data sharing application, may be configured to be compatible with the operating system of the mobile device (e.g., the iOS operating system or the Android operating system).

The computing device (210 or 220) may communicate with the computer system (240) using a secure connection that employs encryption of data during transmission. A relational database, configured to store data, may support data encryption for stored data at rest. Transmissions to the computer system (240) may be encoded and/or decoded upon receiving and/or sending (e.g., using encryption techniques described elsewhere herein). The mobile application may transmit, via the API (240), with a registration service to enable user registration with a registration source, authentication tokens with an authentication service, with a cloud hosted database service, and/or with one or more third-party services (231).

An application interface may communicate securely with one or more third-party databases (241) and/or may transmit data securely to the data exchange facilitator computer system (230). The data exchange facilitator computer system (230) may, via a computer program hosted thereon, process the data (e.g., normalizing the data to store in a relational database; performing data error checks to ensure data is received accurately from third-party systems; implementing exchange protocols (e.g., rules to ensure data exchanged is the accurate, meets time parameters, is exchanged with the intended user); executing calculation routines to record events by date, time and/or user; performing exchange protocol error checks for accuracy in exchanging data; and/or communicating data to users via respective user interfaces displayed on user devices.

Optionally, the user interfaces may be presented via an application (e.g., a data sharing application as described elsewhere herein) hosted on the user device. A user may interact with the user interface to implement or change data exchange protocols, to reorganize the presentation of data (e.g., accessed from third party data stores, such as an account data store, and displayed to the user), and/or to make changes to user settings. Requests may be transmitted to the data exchange facilitator computer system (230) for processing and/or the processing results may be returned to the user's computing device (210, 220). The data exchange facilitator computer system (230) may perform operations to create an account, register a user, and/or login to a computer program. The data exchange facilitator computer system (230) may perform other operations described herein.

Certain example processes will now be described with reference to the figures.

Figure 5A:
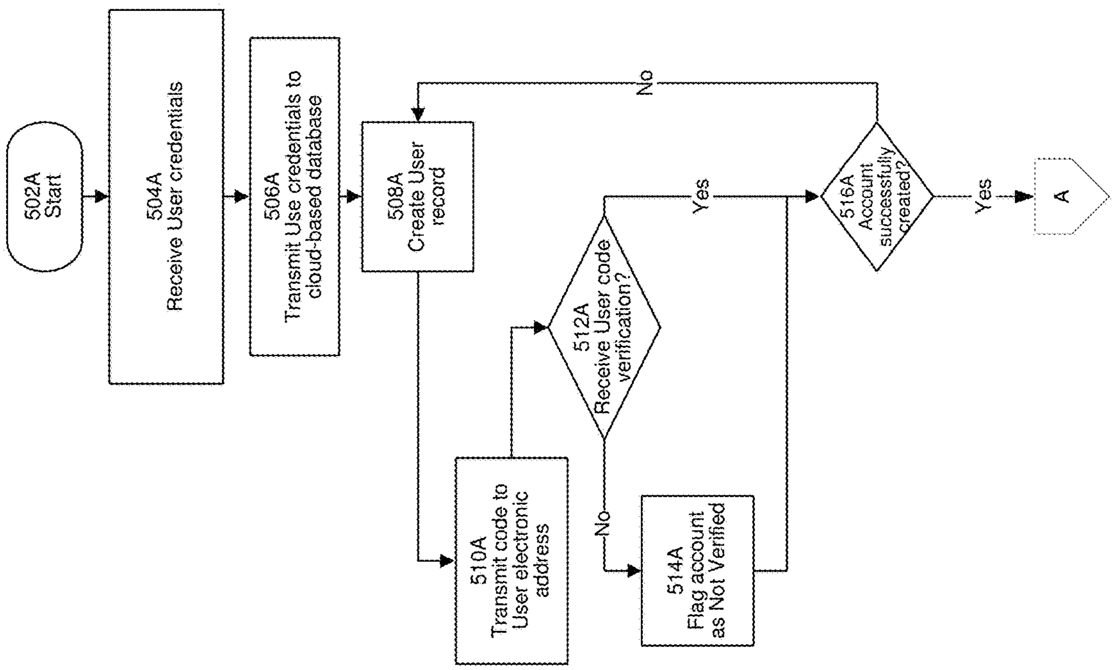
FIGS. 5A-16 illustrate additional example processes.
Figure 5B:
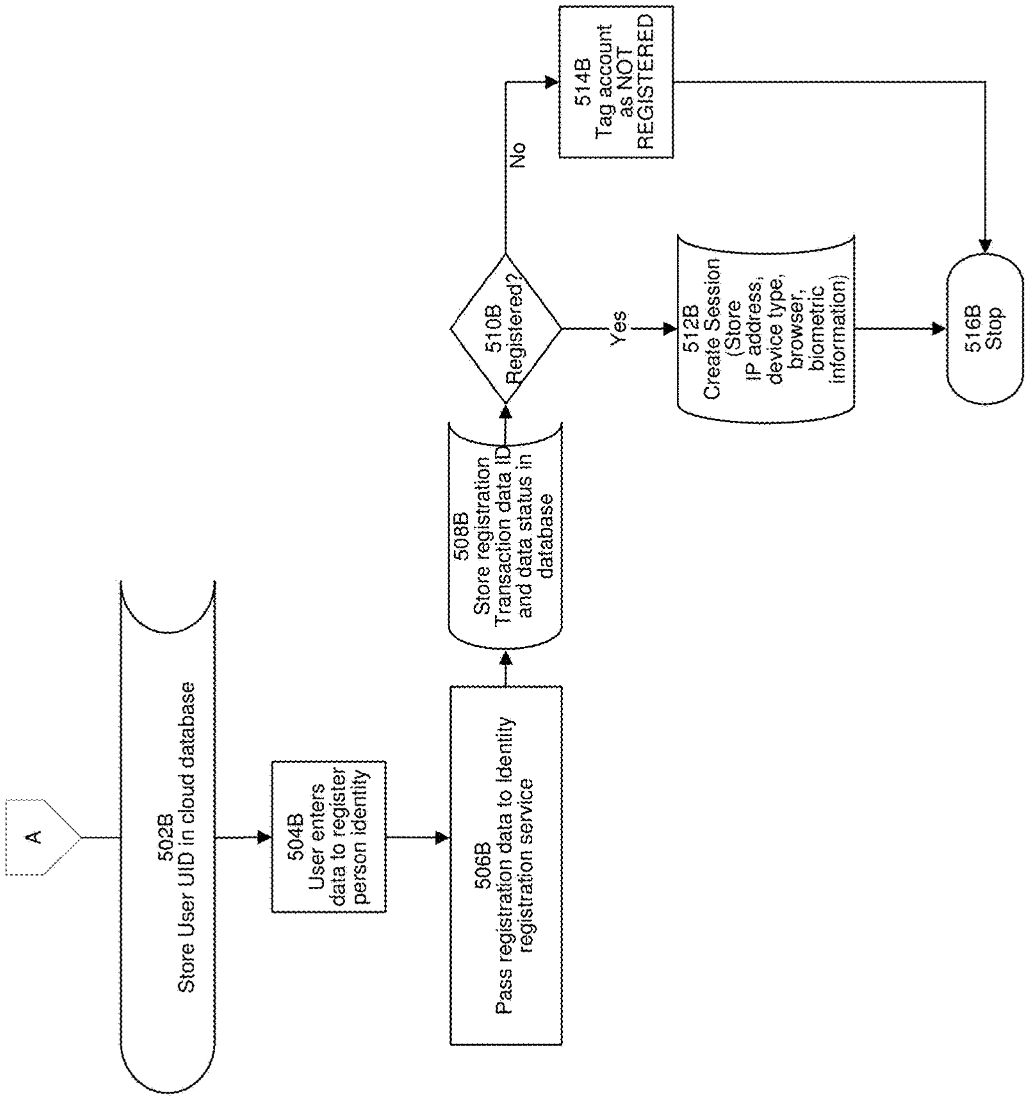

Referring to FIGS. 5A-5B, an example process of creating a user account in a cloud-based data store will be described. The process starts at block 502A. At block 504A, a user is prompted to provide user credentials via a data sharing application hosted on a user device. For example, the user may be prompted to provide and email and/or messaging service address, user identifier, password, and/or other authentication token which may be received by a remote system (e.g., a data exchange facilitator computer system). At block 506A, the received authentication credentials may be transmitted to a cloud-based database for storage. At block 508A, a user record may be created. At block 510A, multifactor verification may be used to verify some or all of the user credentials. For example, an electronic verification code may be transmitted to the phone number and/or email address, where the user is to enter the verification code in a verification code field presented via the data sharing application, and the data sharing application is to transmit the verification code to the remote system.

At block 512A, a determination is made as to whether the verification code has been received from the data sharing application. Optionally, the process requires that the verification code to be received within a specified time period after it was initially transmitted to the data sharing application on the user device (e.g., within 60 minutes, within 1 day, etc.). If the verification code is not received within the designated time period, at block 514A, the account is designated in the cloud database as not verified and the user may be inhibited from using all or selection services. If the verification code is received within the designated time period, at block 516A, the account is designated in the cloud database as verified and the account is successfully created, and a user ID may be defined by the user or system.

At block 502B, once a user ID is established the user ID is stored in association with the user account record in the cloud-based database. At block 504B, the user is prompted by the data sharing application to enter additional registration data (e.g., date of birth, zip code, physical address, name, email, mobile phone number, and/or other data). At block 506B, some or all of the registration data may be transmitted to an identity registration service (which may be operated by a third party) to verify the user's identity using the registration data. For example, the identity registration service may attempt to match some or all of the registration data with verified identity records. Optionally, use of the an identity registration service may be performed at a later time (e.g., upon receiving a financial payment instrument credential (e.g., a credit or debit card number, CCV, etc.) or an identity registration service may not be utilized at all. If a match is found, the user may be verified and a corresponding verification indication may be transmitted to the remote system. At block 508B, a registration transaction data identifier, the verification indication, and data status are stored in the database.

A determination may be made at block 510B, based on the verification indication as to whether the user's identity was successfully verified or not. If the user's identified was verified, at block 512B, a session record may be generated and stored (e.g., the user device's IP address, device type, browser type, and/or biometric information that may be received from the user device, such as face, voice, pupil, or fingerprint data). The session record may later be used to perform subsequent user/user device authentication as discussed elsewhere herein.

If the verification indication indicates the user is not verified, at block 514B, a not registered/verified tag is stored in the created user account and the user may be inhibited rom using some or all of the services described herein. At block 516B, the process stops.

Figure 6:
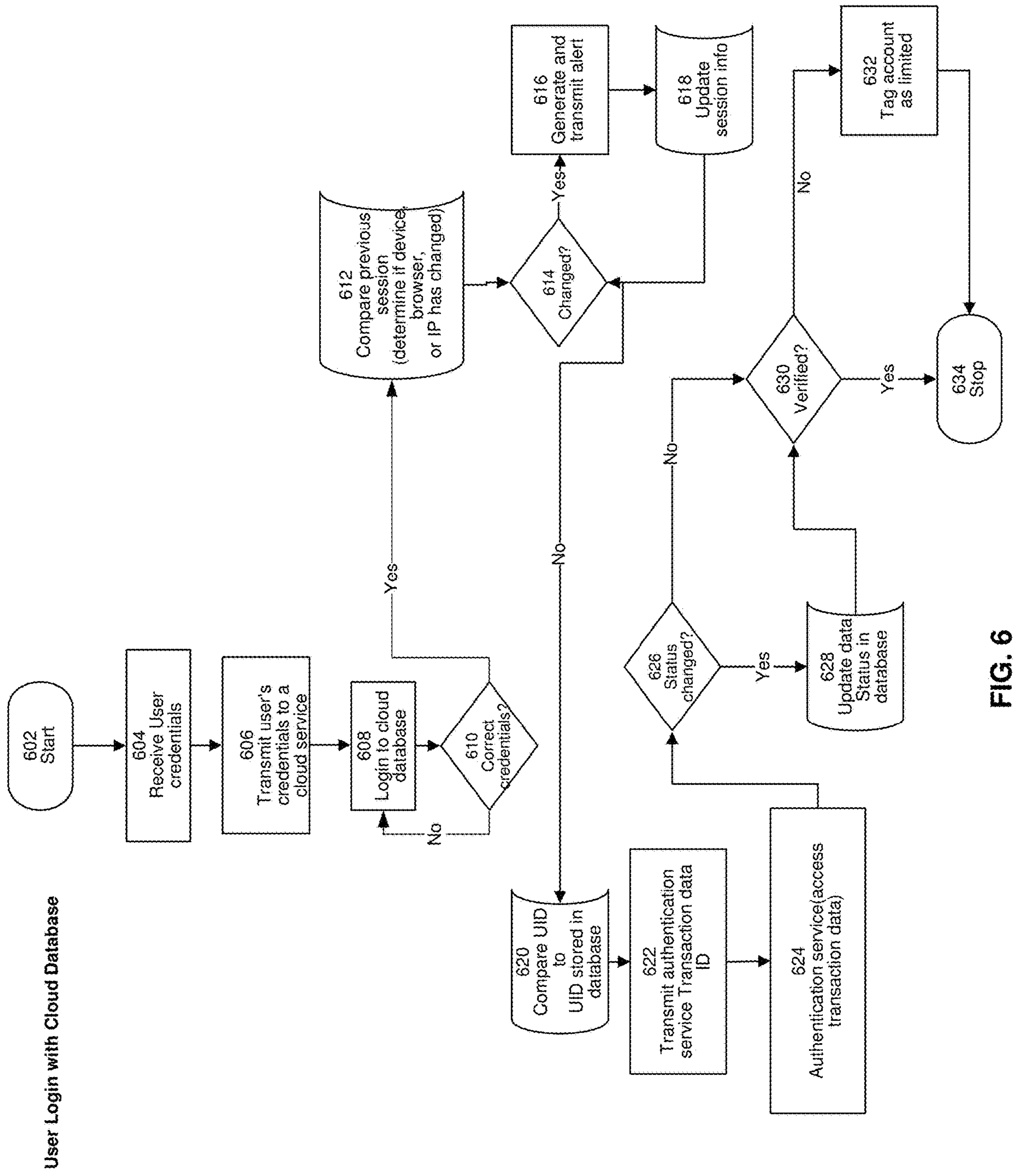

An example user login process with respect to a cloud database will now be described with reference to FIG. 6. At block 602, the user may be prompted (e.g., via login user interface presented by a content sharing application hosted on the user's device or via a webpage accessed by a browser application hosted on the user's device) to log into their account using the user's credentials. At block 604, the application may receive the user credentials (which may be manually entered by the user, automatically entered by the application, provided in response to the user being authenticated by a biometric system on the user's device, and/or otherwise).

At block 606, the user credentials may be transmitted by the user device application to a remote system (e.g., a data exchange facilitator cloud-based computer system) which receives the user credentials. At block 608, the credentials may be used in attempt to login into the user's account stored in a cloud-based data store. At block 610, a determination is made as to whether credentials received from the user device are the correct credentials. If the credentials are not correct (e.g., do not match those associated with the user record) an error notification may be transmitted to the user device, and the user may attempt to login again with correct user credentials.

If a determination is made that the received user credentials are correct, the process proceeds to block 612, and further user authentication may be performed. For example, current session information (e.g., the user device's IP address, device type, and/or browser type) may be compared with previous session information obtained when the user established the user account to determine if there is a change in one or more session information items (e.g., a change in IP address, device type, and/or browser type). A determination may be made at block 614 as to whether certain or all of the session information items do not match those in the previous session information. If the match fails, at block 616, an alert may be generated and transmitted to an electronic address associated with the user account and/or to one or more security administrators. The alert may request that the user verify/confirm that the login is being performed by the user and is authentic. If a verification is received, at block 618, the new session information may be stored in association with the user's account for use in later verification.

At block 620D, the user ID may be compared to the user ID stored in the cloud database in association with the user's account record. At block 622, an authentication service transaction data identifier is transmitted to an authentication service. At block 624, the authentication service accesses transaction data. At block 626, a determination is made as to whether there is a status change with respect to the transaction data (e.g., by comparing the current data with previously accessed/historical data to determine if there is a change). If there is a data status change, at bock 628, the data status is accordingly updated in the database. At block 630, a determination is made as whether the user has been verified. If the user has been verified, a corresponding verification confirmed tag may be stored, the user may be provided with corresponding data sharing services, and the process may stop at block 634. If the user has not been verified, a corresponding verification failure tag may be stored, and the user may be inhibited from accessing all or certain data sharing services described herein, and the process may stop at block 634.

An example process for inspecting and verifying user registration and the use third-party credentials will now be described with reference to FIGS. 7A-7D. Via the process, a user's credentials may be verified with a third-party service and/or the process may determine whether a user has third-party accounts currently active. The process may enable a user to select and add third-party data from the third party account (which may be accessed directly from a third party system hosting the account or via a third party data aggregator). The process may enable a user to upload a document or use optical character recognition software to extract data from a document, and may enable the user to add details to the resulting file or object. User interactions (e.g., issuance of commands, selections of documents to upload, feedback to the user, etc.) with the data exchange facilitator computer system may be via a data sharing application installed on a user device as described elsewhere.

The process begins at block 702A. At block 704A, a determination is made as to whether a user wants to add third party accounts (accounts the user has with third parties) to the user's account with the data exchange facilitator computer system to thereby enable the user to share information associated with user accounts with such third parties (e.g., utility service providers, loan providers, credit card providers, banking service providers, etc.

If a determination is made that the user wants to add third party accounts to the user's account with the data exchange facilitator computer system, at block 706A, the process may determine whether user identity registration is complete, prior to enabling the user add third party account data. Optionally, the process may authenticate the user identity using a third party identity verification service, as discussed elsewhere herein, and/or using financial/payment credentials of the user.

If a determination is made that the user registration is complete, the process may proceed to block 708A, and the user may be further authenticated by the third party system. For example, if required by the third party system, the user's credentials (e.g., user identifier UID and password) may need to be submitted each time the data exchange facilitator computer system or may only need to be submitted the first time the data exchange facilitator computer system accesses the user's account with the third party system.

If a determination is made that the user registration is not complete, the process may proceed to block 710A, and a determination may be made as to whether user credentials associated with the third party account are to be used to access the user's account with the third party (e.g., using the user's account identifier, password, etc.). If the user credentials associated with the third party account are to be used to access the user's account with third party, then the user credentials may be used to register with the third party account. Optionally, a verification process may be performed where certain user data provided by the user (e.g., name, email address, physical address, phone number, etc.) are compared with those associated with the third party account, and if the user data matches, the registration is verified and complete, and the user data does not match, an error message may be generated and the account may be marked as not registered in a user record. If a determination is made that user credentials associated with the third party account are not to be used to access the user's account with the third party, the process proceeds to block 712A, and user registration is performed using a third party authentication service.

If a determination is made at block 704A that the user does not want to add third party account records, the process proceeds to block 720A. At block 720A a determination is made whether the user issued an instruction to upload a file and/or perform optical character recognition (ORC) on a document, where the file or document may include data associated with a user account at a third party service provider that the user wishes to share.

At block 722A, a determination is made as to whether the user wants to employ OCR. If the user does not want to use OCR, at block 726A a document selected by the user is uploaded to the data exchange facilitator computer system, otherwise, at block 724A, OCR is used to extract records comprising data and data fields from the document. The process then proceeds to block 706A.

Figure 7A:
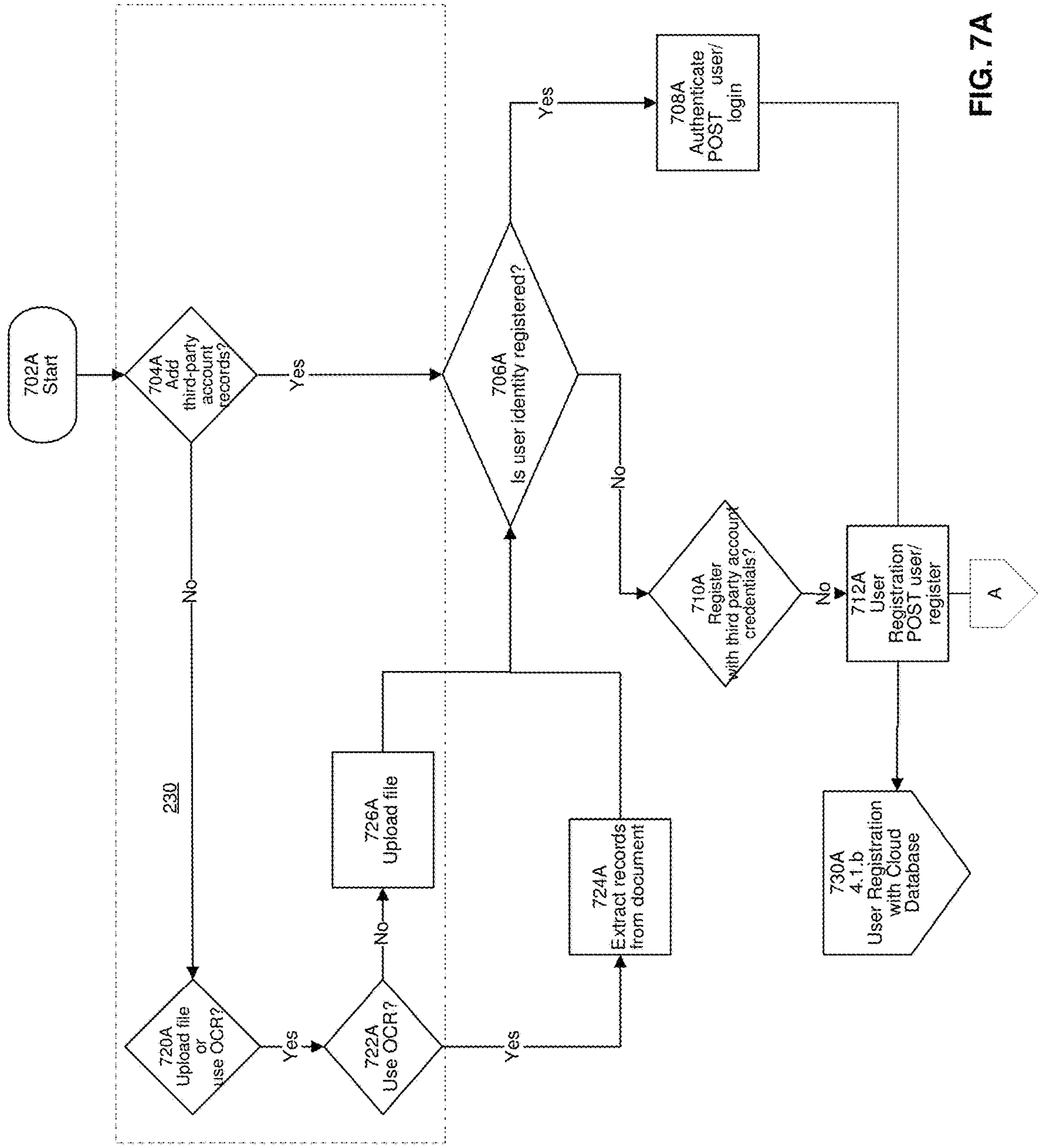
Figure 7B:
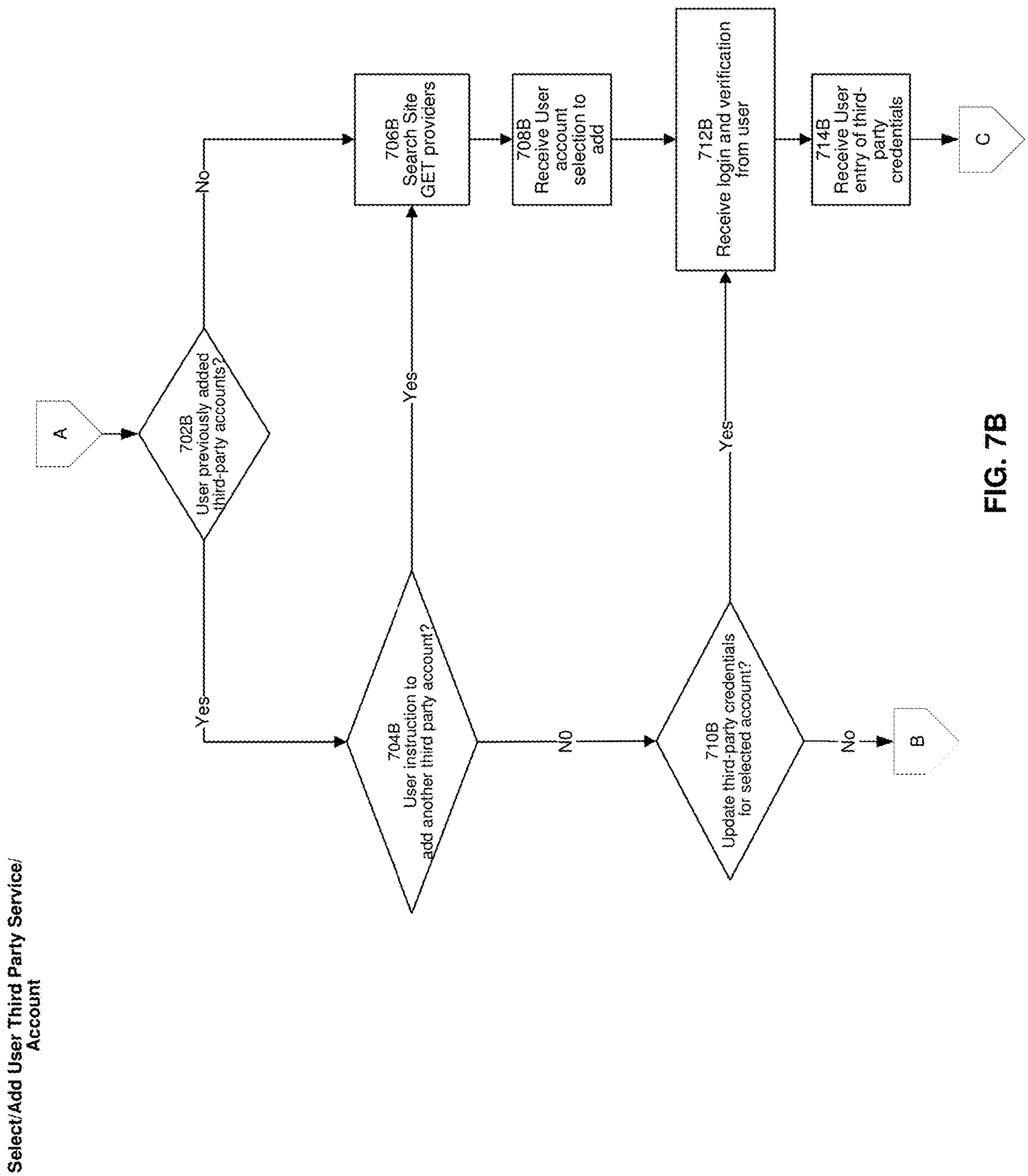
Figure 7C:
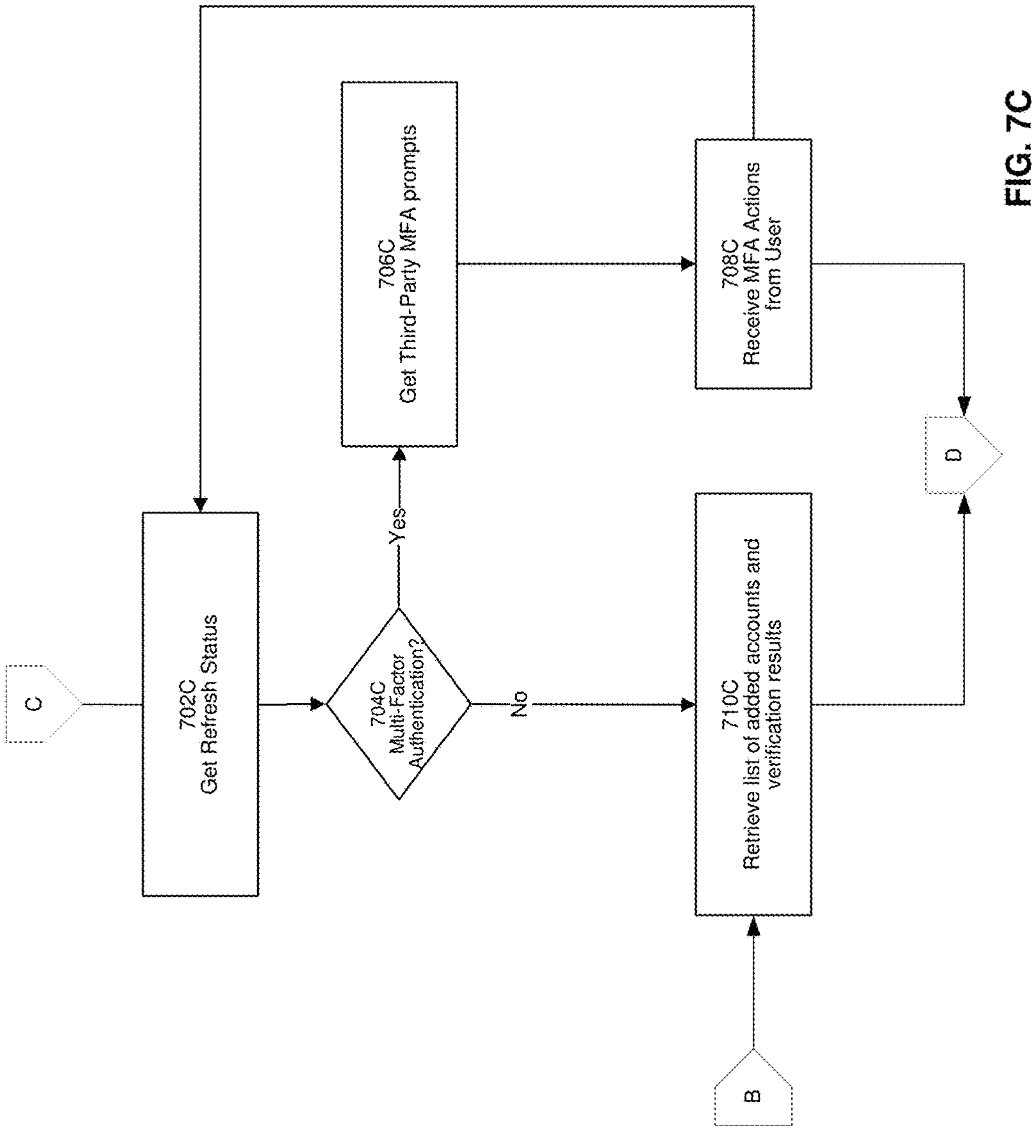
Figure 7D:
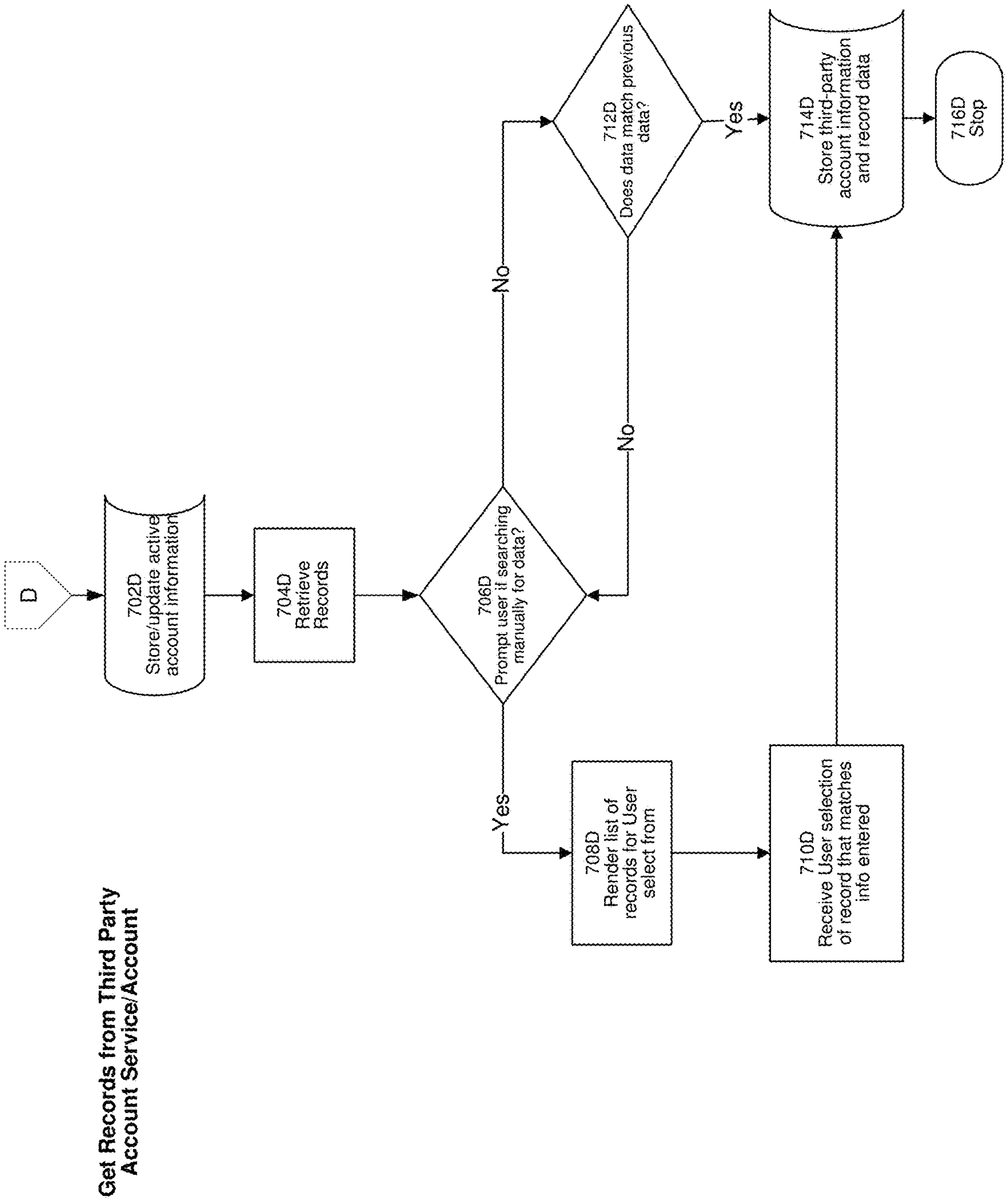
Figure 8A:
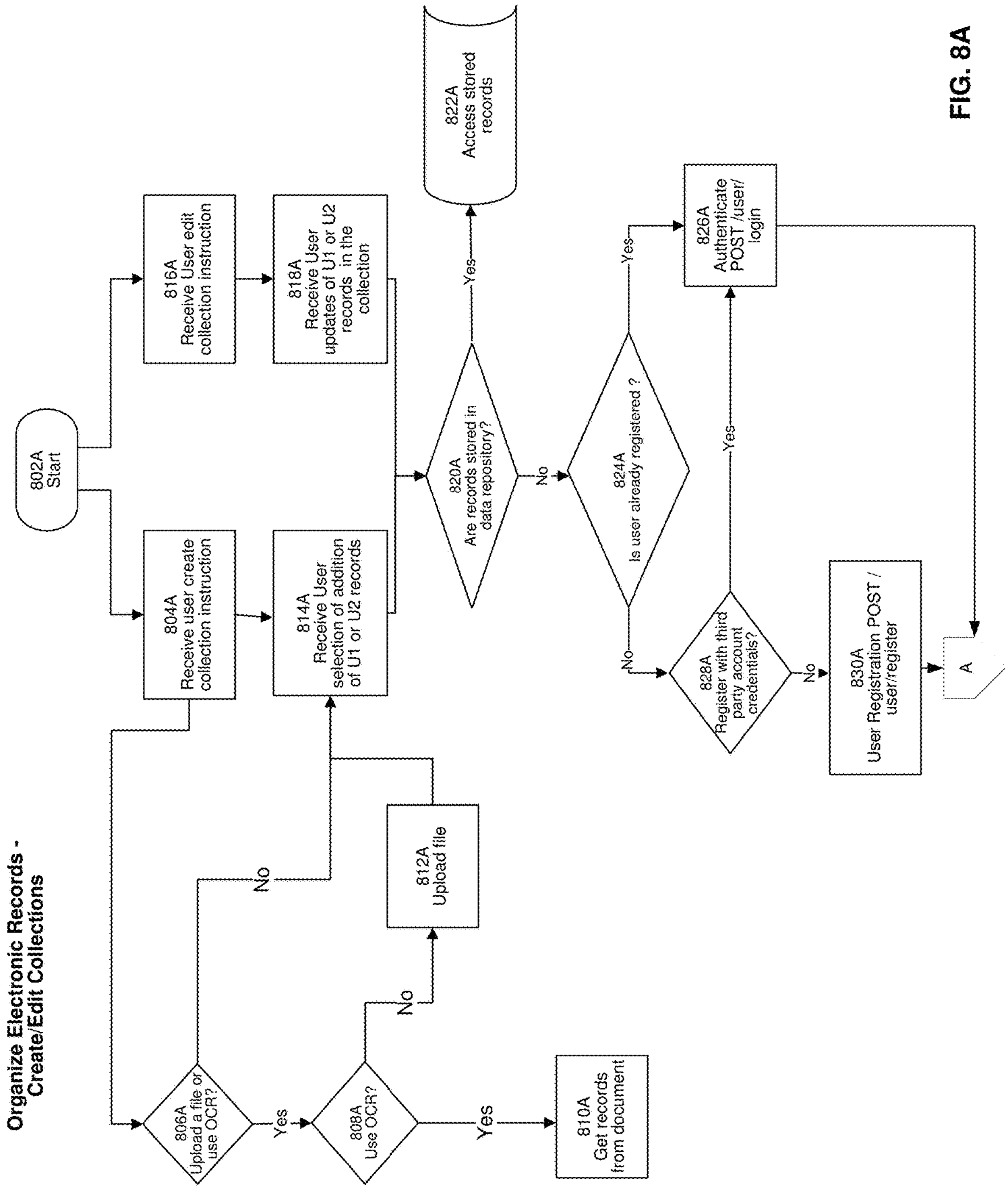
Figure 8B:
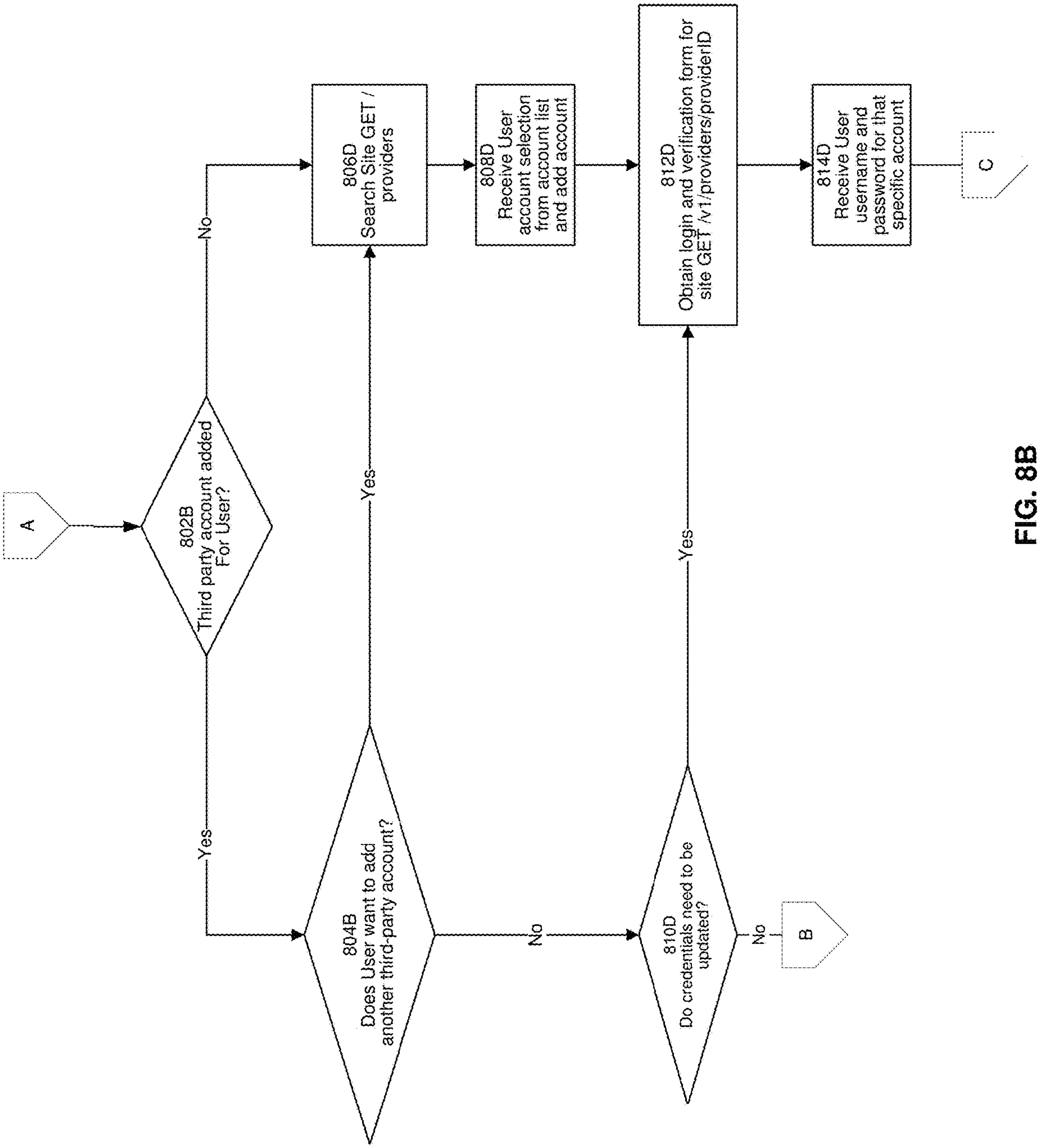
Figure 8C:
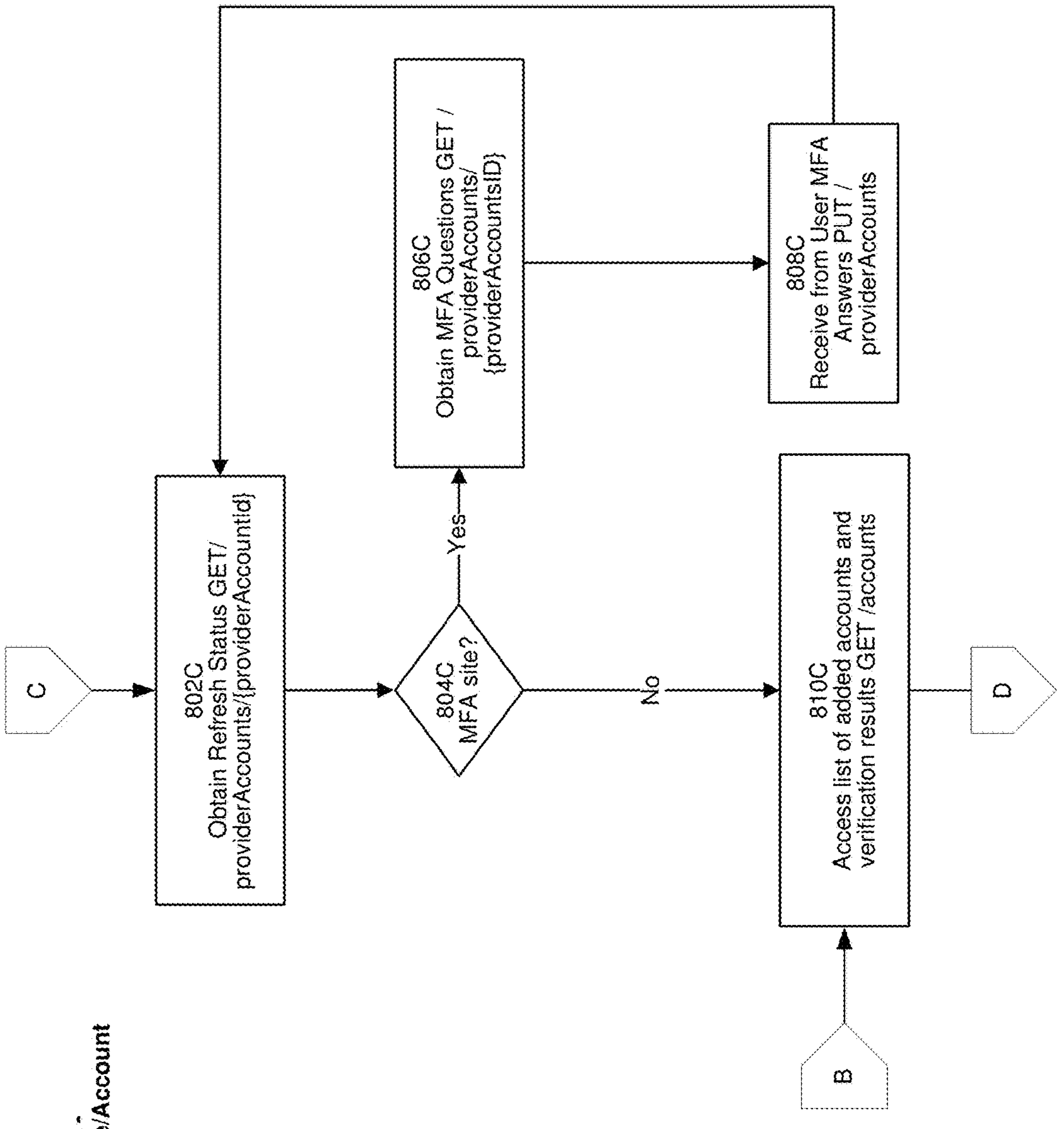
Figure 8D:
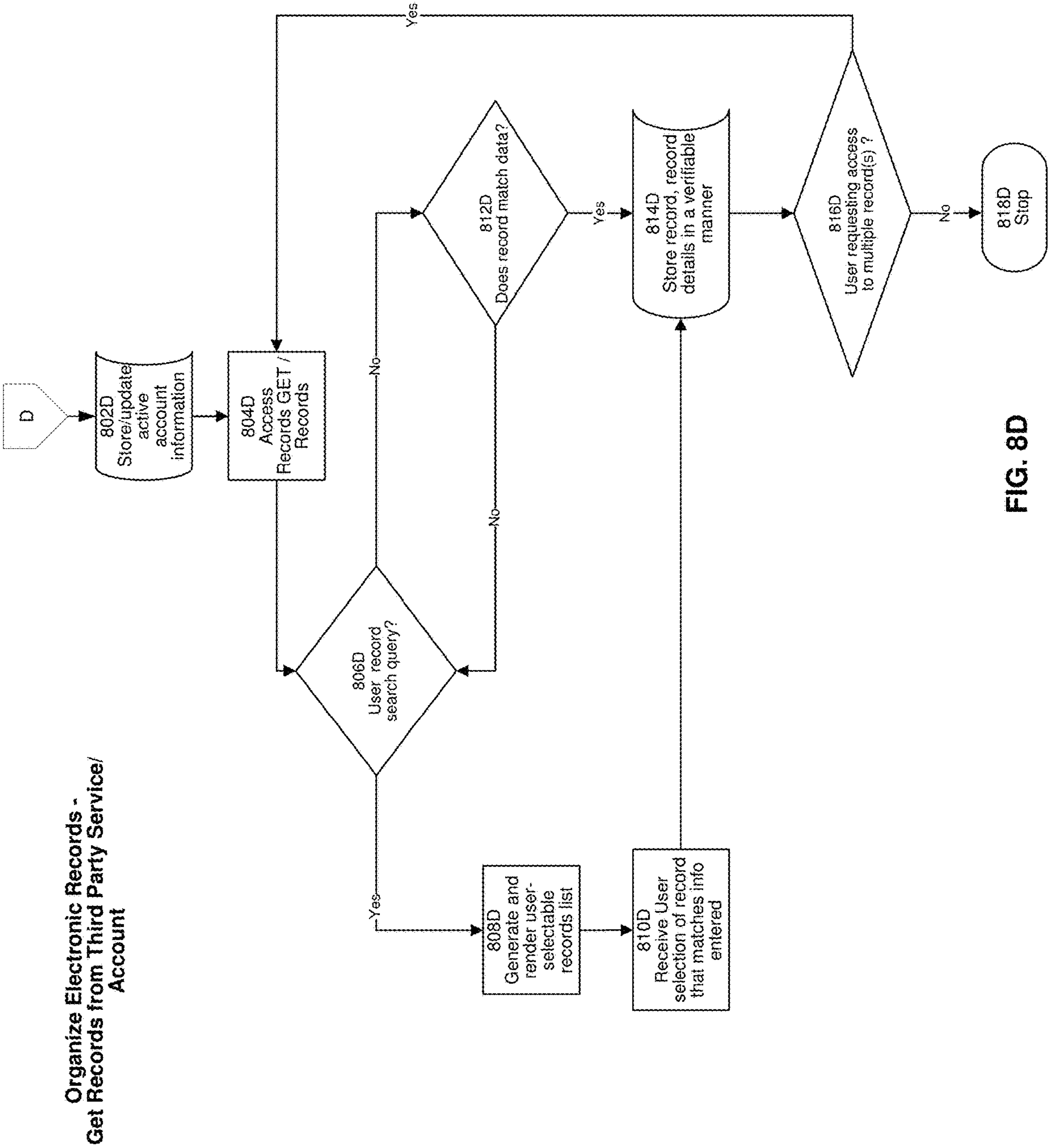

Proceeding to block 702B illustrated in FIG. 7B, the process may enable a user to select or add a third party service to the user account. As will be described, a user may be prompted to add a third-party account, to select data for sharing from a third-party account, and to provide credentials for a third party account. The user-provided credentials may be used in order to verify the credentials are valid. Optionally, multifactor authentication may be performed.

At block 702B, a determination is made as to whether the user previously added (to the user's account with the data exchange facilitator computer system) third party accounts of the user (e.g., accounts with service providers). If the user previously added third party accounts to the user's account with the data exchange facilitator computer system, at block 704B a determination is made whether an instruction was received from the user to add another third party account, and if so, the process proceeds to block 706B. If the user did not previously add third party accounts, the process proceeds from block 702B to block 706B.

If the user had previously added third party accounts, the process proceeds from block 702B to block 704B, and a determination is made as to whether an instruction is received from the user to add another third party account. If an instruction is received from the user to add another third party account, the process proceeds from block 704B to block 706B. If an instruction is not received from the user to add another third party account, the process proceeds from block 704B to block 710B, and a determination is made as to whether third party credentials are to be updated. For example, the third party credentials may need to be updated if the user changed the password or user identifier associated with the third party account and if so, the new password may be needed to access the account. If a determination is made that third party credentials are to be updated, the process proceeds to block. If a determination is made that third party credentials are not to be updated, the process proceeds to block 710C as will be described below.

A block 706B, the process searches for corresponding service providers and may present the search results to the user (e.g., in a search results list). At block 708B, the process receives a user selection of a service provider from the search results. At block 712B, the updated authentication/verification credentials are received from the user (e.g., updated login user identifier, password, and/or verification data) for the third party service provider website, where the credentials are needed to access user account data from the third party service provider site. At block 714B, user entry of credentials is received, the process proceeds to block 702C, and an authentication process is performed.

As will be described, multifactor authentication may be performed (e.g., as required by a third party system being used as a data source), a list of third party accounts may be retrieved, transactions may be updated using matching algorithms (which may be executed by a learning engine), and a list of user-selectable transactions may be generated. For example, when accessing and providing recurring shared data, a learning artificial intelligence machine engine may analyze account data, associated data field identifiers, data patterns, user identifier/account information (e.g., account holder name, account number, email address, phone number, etc.), and/or other data to identify anomalies, verify that the correct account is accessed, and that the correct data from the correct time frame from the correct account is being accessed.

The learning engine may be a deep learning engage and may comprise hierarchical levels of artificial neural networks to carry out the process of machine learning. A neural network may comprise an input layer, one or more partially or fully connected convolutional hidden layers, and an output layer. The neural network may be trained using supervised learning, and back propagation may be used to adjust layer weights. For example, data and/or data field identifiers may be analyzed using characteristics such as the length of each string in characters, the number of digits characters in a string, the number of non-alphanumeric characters in a string, the number of sequential consonants in a string, the number of vowels in a string, the value of a numerical string, and/or other data characteristics.

A block 702C, the refresh status is retrieved that may indicate if multifactor authentication is complete or whether input to complete the third party system multifactor authentication is needed. At block 704C, a determination is made to whether multifactor authentication is to be performed. If a determination is made that multifactor authentication is to be performed, the process proceeds to block 708C and multi-authentication of the user is performed (e.g., an email, short messaging service message, app prompt, or other communication is provided to a destination address in the user account, and a determination is made as to whether an appropriate/confirmation communication is received in response).

If a determination is made that multifactor authentication is not to be performed, the process proceeds to block 710C, and a list of added third party accounts is accessed and/or generated in association with the verification results performed for each of the third party accounts.

The process proceeds to block 702D, records may be retrieved from the party service provider account records of the user. As will be described, the process may store and/or update account information, prompt a user to manually search and/or select transactions, match transactions with previous data, store third-party data that may have been requested by a user, and/or organize electronic records of third party account to exchange/share in a peer-to-peer network.

The active account information is stored and/or updated with the current transaction data. At block 704D, account records are retrieved from the corresponding third party accounts. At block 706D, a determination is made as to whether the user is searching manually for third party account data. If a determination is made that the user is not searching manually for third party account data, the process proceeds to block 712D whether the data in the retrieved records matches the data in previously retrieved third party account records (e.g., to ensure that correct data is going to be provided to requesting user and/or added to a data collection). For example, as similarly described elsewhere herein, a machine learning engine may be used to data to identify anomalies, verify that the correct account is accessed, and that the correct data from the correct time frame from the correct account is being accessed.

At block 714D, third party account information and record data is stored in memory. At block 716D, the process stops.

If, at block 706D, a determination is made that the user wishes to manually search for data (e.g., via a corresponding search command received from the user), the process proceeds to block 708D, and a list of third party account records is generated for rendering on the user device. At block 710D, a user selection of a third party account record is received that matches the entered third party account information.

Referring now to FIGS. 8A-8D, an example process for organizing electronic records, creating and/or editing electronic collections of data, authenticating with third party service account, and obtaining records from third party service provider accounts will now be described. In particular, the process may prompt a user to create or add a collection for uploaded files, OCR data or third-party account data, enable the user to add details to an uploaded file or object, enable the user to select third-party data to add, verify a user's registration with a third-party service and/or determine whether the user currently has third-party accounts, perform multifactor authentication using credentials provided by the user, retrieve a list of existing accounts, retrieve and update transactions that have been previously identified using matching algorithms, and/or generate a list of transactions selected by the user.

The process may store and/or update account information, prompt the user to manually search and/or select multiple files, OCR document data and/or transaction data, match data with previous data, store requested data, prompt a user to store multiple files, OCR data and/or transactions in a collection, and/or exchange/share electronic records in a peer-to-peer network.

The process begins a block 802A, the process may receive a create collection instruction from the user (whichever user is logged in) at block 804A, or an edit collection instruction from the user at block 816A (e.g., remove or add data/data types). If an edit collection instruction is received from the user, at block 818A, user record updates are received (e.g., from U1 and/or U2, such as for a collection that includes data shared by U1 with U2 and incudes data shared by U2 with U1, and may further include data of other users. If a create collection instruction is received from the user at block 804A, a user selection of record additions are received from U1 or U2.

If a create collection instruction is received from the user at block 804A, the process may determine, at block 806A, whether the user wants to upload a document or use optical character recognition (OCR) software to extract data from a document. If a determination is made, at block 808A, the OCR is to be used, the process may proceed to block 810A and OCR may be performed on the document to extract record data. If a determination is made, at block 808A, the OCR is not to be used, then at block 812, a user file-upload may be received, and the process may proceed to block 814A.

At block 820A, a determination is made as to whether a collection of records from one or more third parties of one or more users are stored in a data depository. If a determination is made that records are stored in the data depository, the process proceeds to block 822A and the stored records are accessed. If a determination is made as that records are not stored in a data depository, the process may proceed to block 824A, and a determination may be made as to whether the user already has registered account. If the user is already registered, the process proceeds to block 826A, and the user is authenticated. If a determination is made that the user is not already registered, the process proceeds to block 828A. At block 828A, a determination is made as to whether a registration is to be performed using third party account credentials. If a registration is to be performed using third party account credentials, the process may proceed to block 826A, and the user may be authenticated. If a registration is not to be performed using third party account credentials, the process may proceed to block 830A, and the user may be registered at block 830A with the corresponding to the third party data source (e.g., based on a user selection of the third party service provider, a user provided password, user identifier, account identifier, and/or other credential data).

At block 802B, a determination is made as to whether an account the user has with a third party is to be added for the user's account with the data exchange/sharing facilitator system. If an account the user has with a third party is to be added, the process proceeds to block 804B, and a determination is made as to whether the user wants to add another third party account. If the user wants to add another third party account, the process may proceed to block 806D discussed elsewhere herein. If the user does not want to add another third party account, the process may proceed to block 810D and a determination may be made as to whether the user credentials need to be updated. If a determination is made that the user credentials need to be updated, the process proceeds to block 812D, discussed elsewhere herein. If a determination is made that the user credentials do not need to be updated, the process proceeds to block 810C, discussed elsewhere herein.

If a determination is made at block 802B that an account the user has with a third party is not to be added, the process proceeds to block 806B and a search is performed to identify third party service provider accounts associated with the user. A list of the third party service provider accounts may be presented to the user, and at block 808B, a user selection of a third party service provider account may be received. At block 812B, the process may obtain login and verification form data for the selected third party provider account. At block 814B, the process receives credential information from the user for the third party provider account (e.g., user name, password, and/or other credentials).

At block 802C, the refresh status is obtained so that the most current account data may be presented for view. At block 804C, a determination is made as whether the site utilizes multifactor authentication. If the site is a multifactor authentication site, the process proceeds to block 806C, and the process obtains authentication questions from the site (e.g., what model was your first car, what was your first pet, what city were you born in, etc.). At block 808C, the process receives answers to the authentication questions from the user, and the process may proceed back to block 802C.

If the site is not a multifactor authentication site, the process proceeds from block 804C to block 810C, and the process accesses a list of added account and verification results.

At block 802D, the active account information is stored and/or updated. At block 804D, the account records are accessed. At block 806D, a determination is made as to whether a user record search query is received. If a determination is made that a user record search query is received, the process may proceed to block 808D, a user-selectable records list may be presented to the user, and at block 810D, a user selection of a listed record is received. The process may then proceed to block 814D.

If at block 806D, a user record search query is not received, the process proceeds to block 812D, and a determination is made as to whether a record matches the data (e.g., using a machine learning engine as described elsewhere herein). If a record match is not identified, the process may proceed back to block 806D. If a record match is identified, the process may proceed to block 814D, and the record may be stored in a verifiable manner (e.g., stored in association with a source identifier, account number, date information, and/or other metadata, which may be used for future data point matching and verification). At block 816, a determination is made as to whether the user is requesting access to multiple records. If the user is requesting access to multiple records, the process may proceed back of block 804D. Otherwise, the process stops at block 818D.

Figure 9:
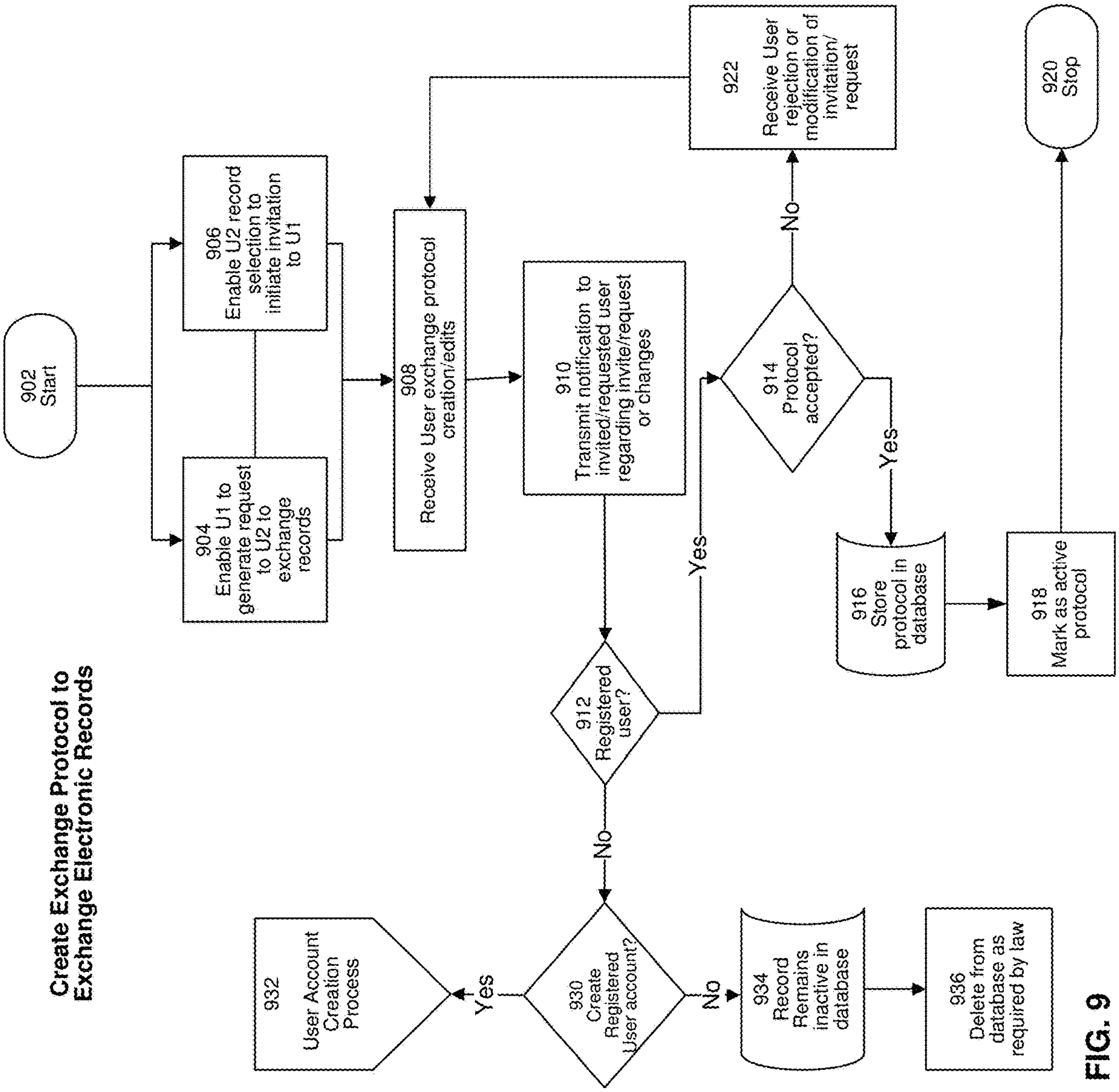

An example exchange protocol creation process is illustrated in FIG. 9. As will be described, the example process enables an invitation or request to create an exchange protocol useable to exchange data to be generated, enables a user to invite another user to view data, enables a user to request to view the data of another user, enables a user to accept a data sharing invitation or request, and/or enables a user to modify or decline a protocol. Once an invitation or request is accepted, data may be exchanged/shared and/or may be updated as permitted by a data exchange protocol. Optionally, a user does not have to have a registered account in order to use some or all of the data sharing services described herein. If the user does not have a registered account, information collected regarding the user may be deleted in accordance with privacy regulations and/or internal rules which may be stored in a rules data store.

At block 902, the process begins. At block 904, the process enables one user U1 to generate request to another user U2 to exchange or share data associated with an account of user U2. Alternately, at block 906, the process enables user U2 to generate an invitation to user U1 to exchange or share data associated with an account of user U2.

At block 908, the process receives, via a user interface, a data exchange protocol defined or edited by user U2 and/or user U1. For example, the protocol may enable a user to define start and stop dates for the data that will be shared, define what account statements are to be shared, how often data is to be shared, automatic sharing instructions, what alerts are to be provided, enable the user to set and data collection controls, and/or the like.

At block 910, if user U1 generated a data sharing request, the request may be transmitted to user U2, and the app installed on the device of user U2 may provide a corresponding pop-up notification. If user U2 generated a data sharing invitation, the invitation may be transmitted to user U1, and the app installed on the device of user U1 may provide a corresponding pop-up notification. In addition, a notification may be similarly transmitted in response to detecting data and/or protocol changes.

At block 912, a determination may be made as to whether user U1 and/or user U2 have a registered account with the data exchange facilitator computer system (e.g., by determining whether the user has submitted account credentials or activated a create new account control). If a determination is made that the user does not have registered account, the process proceeds to block 914. If a determination is made that the user is not an individual, the process proceeds to block 930.

At block 914, a determination is made as to whether the user(s) accepted the current data exchange protocol. For example, if user U2 generated the current data exchange protocol, a determination may be made as to whether user U1 accepted the current data exchange protocol. By way of further example, if user U1 generated the current data exchange protocol, a determination may be made as to whether user U2 accepted the current data exchange protocol.

If the data exchange protocol is accepted, the accepted protocol may be stored in an account associated with user U1 and/or user U2. At block 918, the accepted protocol may be tagged in the database as being in an active state (and so may be used for corresponding data sharing processes). The process may then stop at block 920.

If at block 912, a determination is made that the user (user U1 and/or user U2) does not have a registered account with the data exchange facilitator computer system, the process may proceed to block 930, the user may be queried as to whether the user wants to create an account, and a determination may be made as to whether the user responded affirmatively or not. If a determination is made that the user responded affirmatively, the process may proceed to block 932, and a user account creation process may be executed, as discussed elsewhere herein (e.g., with respect to FIG. 5A). If a determination is made that the user did not respond affirmatively, the process made proceed to block 934. The account may be tagged as inactive in the database and at block 936, the account may be automatically deleted as requested by relevant regulations or by internal rules (e.g., after the data sharing has completed in accordance with the protocol, after a specific amount of time, after the session is complete, or otherwise).

It is understood that Of course, user U1 and user U2 may invite each other to share data. Further, user U1 and user U2 may issue requests for data to each other. Optionally, user U1 and user U2 may store combined shared data in a collection. Optionally, user U1 and user U2 may share a collection of combined data.

Figure 10:
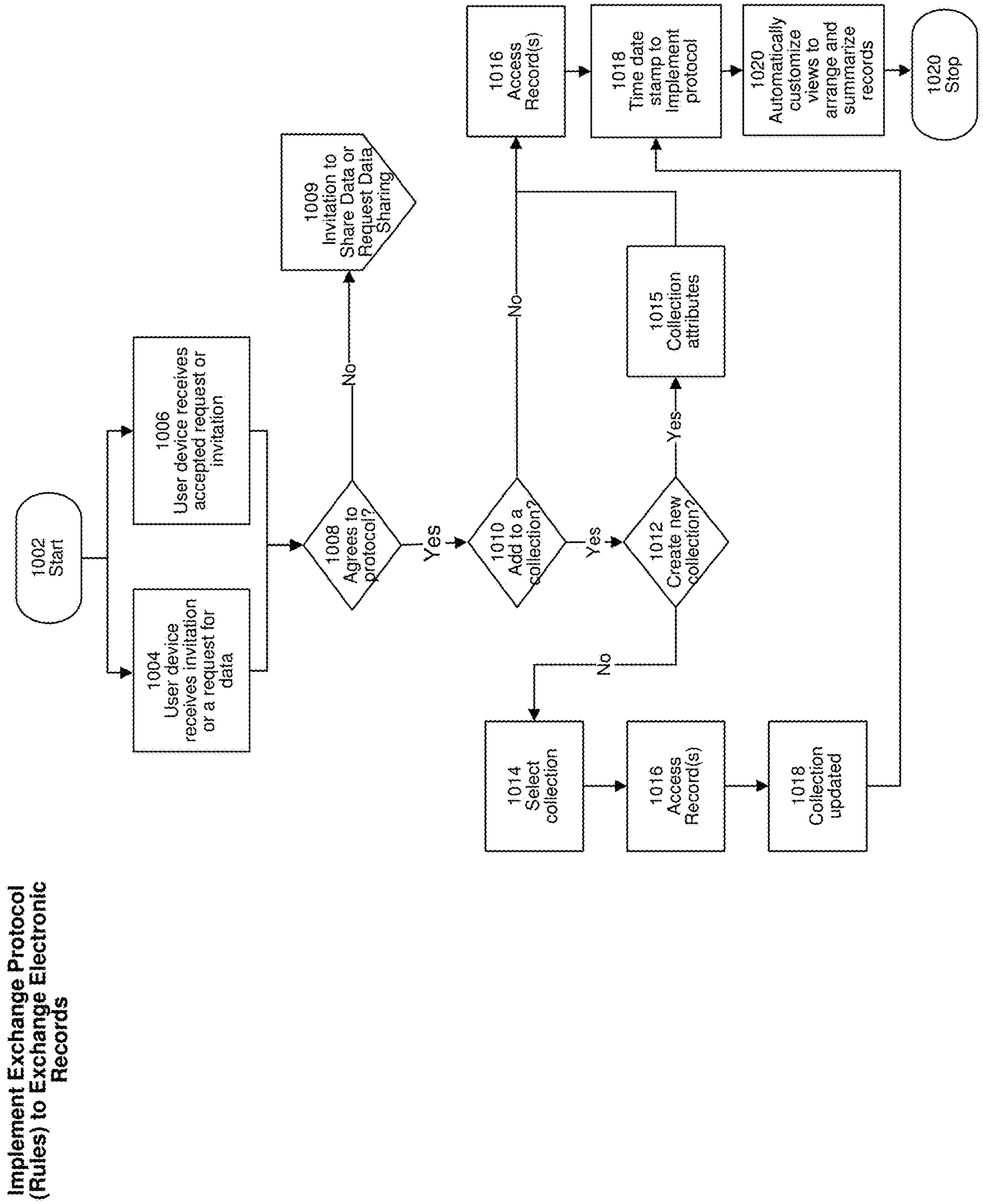

An example process of implementing a data exchange protocol will now be described with reference to FIG. 10. As described herein, the example process enables an invitation or request to create an exchange protocol to exchange data to be generated, enables a user to invite another user to view data, enables a user to request to view the data of another user, enables a user to accept a data sharing invitation or request, and/or enables a user to modify or decline a protocol. A user may or may not be a registered user with a registered account. The process may track data exchanges/sharing, update data, check for errors, enable users to combine data, and/or update records in a database. The process may delete records and collections of records by users and/or may remove access to records and collections of records by users.

At block 1002, the process begins. At block 1004, the process enables one user U1 to generate request to another user U2 to exchange or share data associated with an account of user U2. Alternately, at block 1006, the process enables user U2 to generate an invitation to user U1 to exchange or share data associated with an account of user U2. At block 1008, a determination is made as to whether the user(s) have agreed to a defined data exchange protocol. If agreement to the data exchange protocol is not received (e.g., within a specified amount of time after a user is queried as to whether the user agrees to the data exchange protocol) the process may proceed to block 1009. At block 1009, the process may proceed to a process for generating data invitations or data requests as described elsewhere herein.

If the data exchange protocol is agreed upon, the process may proceed to block 1010, and a determination is made as to whether the user U1 wants to add data being shared for or on behalf of the user U2 to a collection of data. If the user wants to add new data of user U2 to a collection, the process proceeds to block 1012, and the user U1 is queried as to whether the user U1 wants to create a new data collection. If an indication is received that the user U1 does not want to create a new collection, the process proceeds to block 1014, and the user U1 may select an existing collection of user U1 (e.g., using a file navigator or by entering a corresponding locator (e.g., a file path or a URL)). At block 1016, the process may access records corresponding to the selected data collection. At block 1018, the selected collection may be updated with the data of user U2, and proceed to block 1018.

If at block 1010, a determination is made that the user U1 does not want to add the data of user U2 to a collection, the process may proceed to block 1016.

If, at block 1012, a determination is made that the user U1 wants to create a new data collection, the process may proceed to block 1015, and the data collection attributes may be defined (e.g., the associated data sharing protocol, collection creation date, collection name, descriptive collection tags). At block 1016, the records being shared (as permitted by user U2 as described elsewhere herein) are accessed from the third party storage system. At block 1018, the accessed data may be time stamped and the protocol may be time stamps to ensure compliance with the data exchange protocol (e.g., the dates for which data is to be shared). At block 1020, the data views may be automatically customized to arrange and/or summarize the data records to reflect data and data types added to the collection. At block 1020, the process may stop.

An example process for removing a user's access to data records being shared/exchanged will now be discussed with reference to FIG. 11. As will be described, user access to data being shared or exchanged may be withdrawn (where the receiving user may maintain access with previously shared data but not future data). A user may be presented with options to withdraw access to data that is being shared or exchanged under a data exchange protocol, and data may be removed from view, and/or personally identifiable information data (PIID) may be masked to prevent the PIID from being presented in association with the data previously shared.

At block 1102, the process may start. At block 1104, user U2's selection of data to be shared is received, where the data is associated with a user U2 account with a third service provider. At block 1106, user U2's selection of a party (user U1 in this example) with whom the data is to be shared is received. At block 1108, a modification of the data sharing protocol is received from user U2, where the modification withdraws access to certain of the data previously being shared (which may apply to previously shared data and/or future data. At block 1110, a modification of the data sharing protocol is received from user U2, where the modification rescinds user U1's access to the data previously being shared.

At block 1112, the withdrawal of access to selected data and/or the rescinding of U1's access to the data are time-stamped (to verify when the withdrawal instruction was received). At block 1114, personally identifiable information data (PIID) of user U2 is removed/masked from the data records being shared with user U1 (the data records that were shared with user U1 previous to access withdrawal). At block 1116, the masked record, with the PIID of user U2 removed, replaces record retained by user U2. At block 1118, the data view may be automatically customized to arrange and/or summarize the data records (e.g., to remove the PIID of user U2 (e.g., user U2's name or nickname) while maintaining the record data, where the PIID may be replaced with an anonymous alphanumeric and/or graphic identifier). At block 1120, the process may stop.

Figure 12:
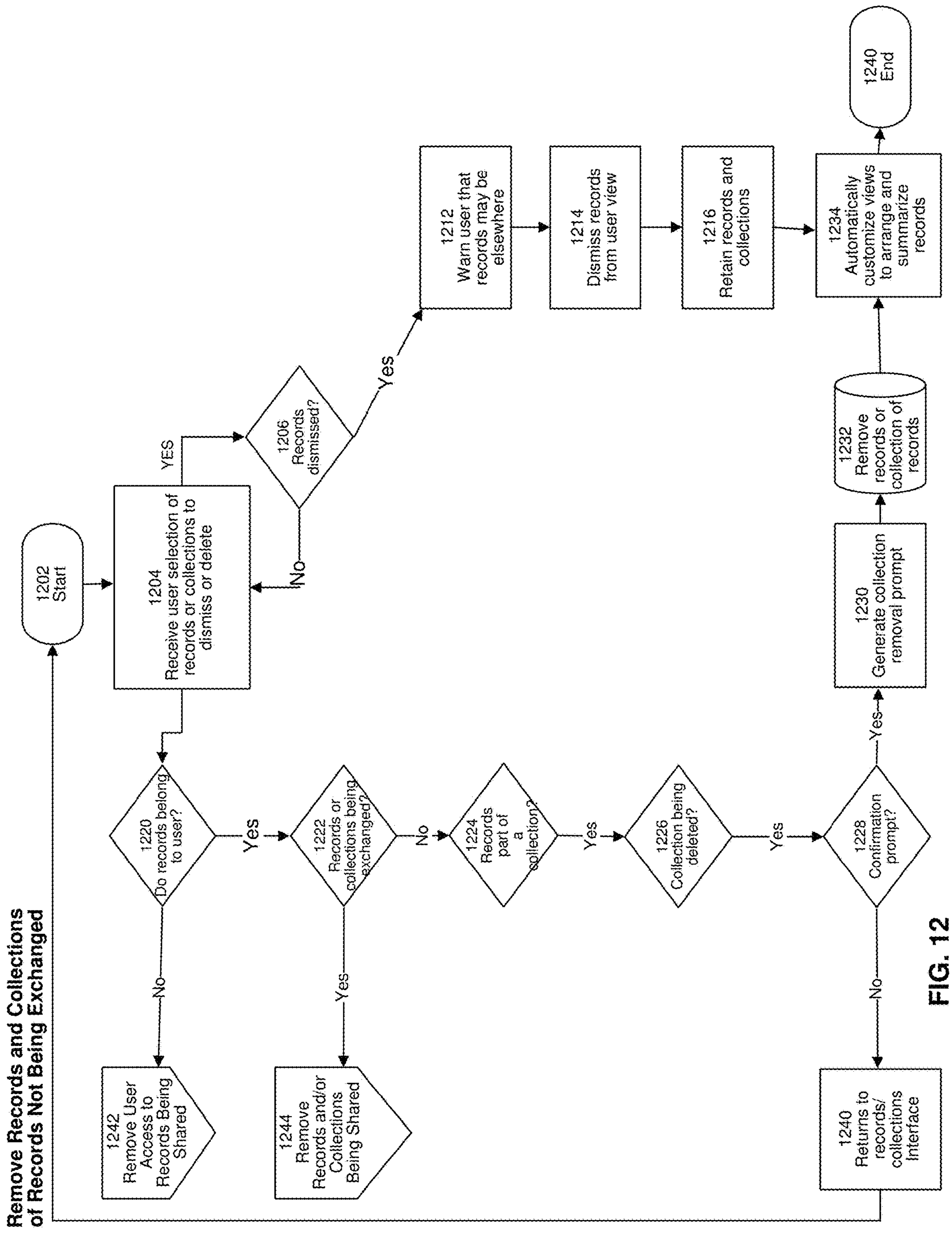

An example process for removing from view or deleting data records (not currently being shared/exchanged by the user) will now be discussed with reference to FIG. 12. As will be described, the process may enable the removal of records and/or collections that are not being exchanged or shared with another user in response to a user (e.g., user U2) instruction.

The process begins at block 1202. At block 1204, user selections of data records or collections to be dismissed from user views and/or deleted are received from a user device. At block 1206, a determination is made as to whether an instruction was received to dismiss selected data from user views. If a determination is made that an instruction was not received to dismiss selected data from user views, the process may return to block 1204.

If a determination is made that an instruction was received to dismiss selected data from user views, the process may proceed to block 1208, and the selected records or collections may be removed from the user view. At block 1210, the removal operations may be time stamped.

At block 1212, a warning notification may be generated and presented to the user warning the user that the deleted or dismissed records may still be available (e.g., where the records may still be maintained in a database but may be hidden from the user's view, such as from a user activity feed). At block 1214, the selected records may be dismissed from the user view. At block 1234, the data views may be automatically customized to arrange and/or summarize the data records to reflect the data that is to be removed from view. At block 1240, the process may stop.

The process may proceed from block 1204 to block 1220, and a determination may be made as to whether the selected records or collections belong to the user that made the selection (e.g., by comparing a user identifier associated with the user making the selection with a user identifier associated with the record).

Figure 11:
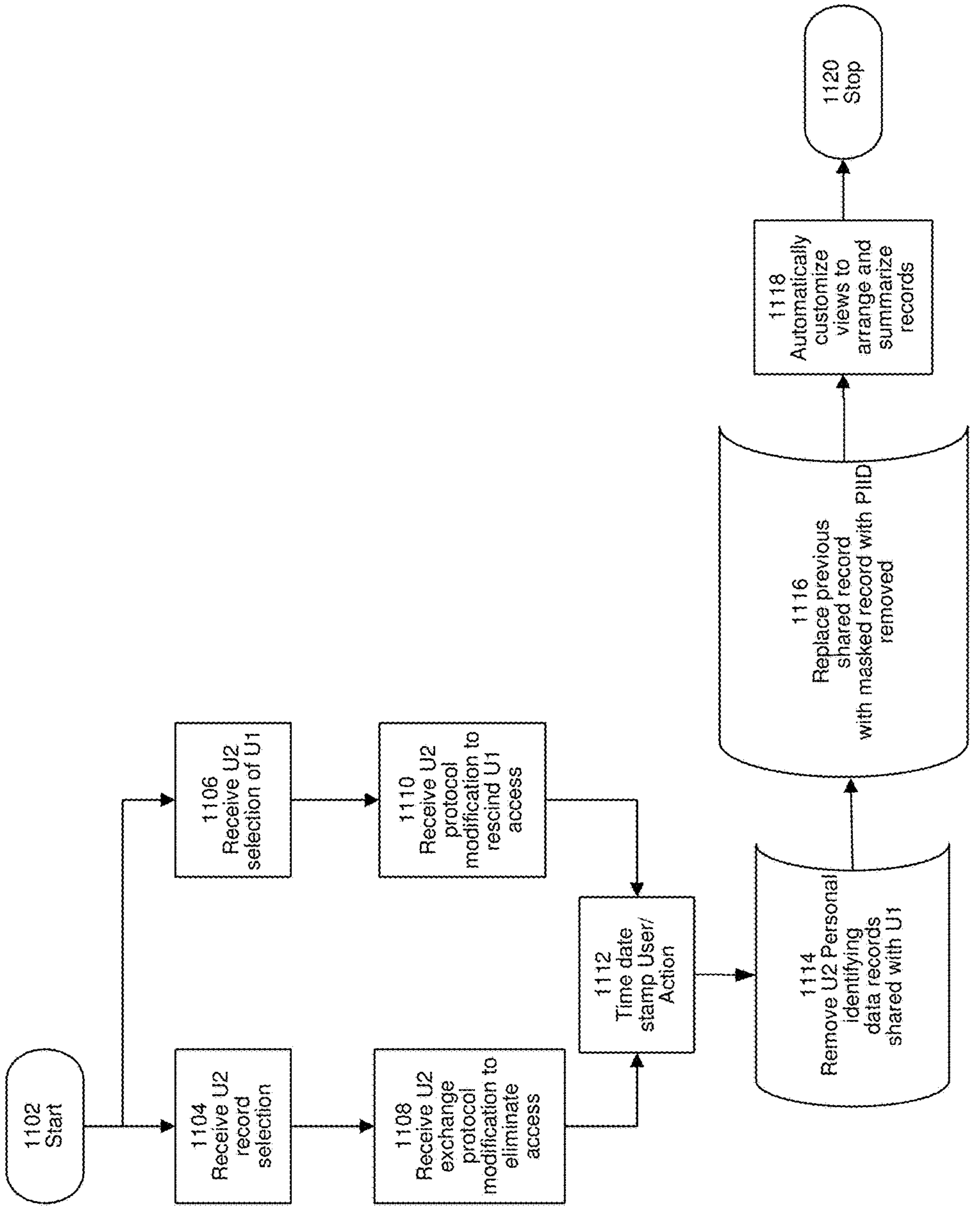

If the records do not belong to the user, at block 1242, the process may proceed to enable the removal of user access to data records previously shared (e.g., as illustrated in FIG. 11).

Figure 13:
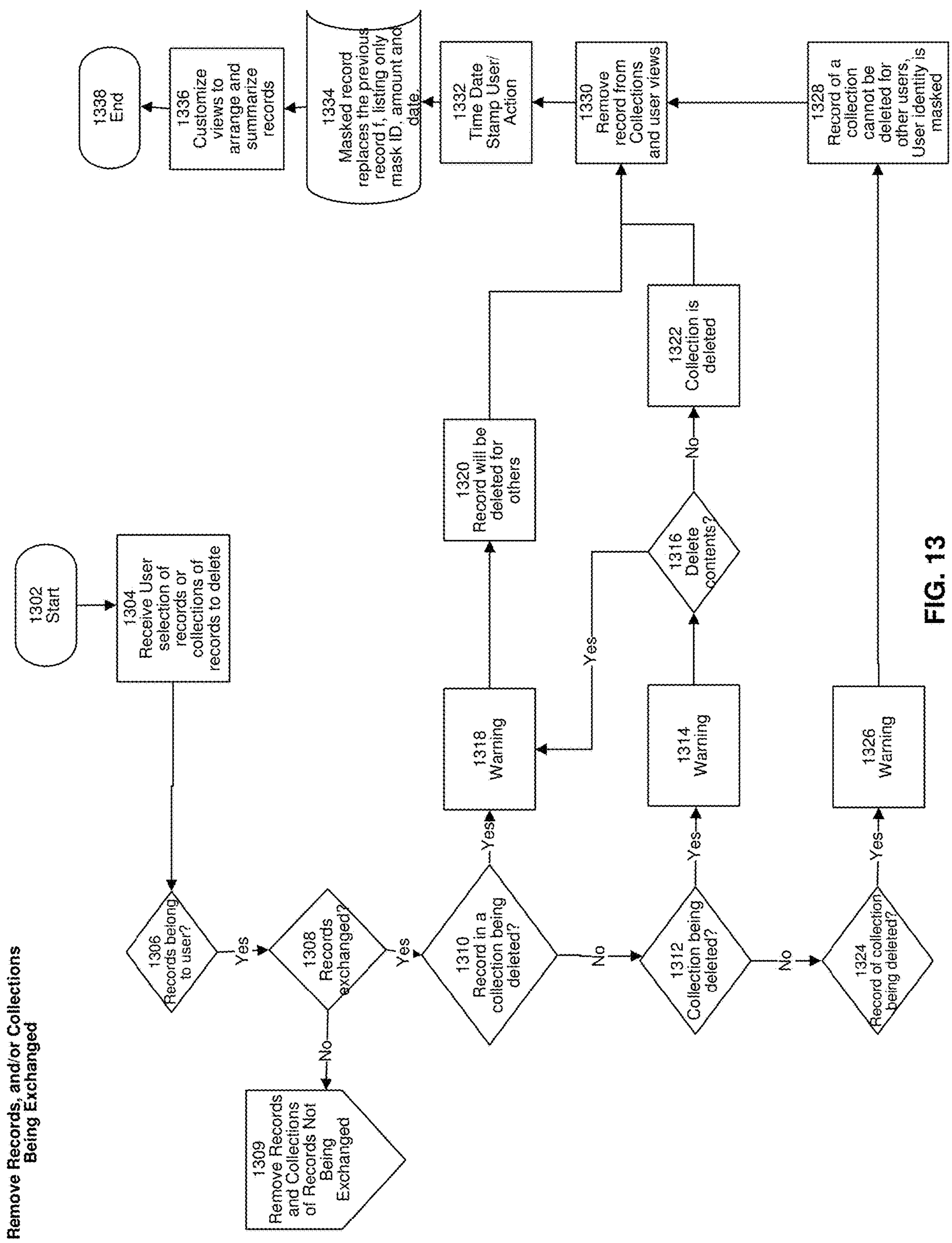

If the records do belong to the user, at block 1222 the process may determine whether data records or collections are being shared or exchanged. If data records or collections are being shared or exchanged, at block 1244, the process may proceed to enable the removal of records and/or data collections previously being shared (e.g., as illustrated in FIG. 13), otherwise, the process may proceed to block 1224.

At block 1224, a determination is made as to whether the selected records are part of a collection (if not proceed to block 1232). If a determination is made that the selected records are part of a collection, at block 1126 a determination is made as to whether the collection is being deleted (if not, provide notification that a collection but not records will be remove, and proceed to block 1232). At block 1128, a confirmation prompt may be presented to the user. If a cancel instruction is received from the user, the process may proceed to block 1240, and the process may return to the records and collections selection user interface.

At block 1230, if a confirmation instruction is received from the user, a collection removal prompt may be generated and presented to the user. At block 1232, the selected records and/or record collection may be removed. The process may then proceed to block 1234, as similarly discussed above.

An example process for removing data records and/or data collections that are being shared or exchanged will now be described with reference to FIG. 13. As discussed herein, the process enables a user to transmit a request to delete data records or collections (e.g., a folder, list, or other data set) that are currently being shared or exchanged under a data exchange protocol.

The process begins at block 1302. At block 1304, user selections of data records or collections to be deleted are received from a user device. The process may proceed from block 1304 to block 1306, and a determination may be made as to whether the selected records or collections belong to the user that made the selection (e.g., by comparing a user identifier associated with the user making the selection with a user identifier associated with the record).

If the records/collections belong to the user, at block 1308, the process may determine if the selected records/collections are currently being shared or exchanged. If a determination is made that selected records/collections are not currently being shared or exchanged, the process may proceed to block 1309, and a process for managing the removal of data records and data collections that are not being shared or exchanged may be performed (e.g., see FIG. 12). If a determination is made that records are being shared or exchanged, the process proceeds from block 1308 to block 1310, and a determination is made as to whether a data record in a data collection being shared or exchanged is to be deleted.

If a determination is made that a data record in a data collection being shared or exchanged is not to be deleted, the process proceeds to block 1312, and a determination is made as to whether a collection being shared or exchanged is to be deleted. If a determination is made that a collection being shared or exchanged is to be deleted, the process proceeds to block 1326 and a warning is generated and presented to the user. At block 1328, the user identity and other personal identifying information is masked in the records being shared with other users (but the collection record is not deleted for other users).

Referring again to block 1310, if a determination is made that a data record in a data collection being shared or exchanged is to be deleted, the process proceeds to block 1318, and a warning is generated and presented to the user. At block 1320, the record is deleted from the data collections of other users. At block 1330, the deleted record is removed from the views of data records and data collections of other users.

Referring again to block 1312, if a determination is made that a data collection being shared or exchanged is to be deleted, the process proceeds to block 1314, and a warning is generated and presented to the user. At block 1316, a determination is made as to whether the collection contents (the data records included in the collection) are being deleted. If a determination is made the contents are being deleted, the process proceeds to block 1318 and a warning is generated.

If a determination is made that the contents are being deleted, the process proceeds to block 1322 and the collection is deleted. At block 1330, the collection is removed from the view of users.

Figure 14:
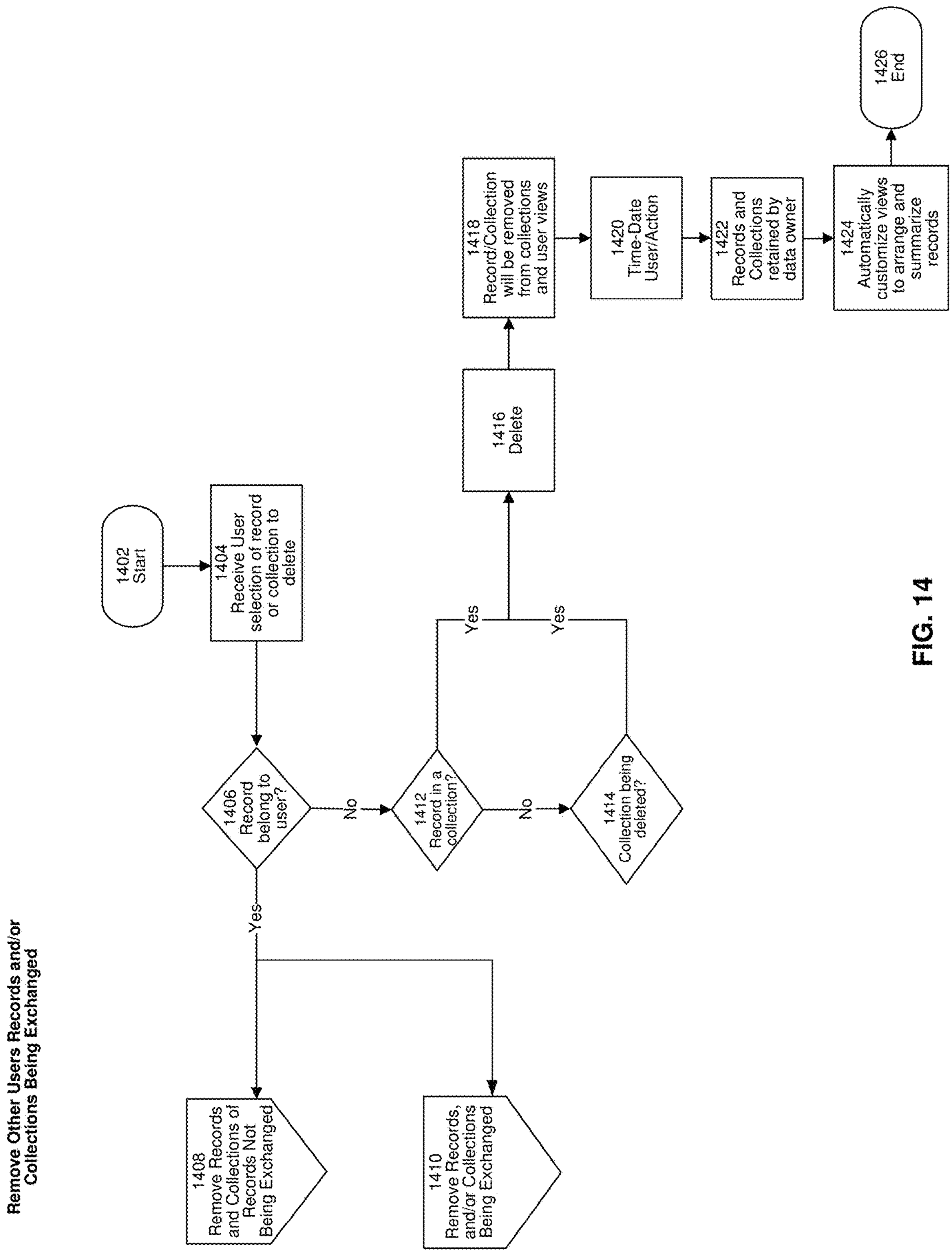

An example process for removing other users' data records and/or data collections that are being shared or exchanged will now be described with reference to FIG. 14. The process enables a user to delete user data, lists, and/or folders that are currently being exchanged or shared.

The process begins at block 1402. At block 1404, user selections of data records or collections to be deleted are received from a user device. The process may proceed from block 1404 to block 1406, and a determination may be made as to whether the selected records or collections belong to the user that made the selection (e.g., by comparing a user identifier associated with the user making the selection with a user identifier associated with the record).

If the records/collections belong to the user, the process may determine if the selected records/collections are currently being shared or exchanged. If the selected records/collections are currently being shared or exchanged, the process may proceed to block 1410, and a process for removing such records may be invoked (e.g., see FIG. 13). If the selected records/collections are not currently being shared or exchanged, the process may proceed to block 1408, and a process for removing such records may be invoked (e.g., see FIG. 14).

If, at block 1406, a determination is made that the selected records or collections do not belong to the user that made the selection (and instead belong to other users), the process may proceed to block 1412, and a determination may be made that the record is in a collection of records.

If a determination is made at block 1412 that the record is in a collection of records, the process proceeds to block 1416, otherwise the process proceeds to block 1414 where the selected record is deleted.

At block 1414, a determination is made as to whether an entire collection is being deleted. If a determination is made that an entire collection is being deleted, at block 1416, the selected collection is deleted (but not with respect to the record/collection owner).

At block 1418, the selected record or collection will be removed from user views, and if a record belonging to a collection is deleted, that record will be removed from the corresponding collection(s) (but not with respect to the record/collection owner). At block 1420, the deletion is date-time stamped. At block 1422, the owner of the selected record or collection may still access and view the selected record or collection. At block 1424, the data views may be customized to arrange and/or summarize the data records. At block 1426, the process may stop.

Figure 15:
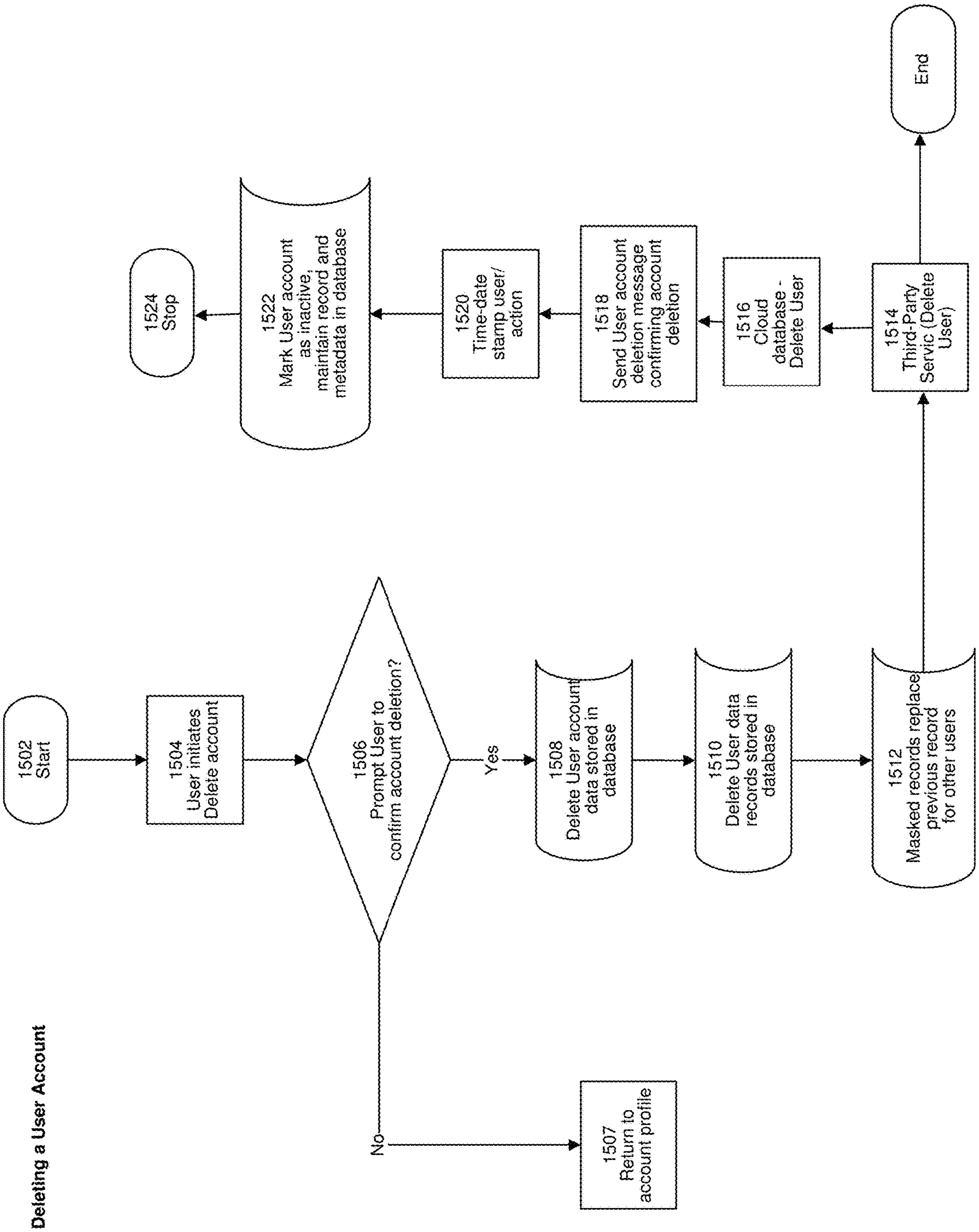

An example process of deactivating or deleting a user account will now be described with reference to FIG. 15. If the account is deactivated, the user records may be maintained in a database but the user may no longer be provided with access to the user records or system services. If the account is deleted, some or all of the user records may be deleted from the database. The process may begin at block 1502. At block 1504, a user request to deactivate or delete the user's account is received (e.g., from data sharing application on the user device). At block 1506, the user may be prompted to confirm the deactivation/deletion request to ensure that the account is not inadvertently deactivated/deleted. Optionally, the deactivation/deletion request is submitted via a control associated with the user account profile. In response to the user cancelling the account deactivation/deletion (e.g., by activating a cancel control), the process may proceed to block 1507, and a user account profile interface may be presented to the user.

If the user instead confirms the account deactivation/deletion request, the process proceeds to block 1508, and data in the user's account is deleted from a user account database or marked as deactivated accordingly, at block 1510, user records stored in the database may be deleted or the account may be marked as deactivated, and masked records (with references to personal identifiers of the user deleted, but where the other third party data associated with the user may be maintained and presented in association with an anonymous identifier) may replace records to which other users have access (where the replaced records may have included references to the user, such as user third party account data). At block 1514, user records may optionally be deleted from a third party data aggregator service database via an API, and at block 1516 user records may be deleted from a cloud database of the data exchange/sharing facilitator system. At block 1518, a user account deletion confirmation message may be generated and transmitted to user for presentation to the user via the user device. At block 1520, the deletion is date-time stamped. At block 1522, the user account is tagged as inactive, but optionally some or all the account records and/or metadata is maintained in the database (e.g., to enable the user to reactivate the user's account). At block 1524, the process ends.

Figure 16:
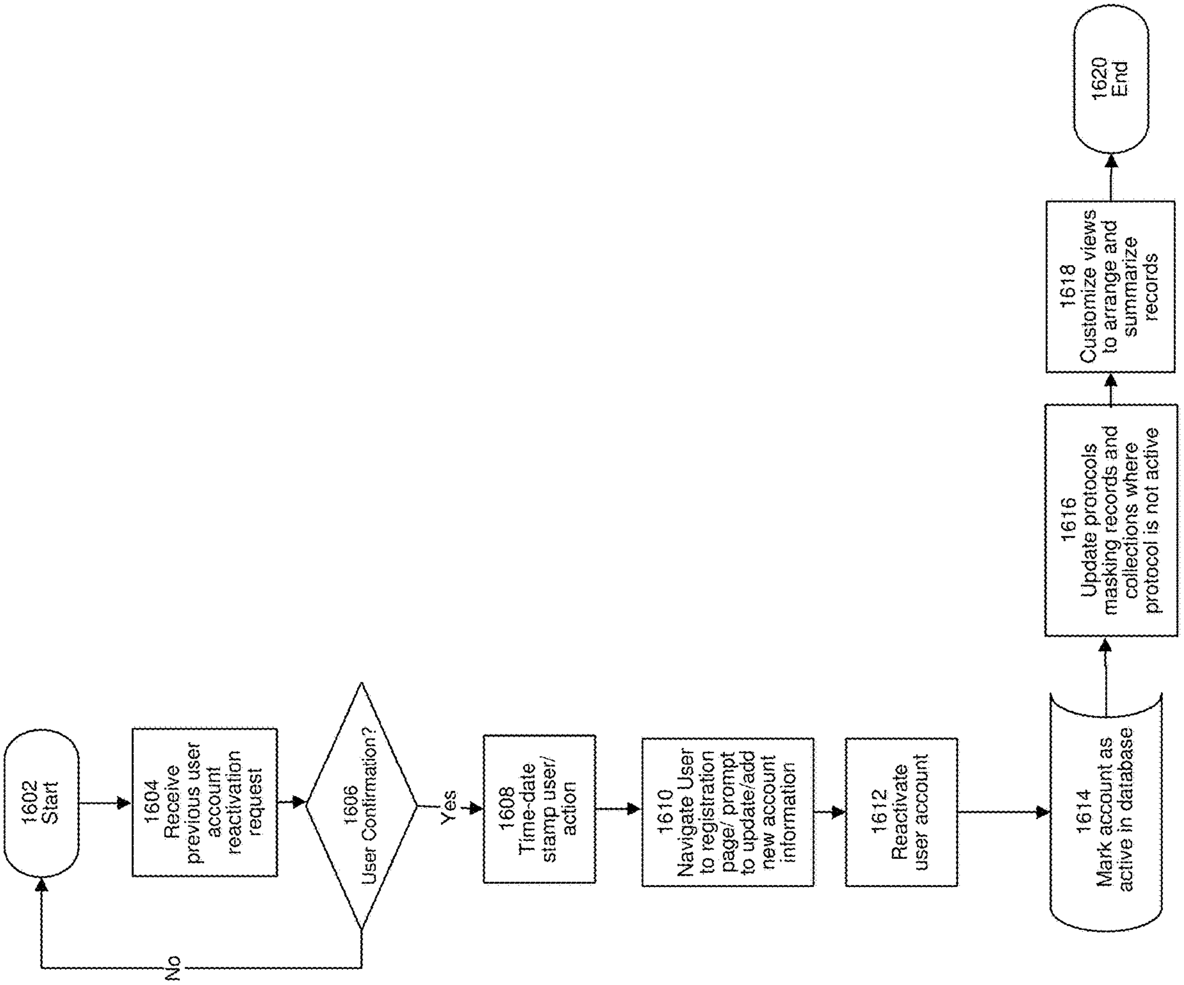

Optionally, even after the user deactivated the user's account, the user may reactivate the account. FIG. 16 illustrates an example account reactivation process. The process may begin at block 1602. At block 1604, a user request to reactivate the user's account is received (e.g., from data sharing application on the user device). At block 1606, the user may be prompted to confirm the account reactivation request, and a determination may be made as to whether the user confirmed the reactivation. At block 1608, the user reactivation request and confirmation are received. At block 1610, the user is navigated to a registration user interface, where the user is prompted to update and/or add needed account information. At block 1612, the user account is reactivated. At block 1614, the user account is marked as active in the user account database. At block 1616, data sharing protocols previously defined by the user or defined by other users for sharing data with the user may be automatically updated, so that the previously masked user identity and/or other user data are unmasked in records and collections shared by the user. At block 1618, the data views may be customized to arrange and/or summarize the data records. At block 1620, the process may stop.

FIG. 17 illustrates an example matrix which relates certain user instructions to actions taken by processes executed by the systems and devices described herein for different scenarios, the effect on corresponding data stored in a database, and the effect on data views and data access. For example, as illustrated by the matrix, a user instruction may be to dismiss data from an activity feed, delete data from a data collection, delete a data collection, delete a data view, delete a third party source of user-related data, delete other user (delete sharing with other user), deactivate account, and/or delete account. Example scenarios may include: where the data belongs to a user providing the instruction and the data is not currently being exchanged/shared with other users; where the data belongs to a user providing the instruction and the data is currently being exchanged/shared with other users; and where the data does not belong to the user. Example effects on the data stored in a database may be: data retained in database; data deleted from database; mask personally identifying information in data; and do not mask personally identifying information in data. Example effects on data views and access may include: leave data view and access intact/unchanged; and mask personally identifying information in data.

Certain example user interfaces will now be discussed with reference to FIGS. 18A-18I. Such user interfaces may be utilized to enable exchange of data within a peer-to-peer network that is maintained by a third party. The user interfaces may be accessed via a dedicated data sharing application installed on a user device and/or may be accessed via a browser from a Website where the user interface may be served by a web server.

Figure 18A:
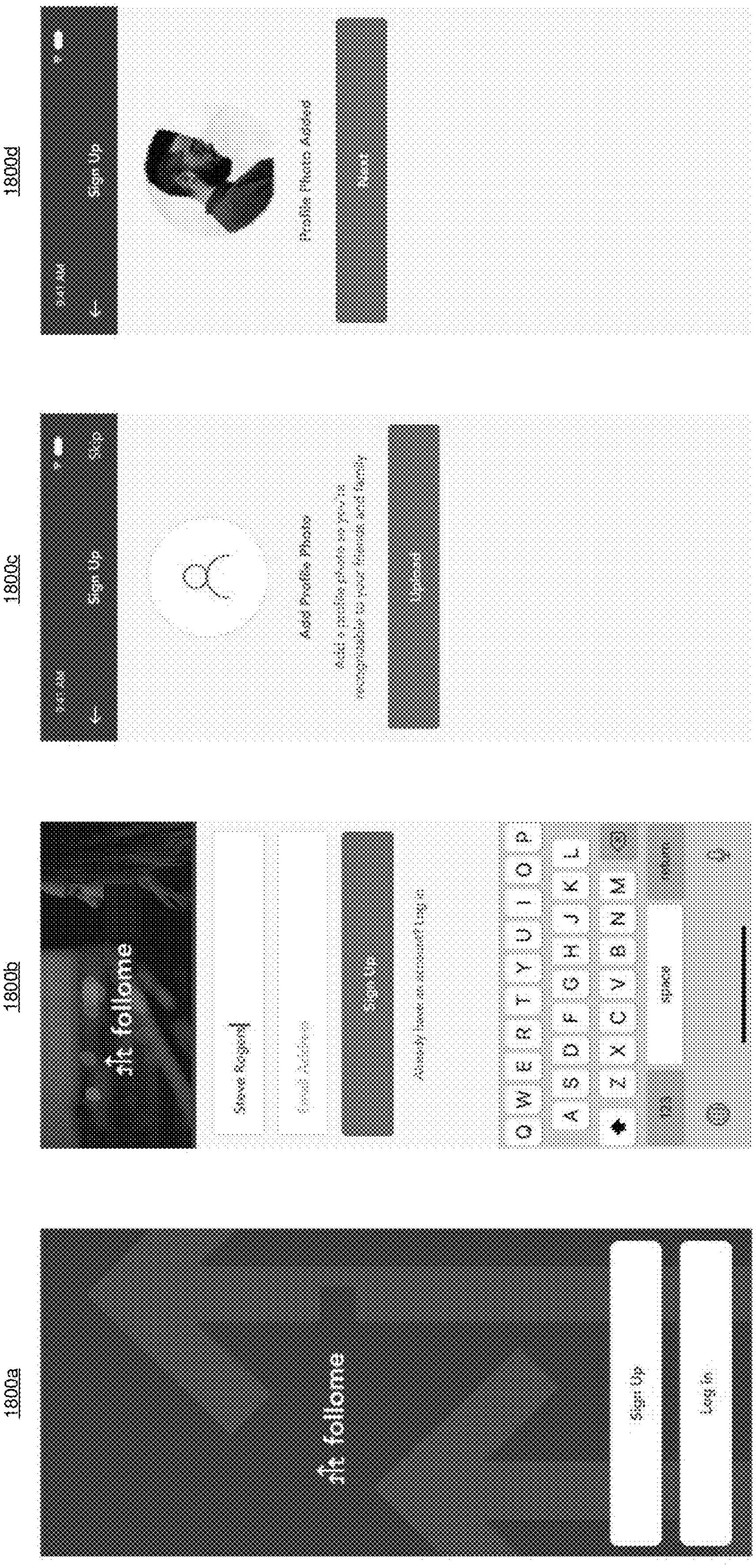
FIGS. 18A-18I illustrate example user interfaces.

With reference to FIG. 18A, the example user interfaces may enable a user may create an account and generate a user profile to utilize the data sharing/exchange services described herein.

User interface 1800*a* enables the user to sign up for a user account or log in to an existing account. User interface 1800*b* enables the user to enter a user name and contact information (e.g., email address, phone number, messaging address, etc.). User interface 1800*c* enables the user to select or upload a photograph or avatar to represent the user. User interface 1800*d* illustrates an uploaded user photograph.

Figure 18B:
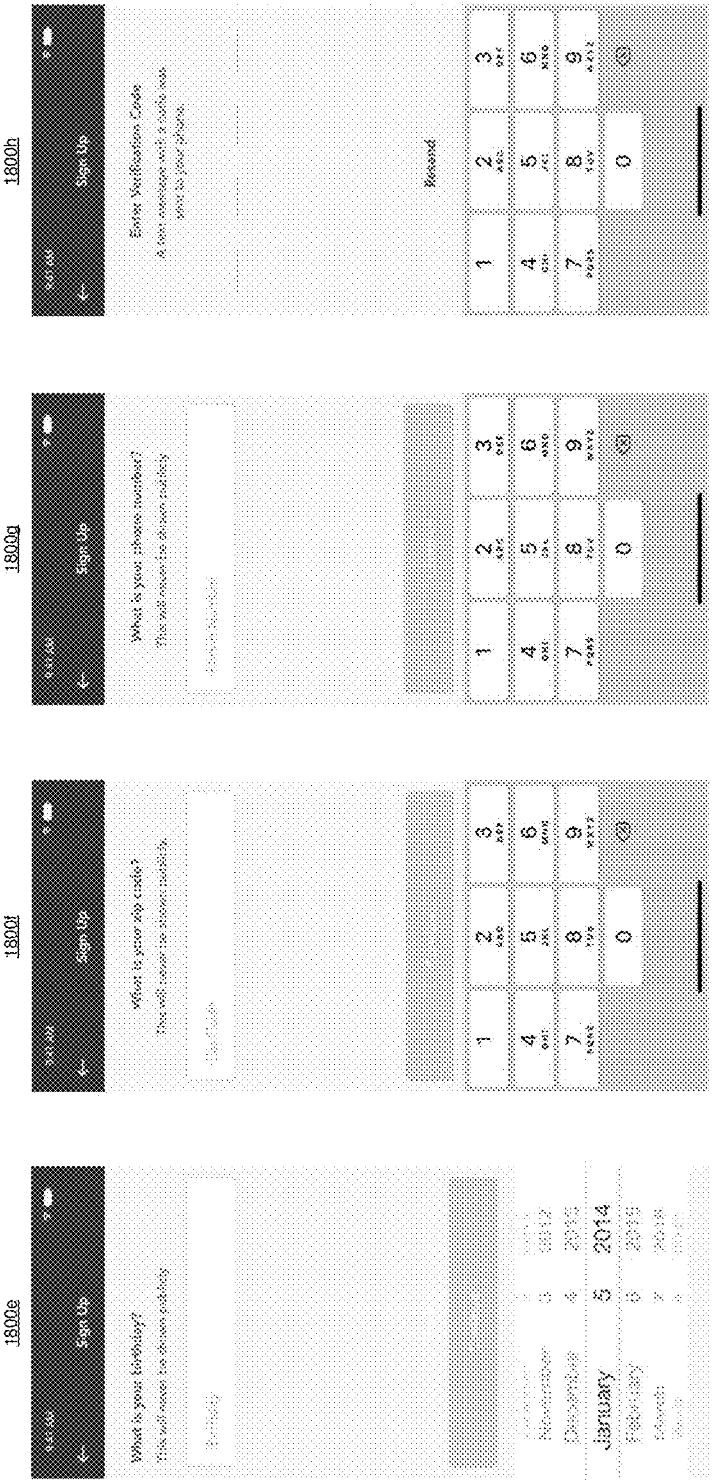

FIG. 18B illustrates example user interfaces utilized to verify a user's identify via data entered by the user (e.g., the user may enter a birthdate via user interface 1800*e*, a zip code via user interface 1800*f*, and a phone number via user interface 1800*g*). In addition, to further authenticate the user (e.g., using multifactor authentication) a verification code (e.g., an alphanumeric code) may be transmitted by the system to an electronic address in the user's account (e.g., via email to an email address, via a text message to an SMS/MMS/instant message address, etc.), provided as push notification, audibly, and/or otherwise. Optionally, the verification code may only be valid for a predetermined amount of time (e.g., 15 minutes, 30 minutes, 2 hours, etc.). User interface 1800*h* is configured to receive a verification code entered by the user. User interface 1800*h* may provide a resend control which the user may activate to request another verification code (e.g., if the previous verification code expired or if the user did not receive the verification code).

Figure 18C:
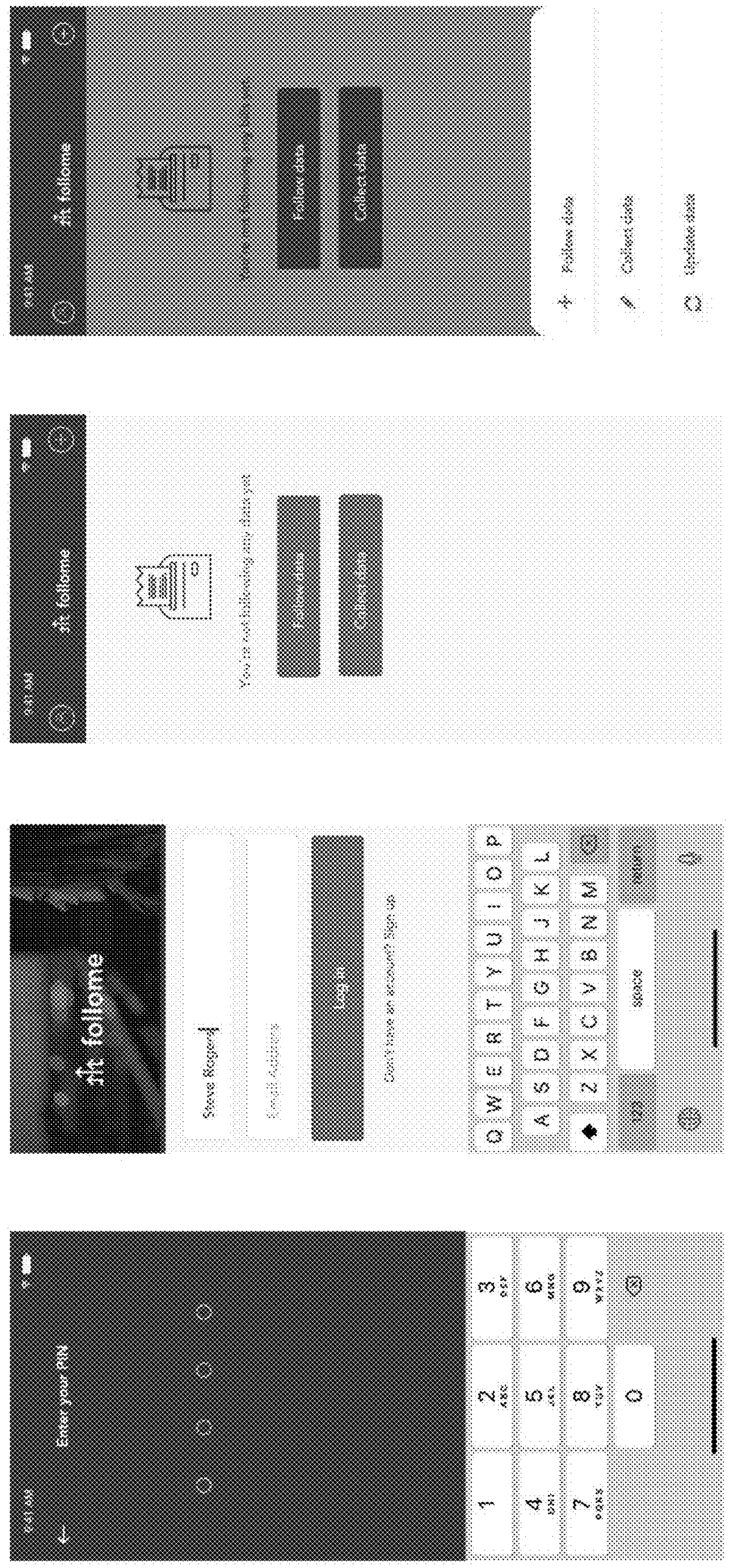

FIG. 18C illustrates example user interfaces that enable a user to submit authentication criteria and provide instructions regarding following or collecting data. User interface 1810*a* is configured to receive a personal identification number (PIN). User interface 1810*b* is configured to receive a user name and email address as part of the login process. User interface 1810C is configured to provide user-related activity status (e.g., "you are not following any data yet", "you are not collecting any data yet," "you are currently following the data of [x] number of other users," you currently have [x] number of data collections, etc.). User interface 1810C is configured to prompt the user to provide instructions, such as an instruction to follow the data of another user (e.g., by activating a "Follow Data" control to initiate a request to follow a second user who is a third-party account-holder for the data requested) or collect the user's own data (e.g., by activating a "Collect Data" control). User interface 1810*d* prompts the user to update data previously shared with other users (e.g., via an "Update data" control).

Figure 18D:
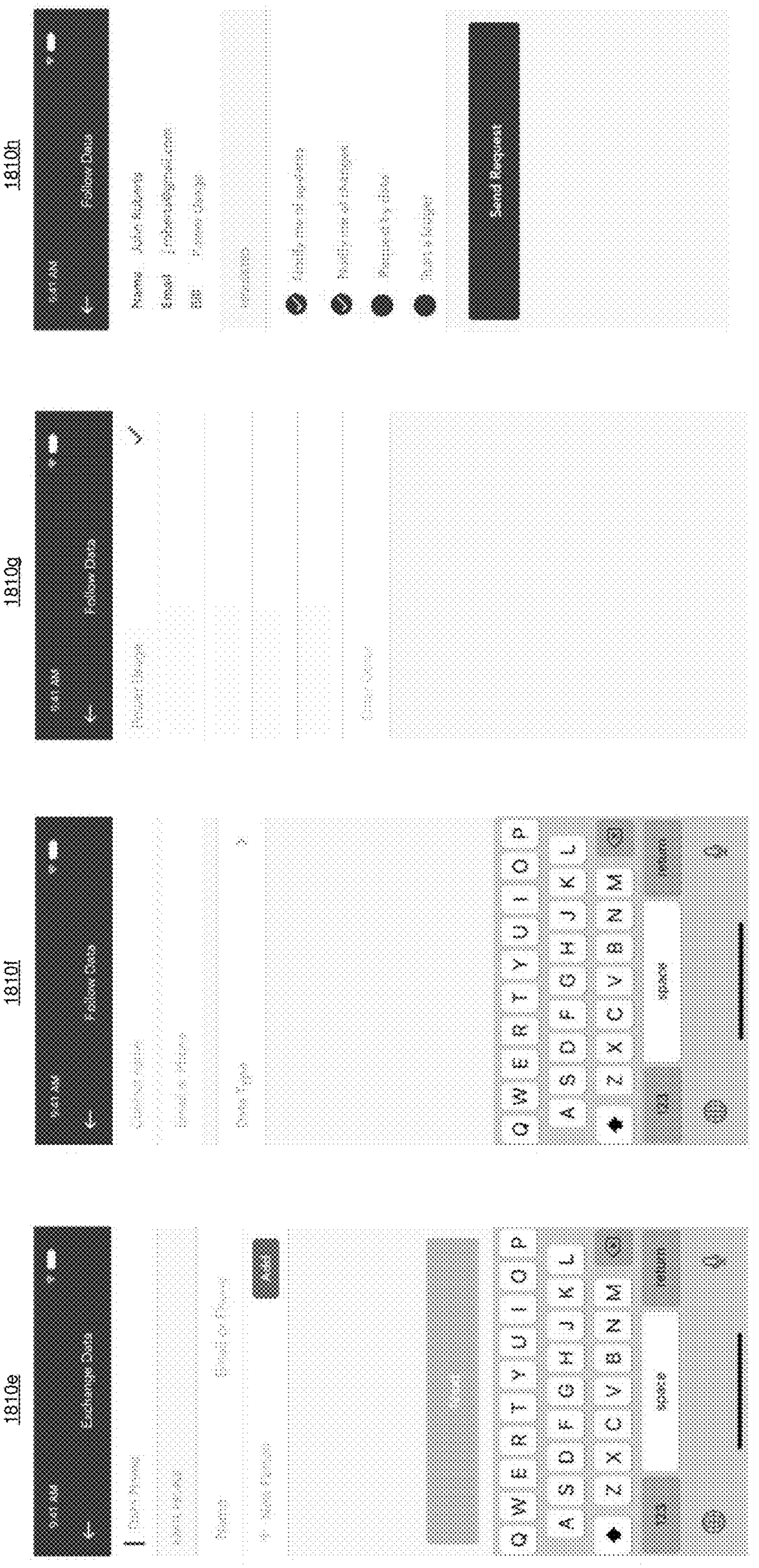

FIG. 18D illustrates example user interfaces that enable a first user to provide inputs for sharing/exchanging data and following data. User interface 1810*e* enables that first user, that wants to request to follow data of a second individual who is a third-party account-holder for the data requested, to enter information to initiate the request (e.g., a description of the data being requested and/or data that identifies a second individual whose data is being requested). User interface 1810*f* includes fields configured to receive (e.g., via a keyboard text entry or voice entry, or via selection of a contact record from the user's contact data store) the name and phone number of a second a second individual (who may not be a registered user of the system), and a data type corresponding to the data the user wants to follow. The user interface 1810*g* displays the data type(s) that the user specified (e.g., power usage, account balance, etc.). User interface 1810*h* provides a summary of the data with respect to the first user's data following request (e.g., name and email address of the person whose data is being following, the data type being followed, etc.) thereby enabling the first user to view and/or edit the request. In addition the user interface 1810*h* enables the first user to specify data reporting triggers (e.g., "notify me of updates" to receive a notification when the requested data is updated; "notify me of data changes" to receive a notification when the requested data is changed), and enables the first user to request data by date and request that a ledger be started to add the requested data to a data collection. A "send request" control is provided which when activated confirms and submits the data following request to the system.

Figure 18E:
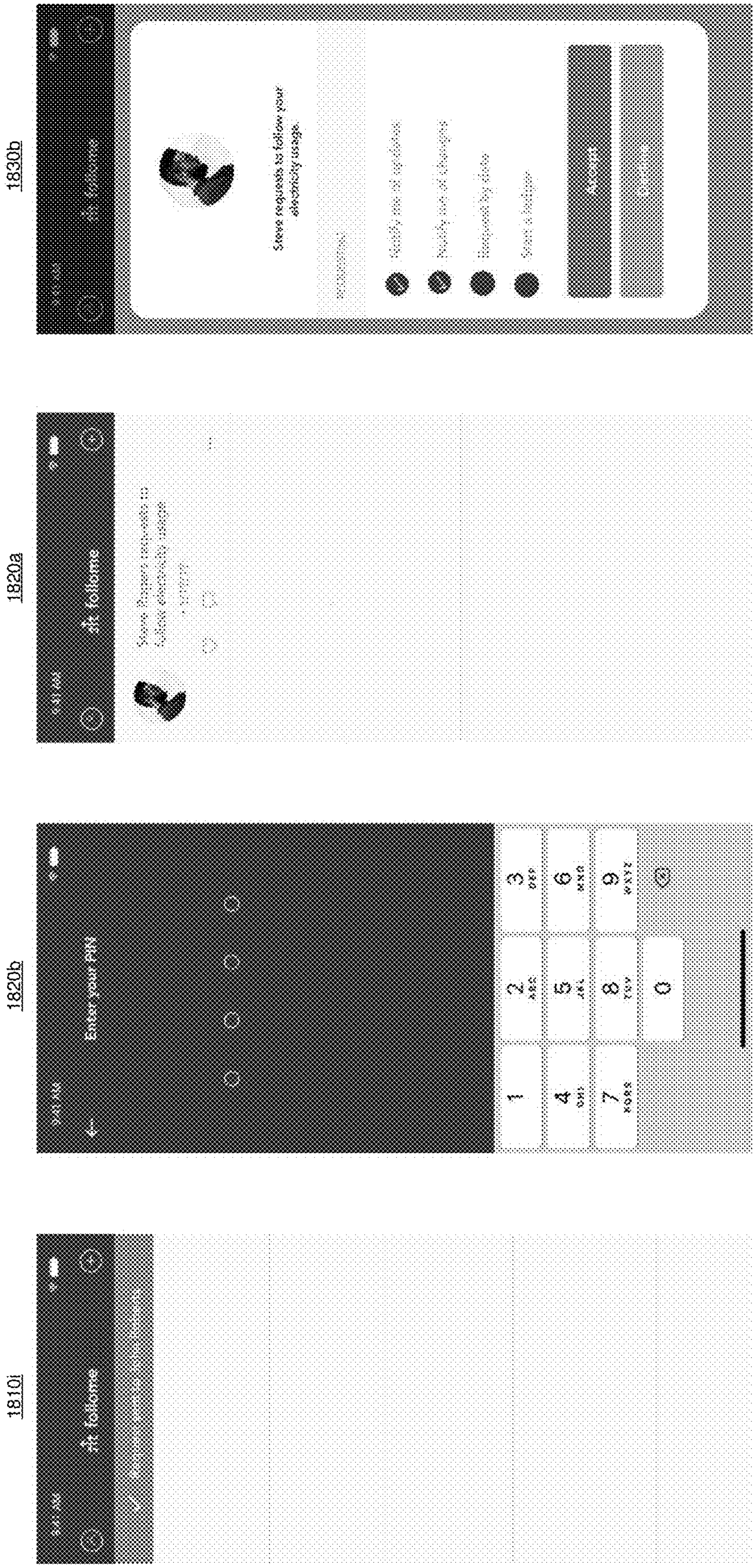

Referring to FIG. 18E, user interface 1810*i* provides a notification to the first user confirming that the data following request has been transmitted. User interface 1820*b* enables the user to access the dedicated data sharing application hosted on the first user's device. User interface 1820*a* (which may be provided by a dedicated data sharing application hosted on a second individual interface, may be provided via an email, may be provided via a short messaging service, may be provided by a webpage accessed via a link in a message transmitted to the second individual, etc.) provides the second individual with the first user's data following request. User interface 1830*b* displays the data notification triggers specified by the first user (e.g., data updates, changes in data), and whether the first user has requested data by date and whether the first user has requested that the second user with a third party be added to a data collection of the first user. User interface 1830*b* enables the second individual to accept, change access to the second user data, or decline the first user data-following request. Request. The notification of the acceptance, decline, or change by the second user may be transmitted to the first user. The first user may be required to accept changes made by the second user before the requested data may is shared with the first user.

Figure 18F:
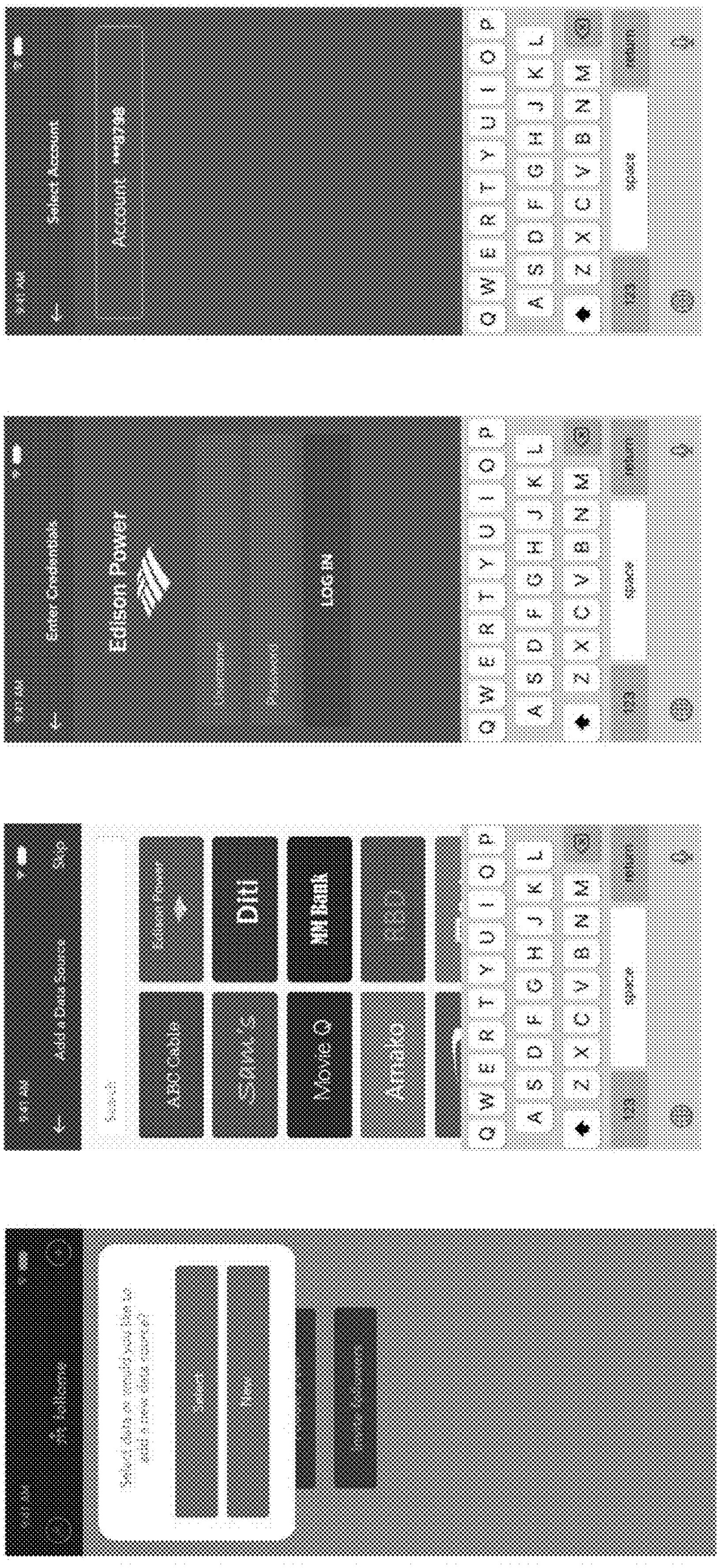

Referring to FIG. 18F, user interface 1840*a* provides an interface via which a user, whose third party account data is to be shared, may add third party data sources (e.g., at which the user has an account), enter credentials for such data sources, and may select an account with such data sources. User interface 1840*a* provides controls via which the user can indicate that the user wants to select a previously added data source or add a new data source. If the user selects the control to add a new data source, user interface 1840*b* may be presented (a similar user interface may be presented if the user wants to select an existing data source). User interface 1840*b* displays data sources from which the user may select (e.g., a list or table of names and/or logos of the data sources). A search field may be provided via which the user may enter a search query to search for data sources. The user search query may be transmitted to a search engine which may find matching data sources. The search results (which may be a set of data sources filtered from the originally presented data sources) may then be displayed to the user. In response to the user selecting a data source, a user interface may be presented with fields configured to receive user credentials for the selected data source. The user-entered credentials may be utilized to access the third party source, identify one or more corresponding accounts, and present a user interface via which the user can select and/or confirm an account from which data is to be shared.

Figure 18G:
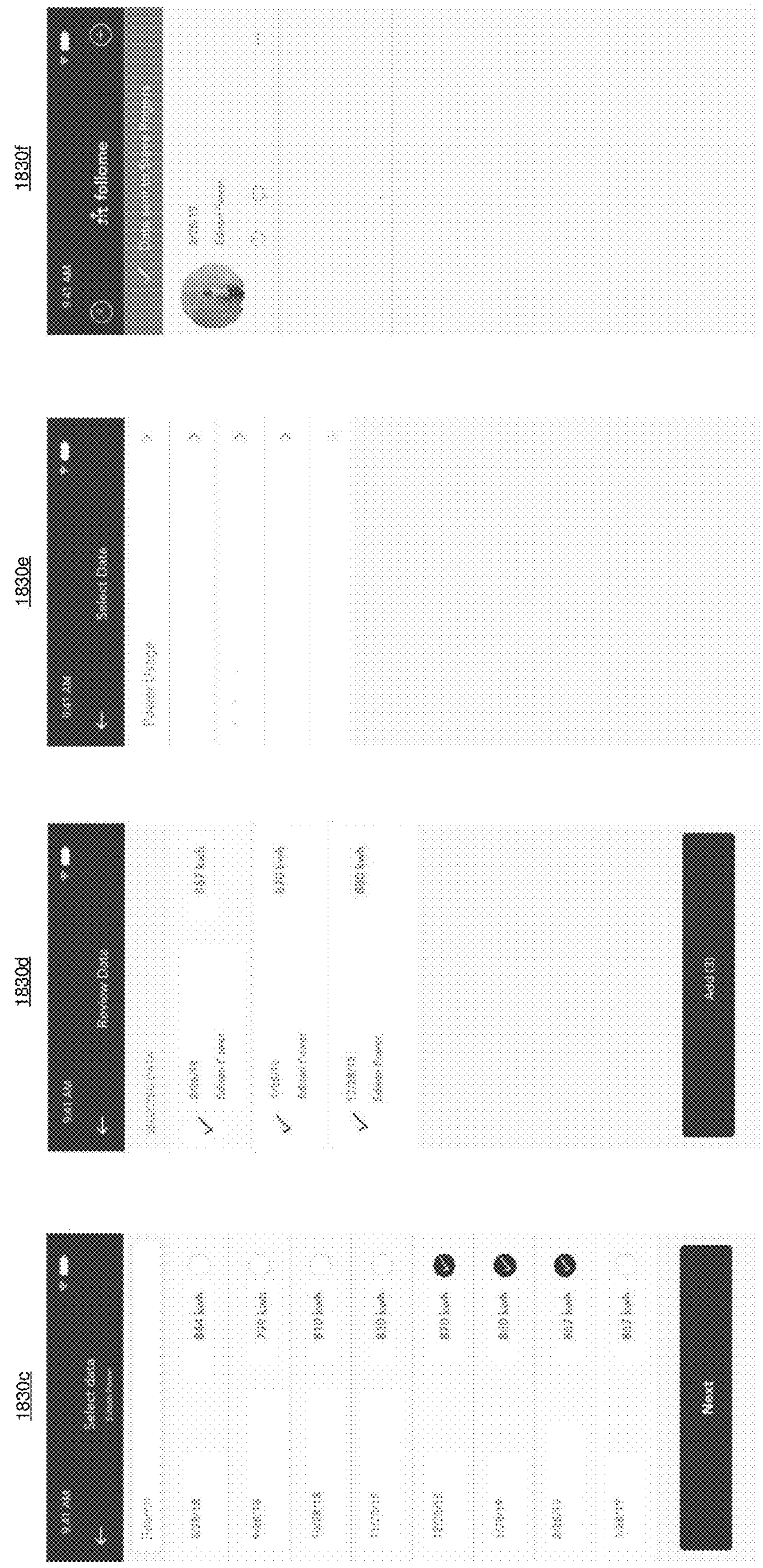

Referring to FIG. 18G, user interface 1830*c* provides an interface listing data associated with a data source account specified using the user interfaces illustrated in FIG. 18F. The user interface 1830*c* enables the user to scroll through, and select the data that is to be shared (e.g., in response to a data request from another user or as part of an invitation to share data). In this example, the user (whose data is to be shared) selected an electricity service provider account, and the listed data accessed from the electricity service provider account includes statement dates and the associated electricity usage associated with the corresponding statement. User interface 1830*d* displays the data selected by the user via user interface 1830*c* for review by the user. User interface 1830*e* enables the user to assign a label for the data (e.g., "power usage"), which may match the label assigned by the requesting user.

Machine learning algorithms may be utilized to detect errors in the user's data selection to ensure that the selected data selected matches the data exchange parameters accepted by the user and/or the requesting user. A notification may be transmitted to the user whose data is being shared and/or the requesting user when the requested data is transmitted to the requesting user. User interface 1830*f* may be used to provide the notification, which may include the date the data was shared, the name/identifier of the data source, and/or the label assigned to the data.

Figure 18H:
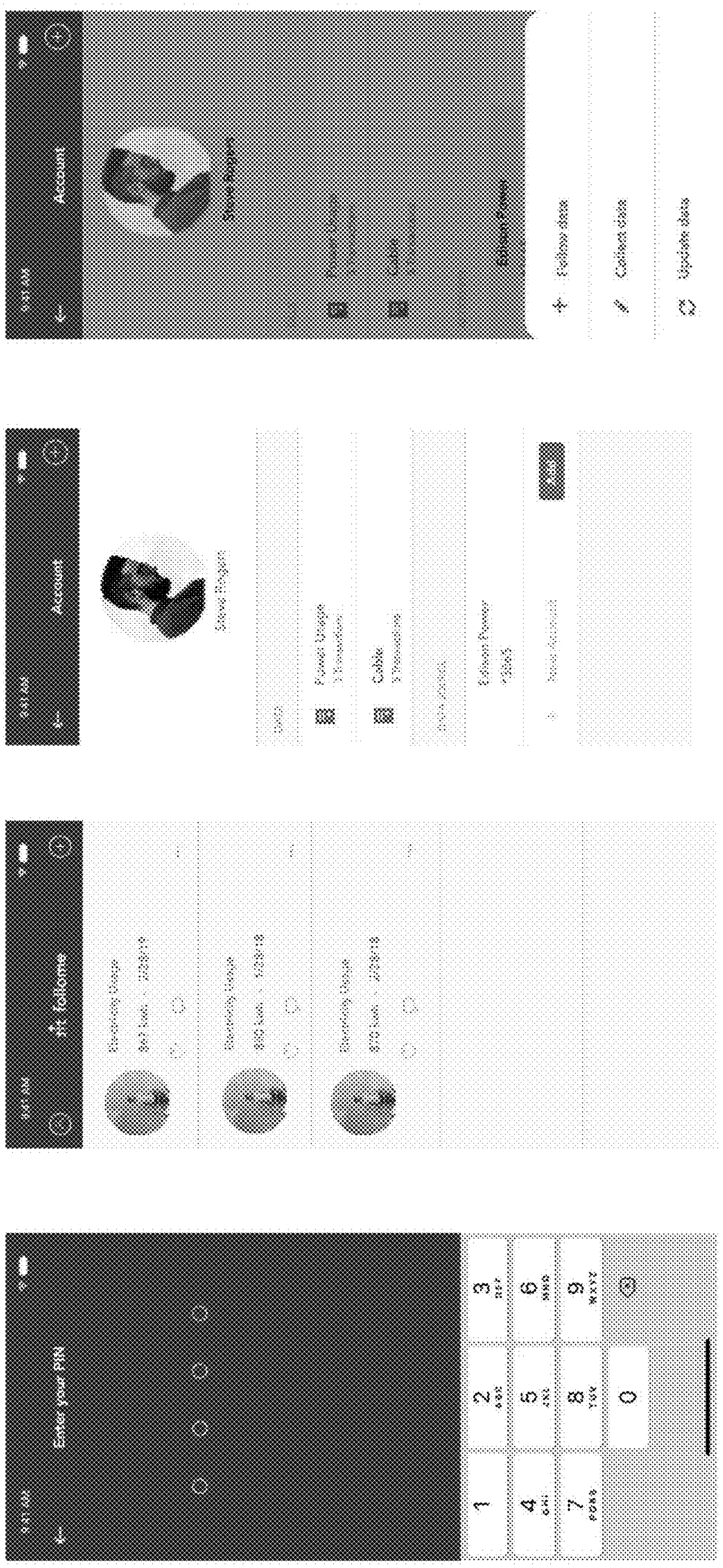
Figure 18I:
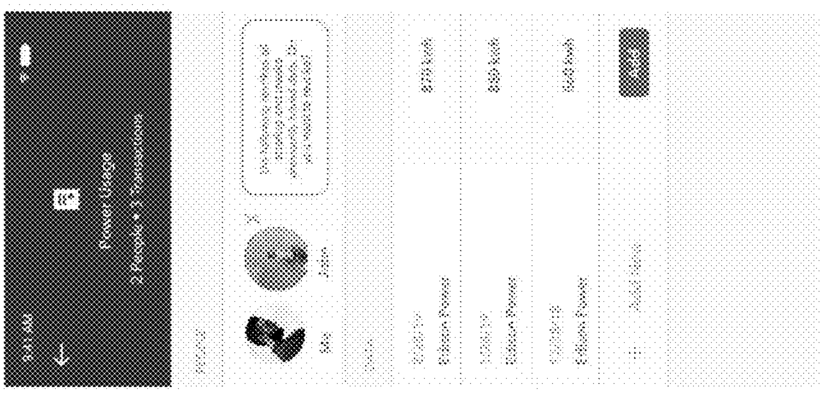

Referring to FIGS. 18H-18I, user interface 1810*h* provides an interface configured to receive a personal identification number (PIN) to enable a data requesting user to access into their account. User interface 1810*i* provides the requested data of a second user (e.g., accessed with a service provider account of a second user). The data may be presented in a form that matches that specified by the requesting user. The data may be displayed in association with descriptors that identify the data source and/or type of data, data date, and/or data quantity.

The data may be presented in association with communication interfaces, such as an interface that enables the requesting user to selectively provide positive or negative feedback for a selected item of data (e.g., by activating a like or dislike icon) and/or that enables the requesting user to conduct a chat session with the user whose account data is being shared. Thus, for example, the requesting user may provide emoji reactions, chat (e.g., via text, graphics, gifs, videos, and/or voice), and/or dismiss the data so that it is no longer present (e.g., in a user activity feed). User interface 1810*j* enables the requesting user to view and/or organize the data (e.g., if permitted by the user whose data is being shared). The requesting user may add data to a new or existing data collection and/or organize the data in folders. A given folder or collection icon may be displayed in association with a corresponding label, and in association with the number of data transactions associated with the collection of folder. The data source may be identified, optionally with a number indicating how many items of data from the source are stored in the folders and/or collections. User interface 1810*k* enables the user to follow the data, collect data, or update data. A user may filter and/or view the data through various parameters (e.g., by data source, by user, by date, by quantity, etc.). The requesting user may select, add their own third-party data to exchange with the user whose data is being shared.

FIG. 1810*l* enables either user to revoke data sharing, in which case the previously shared data will no longer be shared and may mask previously shared data from the requesting user's view and collections. Optionally, a notification will be generated and transmitted to both users regarding the revocation.

In FIG. 18H, a first user may enter personal identification credentials to log into computer software on a computer device (1810*h*). A first user may view data that has been exchanged by a second user (1810*i*) (e.g., the data may be presented in a form that matches a form the second-party requested, the data may have descriptors to identify the source and/or type of data, date, quantity; the data may be presented to allow the first-party to respond (e.g., emoji reactions, chat features, or dismiss the data). The data may be presented to enable the second user to view and/or organize the data if allowed by the user that provided access to the data (1810*j*) (e.g., a first user may add data to a new or existing collection or organize the data in folders. A second user may filter and/or view the data through various configurations (e.g., by data source, by user, by date, by quantity. Referring to FIG. 18I, when a second user permits a collection, a first user may select, add their own third-party data to exchange with a second user (1810*k*, 1810*l*). A first user or second user may stop exchanging information and/or may receive a warning (e.g. By terminating the exchange, no further data may be exchanged, previous records exchanged in the past may be masked.

Thus, systems and methods are described that enable secure sharing of content and other data over wired and wireless networks, optionally including selective peer-to-peer sharing of content.

Notifications described herein may be delivered and received by a short messaging service message (e.g., SMS, MMS, etc.), instant messaging, email, push notification, audibly, and/or otherwise. Data exchanged may be computable and/or non-computable personal, service, performance, financial, medical, commercial, utility, telecommunication data. Data may be exchanged by a user that may be an account holder of more than one third-party services/accounts. Data may be exchanged with one or more parties that are users. A user that is a non-account holder may be an individual or may be a business. Data exchange may require additional consents from the account holder. The method of exchange may enable one or more levels of user authentication.

Account data, as described herein, may be sourced from more than one third-party, such as a merchant (e.g., department store, pharmacy, auto dealer, grocer; an online service provider (e.g. Social media, games, travel, transportation; a telecommunications service provider (e.g., cell phone service; a municipal service provider (e.g., water or electric company; a government provider (e.g., motor vehicles, city or county records; a software as a service provider (e.g., an entertainment streaming service; utility software provider (e.g., calendar, planning; a service provider (e.g., bank, credit card, lender; a health and/or veterinary care organization and/or health or veterinary care, insurance; a score provider (e.g., personal fitness, sports organizer; an account aggregator, a processor or gateway that services multiple third-party systems.

Users may be enabled to communicate with each other through a chat feature. A user interface may be customized for the user. The data may retain third-party formatting or be reformatted and/or normalized in a data repository. Data may be linked between users and/or data sources to create collections of data that may be organized, summarized or categorized, and that may be viewed by parties. Collection of data may be distributed across computers to record activity (e.g., additions, deletions, data exchanges, in a verifiable manner (e.g., time-date stamp, biometrics, etc.). Data exchange protocols may be utilized to manage security features. Privacy features may be customized (e.g., start and/or stop date to exchange recurring data, un-sharing. Communication may be customized (e.g., security, alerts and/or notifications for errors, fraud, uncompleted tasks. Data use conditions may be customized (e.g., protecting data, data collections, disposition of data. Methods for user authentication when an account is created and/or the time a user logs in may be multifactorial (e.g., device, location, personal knowledge, biometrics, third party identifier).

An aspect of the present disclosure relates generally to digital communication systems and, more specifically, to systems and methods for establishing and enforcing secure communications through a relationship based trust architecture. The example disclosed systems utilize a relationship object, relationship validation material, and/or a structured relationship state model to deterministically govern communication acceptance, rejection, continuity, suspension, delegation, and/or revocation optionally independently of identity centric mechanisms such as account credentials, email addresses, device identifiers, or shared secrets.

This is in contrast to conventional digital communication systems that rely on identity based architectures in which trust is inferred from accounts, credentials, or channel specific identifiers such as phone numbers, email addresses, usernames, or federated identity tokens. These conventional techniques conflate identity with trust and force participants to infer authenticity from transient artifacts such as login sessions, transport metadata, or user specific secrets. Because these artifacts are independent of any durable relationship between communicating parties, they disadvantageously do not provide persistent, deterministic, or structured trust over time.

Further, conventional communication platforms do not unify inbound and outbound communication under a consistent trust model, and they treat communications across different channels as logically separate. As a result, inbound prompts or outbound messages may appear authentic despite lacking any verifiable trust relationship. Further, using such conventional communication platforms, continuity of communication cannot be assured across devices, delegated access, credential resets, or account recovery events. These limitations disadvantageously contribute to inadequately secure communications, undesirable user friction, operational complexity, impersonation attacks, account takeovers, and inconsistent enforcement of trust policies.

Further, such conventional identity centric systems lack structured mechanisms for representing and evolving trust states. Operations such as revocation, suspension, resumption, device changes, credential updates, or delegated authority are often handled through ad hoc procedures, leading to inconsistent behavior and increased vulnerabilities to attacks. Multi-device interactions, delegated access, and selective trust management are inhibited because conventional identity centric systems typically require re-authentication, duplication of credentials, and/or insecure out of band verification.

Accordingly, it would be technically advantageous to provide systems and methods that enhance communication security, and that define and enforce trust at the relationship level, independent of identity, while providing deterministic rules for communication acceptance, continuity, delegation, suspension, and/or revocation.

Systems and methods are described herein configured to establish, maintain, and enhance trust between communicating parties using an explicit relationship object associated with a relationship identifier (RID), relationship scoped validation material, and/or a structured relationship state model. As described herein, optionally, communications referencing the relationship identifier are deterministically evaluated based on the relationship state and validation material prior to any delivery or presentation. Validation may be applied uniformly across inbound and outbound communications and across a plurality of delivery channels selected for relationship based enforcement. For example, relationship-based validation may be applied across multiple communication channels, such as digital messaging, applications, web interfaces, voice systems, and/or automated devices, enabling a consistent, channel-agnostic trust layer. By way of illustrative example, a first communicating party may be a user operating a device (acting as a peer device) with a relationship-management application, while a second communicating party may be an enterprise system, brand, service provider, automated process, or other peer. Optionally, both communicating parties may be automated systems or devices. The disclosed techniques may optionally be applied to peer-to-peer, peer-to-service, and/or service-to-service communication environments.

The example system optionally operates without requiring personal identity information such as names, email addresses, phone numbers, account credentials, or shared secrets. Advantageously, the system maintains technical metadata (e.g., relationship-scoped data used to govern trust, continuity, state transitions, and the like) that support communication continuity, validation, and state governance. A trust ledger may store technical metadata (and excluding user names, email addresses, phone numbers, physical addresses, and the like, which may be collectively referred to as personal information) associated with the lifecycle and operation of a relationship. For example, a trust ledger may be utilized to record relationship scoped events and technical signals used to govern communication continuity, and relationship state transitions. The trust ledger may record such data as initialization, validated communications, continuity updates, delegation events, suspension and resumption, and/or revocation. Optionally, the trust ledger enables auditability, freshness verification, replay resistance, and/or deterministic enforcement across the lifecycle of a given relationship.

The ledger may further store entries reflecting transitions between relationship states, actions establishing or withdrawing delegated authority, suspension and resumption events, and revocation of the relationship. Additional metadata may include message or event identifiers and validation artifacts such as token digests, signature-verification results, counters, or other derived values. Collectively, these entries provide an authoritative, event-driven record that supports deterministic communication validation, continuity enforcement, and auditability throughout the duration of the relationship. The trust ledger thus serves as an authoritative, event-driven record associated with a given relationship object and is independent of global identity records, account credentials, or personal identifiers.

The trust ledger may be implemented using relational or non-relational databases, append-only logs, distributed storage systems, in-memory structures, or combinations thereof.

Thus, the trust ledger provides a technical foundation for auditability, freshness verification, replay resistance, and deterministic enforcement by maintaining an authoritative, event-driven record of relationship-scoped activity. As described, the ledger stores non-identity technical metadata such as initialization events, validated communication events, continuity updates, and state transitions, thereby creating a complete and auditable chronology of how a relationship evolves over time. Because the ledger also maintains expected continuity values (e.g., rotating and/or tumbling values, incrementing or derived sequence values, positional indicators, and time- and/or epoch-based freshness markers) a given incoming communication can be compared against ledger-derived expectations to ensure that it is fresh, properly ordered, and not a duplicate or stale transmission. Communications presenting continuity indicators that deviate from these expected values may be deterministically rejected, which provides inherent replay resistance and prevents attackers from injecting reordered, repeated, or forged messages. Because communication acceptance or rejection is governed strictly by the relationship state and the continuity checks recorded in the trust ledger (rather than identity-based authentication or probabilistic scoring) the system enforces communication rules in a predictable, state-driven, and channel-agnostic manner, ensuring consistent deterministic enforcement across the lifecycle of a given relationship.

Communication is a requisite for peer-to-peer data sharing. Continuity-enforcement would advantageously greatly enhance the security of such peer-to-peer data sharing as well as data sharing in non-peer-to-peer data sharing scenarios. Thus, the continuity enforcement techniques described herein may be applied to peer-to-peer data sharing as well. Rotating and tumbling values provide a deterministic continuity-enforcement mechanism by generating non-repeating, relationship-scoped indicators that evolve according to a defined progression policy and that need to match expected values stored or derivable from the trust ledger. Optionally, these continuity indicators may be produced using keyed pseudorandom functions, time-segmented rotation schedules, sliding-window derivation algorithms, and/or other deterministic generation techniques, and may be embedded directly into communications or computed locally by a peer device based on the relationship-scoped validation material. Because the trust ledger maintains authoritative expected continuity values for a given relationship, including the most recently validated rotating or tumbling value, the system can verify that an incoming communication's presented value aligns with the next expected value for the relationship's continuity sequence, thereby ensuring the message is fresh, properly ordered, and part of the legitimate progression of relationship-governed communications. A deviation from the expected value (e.g., a repeated value, a skipped value, a stale value from a prior epoch, or a value inconsistent with the deterministic derivation logic) causes the communication to be rejected or restricted, providing inherent replay resistance and preventing attackers from injecting reordered or forged communications that do not conform to the ledger-referenced progression. These rotating and tumbling values thus act as a cryptographically bound continuity signal that ties a given communication to the historical and expected future state of the relationship, enabling deterministic validation independent of identity, transport metadata, or probabilistic scoring.

The relationship state model disclosed herein defines states such as unestablished, provisional, initialized, engaged, active, suspended, and revoked (wherein a relationship is established once the active state is reached). In addition, a delegation overlay may be provided via which authority may be delegated by one entity (e.g., a company associated with a brand) to another entity (e.g., a marketing service that provides email/messaging marketing communication on behalf of the company/brand). It is understood that fewer or additional states may be used. For example, optionally the state model does not include a provisional state. Transitions are governed by relationship scoped signals and do not rely on identity authentication or probabilistic threat scoring. A given relationship is independent, enabling selective suspension or revocation without affecting any other relationship maintained by the same party.

As discussed elsewhere herein, identity may be utilized at bind-time for establishing a relationship and may not be part of the disclosed trust layer. Once the relationship is established at the active date, run-time enforcement may rely on relationship state and relationship-scoped artifacts, not identity attributes. For example, identity (or identity assurance) may be used to confirm the legitimate counterparties before a relationship is activated. The specific identity method may be policy-defined (e.g., brand-defined, context-defined, etc.).

At run-time, decisions may be made using relationship artifacts (e.g., relationship IDs, relationship state, validation material, continuity, policy, and/or the like). Advantageously, Identity attributes are not required to accept/reject communications or boundary operations. Rather, trust enforcement is relationship-state-based, not identity-based.

For example, optionally, during an initialization state, relationship establishment may include verification actions performed by a communicating party to confirm an intended counterparty prior to activating the relationship. Such verification actions may include identity verification, credential-based verification, and/or other measures determined by policy. Advantageously, the disclosed relationship-based enforcement does not require storage or processing of identity attributes for subsequent communication admission decisions once the relationship is established.

For example, during the initialization state, verification actions may be performed by one or more communicating parties, or by a system acting on behalf of a communicating party, to confirm that an intended counterparty is authorized to establish the relationship prior to transition of the relationship into an active state. As similarly discussed elsewhere herein, such verification actions may be executed at bind-time and are distinct from run-time communication validation, and may optionally be applied solely to ensure that the relationship is being established with the correct counterparty before relationship-scoped validation material is relied upon. Identity verification may be performed, wherein identifying attributes provided by a counterparty, such as name, contact endpoint, account identifier, or other asserted identity information, are validated using one or more identity assurance mechanisms selected according to policy. Identity verification may include comparison of supplied identity attributes against records maintained by an identity service, validation of possession of a claimed communication endpoint, or confirmation through an out-of-band challenge delivered to an asserted address or device, without requiring long-term storage or use of identity attributes after initialization.

In addition or alternatively, credential-based verification may be performed during the initialization state, in which a counterparty demonstrates authorization by presenting credentials, tokens, or cryptographic proofs associated with a service, device, or workflow context. Credential-based verification may include validation of account credentials, verification of a session token issued by a trusted system (such as the system described herein), confirmation of possession of a private key corresponding to a public key presented during initialization, or verification of a one-time or short-lived authorization artifact generated for the purpose of relationship establishment. Such credentials may be verified by a verification service or local validation logic and, upon successful verification, may be used to authorize creation of the relationship object and associated validation material, without binding the ongoing trust relationship to the credential itself.

For example, during the initialization state, cryptographic keys may be generated, exchanged, derived, or validated to establish relationship-scoped validation material used to govern subsequent communications. Optionally, the system may generate one or more asymmetric or symmetric cryptographic keys that are scoped to the relationship object rather than to a global identity or account. For example, during initialization, a communicating party or a system acting on its behalf may generate a public-private key pair, wherein the public key is provided to an intended counterparty or to a trusted intermediary, and the private key is retained in a protected storage location associated with the relationship. Possession of the corresponding private key may be demonstrated by generating a cryptographic proof, such as a digital signature over a challenge value or initialization payload, thereby confirming authorization to participate in the relationship prior to activation.

Optionally, key exchange or key agreement mechanisms may be performed during initialization to derive shared secret material without exposing the secret itself over a network. For example, the communicating parties may perform a key agreement protocol using exchanged public keys or ephemeral key material to derive relationship-scoped symmetric keys. The derived keys may be used to generate validation artifacts, continuity indicators, or message authentication values associated with the relationship. Such keys may be bound to the relationship identifier and recorded indirectly in the trust ledger through derived metadata or validation state, without storing raw key material or personally identifying information.

In addition or alternatively, keys used during initialization may be short-lived, single-use, or policy-defined initialization keys generated specifically to authorize creation of the relationship object. For example, a system may issue a one-time cryptographic token, signed assertion, or encrypted initialization artifact that incorporates a key-derived value. Presentation and successful validation of this artifact during initialization may authorize generation of long-term relationship-scoped validation material. Upon completion of initialization, the temporary key material or initialization artifacts may be invalidated, rotated, or discarded, such that ongoing communication governance relies only on relationship-scoped validation material rather than on the original initialization keys.

Optionally, key usage during initialization may further support device-based or delegated verification. For example, a device may be provisioned with a hardware-protected key or secure enclave key (a cryptographic key whose entire lifecycle, such as generation, storage, and cryptographic use, occurs inside a hardware-isolated execution environment called a secure enclave) that is used to sign or decrypt an initialization challenge, thereby confirming that the relationship request originates from an approved device. Similarly, derived keys may be generated to authorize delegated devices or agents during initialization, without transferring ownership of the primary relationship.

As similarly discussed elsewhere herein, upon successful completion of key-based verification during initialization, the system may finalize creation of the relationship object, generate or confirm relationship-scoped validation material, and record an initialization event in the trust ledger. After this point, the keys used for initialization need not be reused for run-time communication admission decisions. Instead, ongoing trust enforcement may be performed using relationship state, continuity mechanisms, and relationship-scoped artifacts derived from or authorized by the initialization process, thereby decoupling long-term trust governance from identity credentials, device identifiers, or initialization-time key exchanges.

The disclosed example systems and methods optionally enable delegated trust, in which derived validation material provides limited, scoped authority to a delegate (which may be referred to as a sub-peer) without transferring ownership of the underlying relationship. Optionally, pre-delivery verification is provided, in which communications selected for relationship bound delivery are validated at the point of origin and deterministically accepted or rejected before presentation to a receiving point.

The disclosed example systems and methods optionally enable binding of a relationship to service contexts and/or application workflows without converting the relationship into an identity account and/or without requiring storage of identity records.

In particular, the disclosed system defines a relationship object representing trust between communicating parties (e.g., parties computing over a network, such as the Internet). A given relationship is associated with a relationship identifier sufficient to distinguish it within a trust domain. For example, the relationship identifier may be configured to uniquely identify a specific relationship object within the scoped trust domain so that the system can unambiguously map an incoming communication to the correct relationship object and is resolvable to the relationship's validation material for deterministic verification. The relationship identifier advantageously does not reveal or depend on personally identifying information. Further, the relationship identifier is configured to be stable across the lifecycle of the relationship (e.g., initiated, engaged, active, delegated, suspended, revoked). In addition, the relationship identifier is configured to be referenced by communications such that pre-delivery determination (e.g., to accept or reject the communication) is enabled.

Associated validation material may include cryptographic tokens, derived values, hardware protected artifacts, and/or other technical indicators suitable for communication verification. Validation material may be generated, derived, or provisioned during initialization and may be rotated or updated according to a defined policy/rules.

The relationship state model defines states such as unestablished, initialized, provisional, engaged, active, delegated, suspended, and/or revoked, and then governs the behavior permitted under those states.

An unestablished state represents a state that occurs prior to the establishment of a trust relationship, wherein a relationship object has not yet been initialized or lacks sufficient validation material to govern communications. An initialization state is a state in which validation material has been established, enabling initial verification of communications for the purposes of initiating establishment of a trust relationship. Engagement represents a state in which one or more communications have been validated in accordance with relationship policy, and continuity or freshness mechanisms may be activated. An active state corresponds to a state in which the relationship is authorized to govern communications across one or more channels in a consistent manner and thus permits ongoing communication governance across channels.

A delegation overlay enables derived authority to be granted to additional devices or processes. A delegation enables additional devices, processes, and/or third parties are authorized to act within the scope of the relationship under derived permissions or validation material. Suspension represents a state that temporarily restricts or defers communications governed by the relationship in response to continuity violations, explicit actions, and/or policy conditions. A revoked state represents a terminal state in which the relationship is terminated and associated validation material is invalidated, such that subsequent communications referencing the relationship are rejected. It is understood that different types of states, number of states, and ordering of states may be utilized.

State transitions may occur automatically or semi-automatically in response to relationship-scoped events, such as validated communications, continuity updates, policy evaluations, administrative actions, and/or explicit instructions from a communicating party. Optionally, transitions may also be subject to timing constraints, thresholds, and/or rule-based criteria defined by system policy.

For a given relationship state, the system may enforce deterministic communication handling rules. For example, communications associated with an active relationship state may be accepted and processed, while communications associated with a suspended or revoked relationship state may be rejected or restricted without further evaluation. This enforcement may occur independently of channel, transport mechanism, or identity authentication. Because a given relationship is independently represented and governed, state transitions applied to one relationship do not affect other relationships maintained by the same communicating party. This enables selective suspension or revocation of trust with minimal operational impact.

The example trust ledger maintains an event driven record of relationship scoped events, such as communication validation results, continuity updates, state transitions, delegation actions, suspension, resumption, and/or revocation. Ledger entries contain technical metadata (but not names) and enable deterministic evaluation of communication freshness and sequencing (e.g., evaluate whether an incoming communication is recent, in-sequence, and not a replay, as determined by comparing continuity indicators in the message with the expected values stored in the trust ledger). Continuity mechanisms may include counters, sequence values, rotating indicators, time based markers, or hash derived progression references.

Continuity mechanisms employed by the system may rely on one or more technical indicators, such as rotating or tumbling values, incrementing or otherwise derived sequence values, ledger-referenced positional indicators, time-based or epoch-based freshness markers, and/or hash- or checksum-based derived indicators. These continuity values may be generated, updated, and/or derived in response to validated communications or other relationship-scoped events, and may be recorded directly in the trust ledger or otherwise computed from ledger-maintained metadata. Subsequent communications associated with the relationship may be evaluated against the expected continuity values to determine whether they conform to the anticipated progression of the relationship, thereby enabling deterministic resistance to replay attacks, spoofed messages, or out-of-sequence communication attempts.

Continuity in a relationship-based communication framework may be enforced through a variety of deterministic mechanisms that ensure each communication aligns with the expected progression of the relationship. In some embodiments, rotating or tumbling values are generated according to a deterministic but non-repeating progression algorithm, such as a keyed pseudorandom function, a time-segmented rotation schedule, or a sliding-window value derivation. These rotating values may be embedded within communications or derived locally by a communicating party based on shared relationship-scoped validation material. Because the expected value for any time window or communication sequence is derivable from the trust ledger or associated relationship metadata, the system can detect replay attempts, stale messages, or forged continuity indicators by comparing communicated values against the ledger-derived expectations.

Incrementing or otherwise derived sequence values may also be used to enforce strict ordering. For example, each validated communication may increment a monotonically increasing counter maintained within the ledger, and subsequent communications must present a sequence value equal to the next expected counter value or within an allowable delta window. Deviations—such as regressions, duplicates, or out-of-range increments—may indicate tampering, message omission, or reordering attacks and may cause the system to reject or suspend communication continuity for the affected relationship. In other embodiments, the sequence value may be derived through a cryptographic accumulator, hash chain, or key-evolution function, providing both ordering guarantees and tamper-evident linkage between consecutive communications.

Ledger-referenced positional indicators provide another mechanism for continuity enforcement. The ledger may maintain a canonical log position, state transition index, or communication ordinal associated with the most recently validated event. Incoming communications may include a positional indicator referencing the expected ledger location-such as a pointer, index, digest of the last known ledger entry, or a compound value derived from multiple ledger fields. If the positional indicator does not correspond to the ledger's stored state, the system may infer that the communication is inconsistent with the established sequence, enabling deterministic rejection prior to processing.

Time-based or epoch-based freshness markers may also be used to guarantee temporal continuity. Communications may embed timestamps, epoch counters, or validity intervals that must fall within a tolerance window defined by policy or derived from ledger-maintained timing information. Freshness markers may be cryptographically bound to the communication to prevent tampering and may be validated against ledger-recorded timing signals such as last-seen timestamp, expected next epoch, or maximum permissible drift. This ensures that communications cannot be delayed, replayed, or reordered outside permissible timing bounds, even when the underlying communication channels do not guarantee timing integrity.

Hash- or checksum-based derived indicators further enhance continuity by binding each communication to prior validated states or data. In one embodiment, each communication may include a digest computed over selected fields of the previous communication, the current continuity value, or the current relationship state. This creates a hash-chain or rolling integrity check that ensures any attempt to modify, omit, or insert communications is detectable through mismatched digests. The trust ledger may maintain the authoritative digest or checksum for the most recent validated communication, and any incoming communication must include a derived indicator that matches the value computed from the ledger. This provides tamper evidence and prevents attackers from injecting messages that appear contextually plausible but do not align with the precise historical progression of the relationship.

In combination, these continuity mechanisms provide a layered defense that detects stale, forged, reordered, or replayed communications even in environments where the transport layer cannot be trusted. By deriving continuity expectations exclusively from relationship-scoped validation material and ledger-maintained metadata, the system ensures that each communication aligns with the deterministic progression of the relationship, thereby providing strong authenticity and sequencing guarantees independent of identity, credentials, or channel-specific verification techniques.

When a communication is submitted for delivery or verification, its continuity indicators (values included in a given communication that enable the system to verify freshness, ordering, and replay-resistance) are compared to expected values derived from the ledger to determine if they match. Communications satisfying these criteria are accepted while communications failing are rejected or restricted.

The system enables relationship initialization through explicit actions such as user interface interactions, device exchange events, scanning of machine readable codes (e.g., from a webpage, application user interface, physical document, and/or the like), workflow activation, and/or software based triggers. For example, a workflow activation may comprise a system driven or process driven event that programmatically initiates creation of a relationship object, its validation material, or a trust governed communication pathway. An example workflow activation may comprise detecting that a user has initiated an onboarding flow (e.g., opening a new secure messaging channel, creating a case file, initiating a transaction, etc., via a peer device/system), which automatically activates a workflow that creates the relationship object, generates validation material, and/or records the initialization event.

An initialization process stores the relationship identifier and validation material and provides metadata used for communication under the relationship.

After initialization, the first validated communication transitions the relationship to an engaged state. Subsequent communications are governed by deterministic enforcement based on state and continuity rather than identity authentication or probabilistic risk algorithms.

The example system optionally further enables pre-delivery enforcement for communications selected to be transmitted through a relationship bound communication option. The communication may be submitted to a relationship enforcement module at its point of origin. Advantageously, communications that fail verification are rejected before delivery, thereby enhancing communication safety, while reducing utilization of network resources and computer resources of an intended recipient. Approved communications may be delivered via electronic messaging, emails, application user interfaces, automated agents, real time voice mechanisms, and/or the like.

Delegated trust enables a relationship to grant limited authority to additional devices or agents through derived validation material. Delegates may perform scoped actions but are prevented from modifying, assuming ownership of, and/or recovering the primary relationship. As described herein, delegated authority may be suspended or revoked independently.

Suspension temporarily restricts communication under a relationship. Suspension may occur in response to the system detection of continuity violations, invalid validation material, explicit instructions, and/or policy conditions. The system may enable suspended relationships to resume in response to restoration of continuity or policy criteria are met.

Revocation is final, wherein the system permanently invalidates validation material, terminating the relationship. Subsequent communications referencing the relationship are rejected by the system. The revocation of a relationship state between two peers may also revoke any sub-peer authority. However, optionally a sub-peer (delegate) may have authority under more than one relationship authority.

For example, a service provider vendor, such as an account management vendor or a marketing vendor, that sends statements or marketing communications to customers may have lost a contract with a first company, revoking their authority for that relationship (which was associated with a first RID). The vendor could however be the vendor for second company (associated with a second RID). Because the RIDs are different, the vendor only loses authority under the defunct contract associated with the first RID, without affecting the vendor's ability to send statements or marketing communications on behalf of the second company under the relationship authority for the second company (associated with a second RID). Revocation may optionally be applied to a specified relationship and is not applied to other relationships.

Certain aspects will now be described with reference to the figures. The illustrated processes may be executed using devices and systems described herein.

As discussed elsewhere herein and with reference to FIGS. 19-28, an example system implements a relationship-centric trust-governance framework that authenticates communications, enforces continuity, manages lifecycle transitions, and validates messages prior to delivery across multiple peers and service environments. Relationship records may be maintained in a relationship datastore and are operated on by state-transition logic, continuity-verification pipelines, and optional functional and delegated-trust extensions. The sequential and architectural behaviors are illustrated in FIGS. 19-28.

Figure 19:
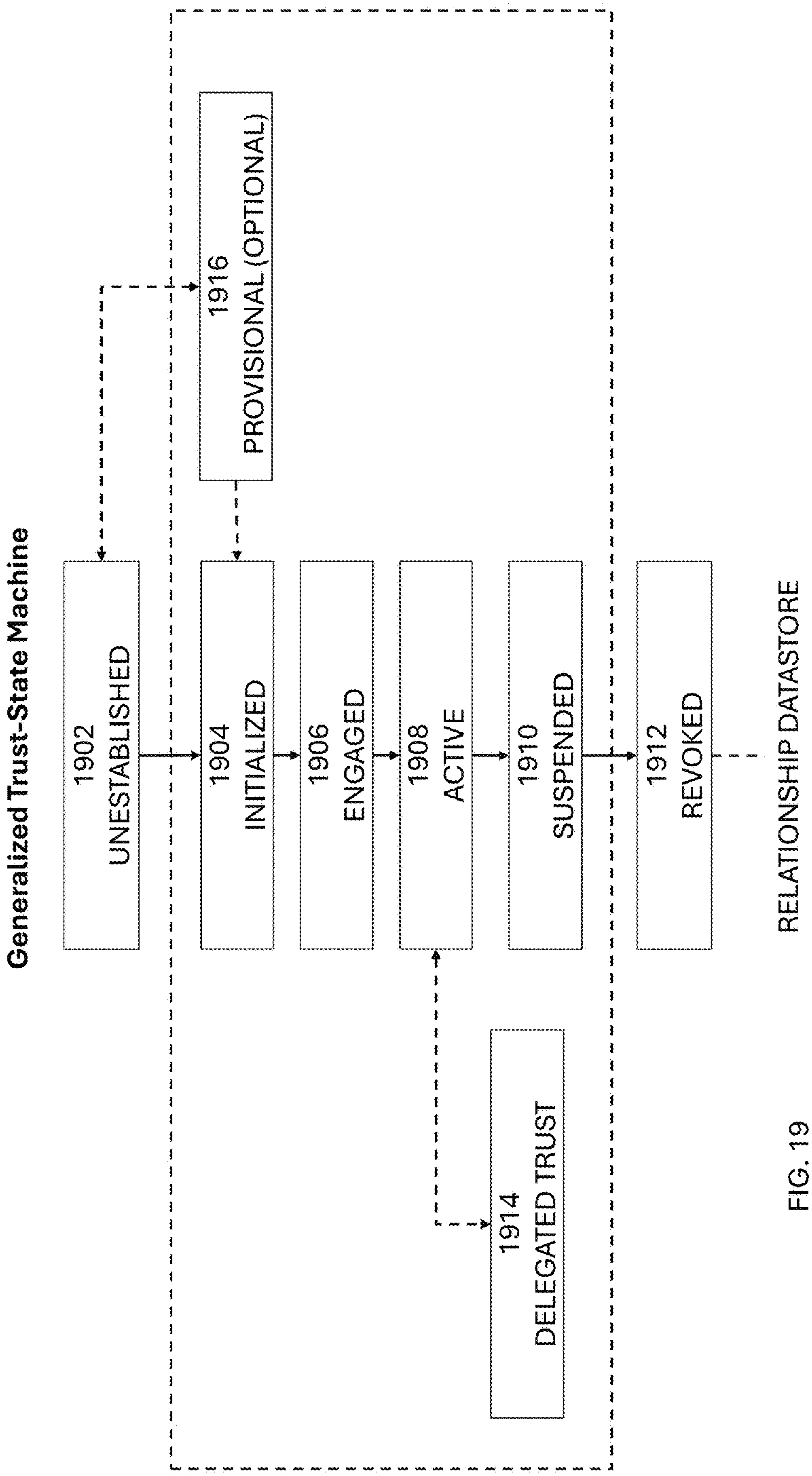
FIG. 19 illustrates an example relationship state model.

FIG. 19 illustrates an example relationship-state architecture implemented within a relationship-based communication and trust-validation system such as described herein, in which a plurality of discrete states are maintained for a given relationship record stored in a relationship datastore. In the illustrated embodiment, a relationship initially resides in an unestablished state 1902, representing a condition in which no relationship ID, validation material, or continuity metadata has yet been created. At this point the relationship is provisional 2016 (if the state architecture utilizes a provisional state). Upon receiving an initial communication or initialization request, and after generating a relationship identifier, assigning validation material, and logging an initialization event 1904, the system transitions the record into an engaged state 1906 following successful retrieval and verification of relationship data. From this state, continued validated interaction, including continuity checks and message verification, may cause the system to transition the record into an active state 1908, indicating that the relationship is functioning normally with full verification capabilities. If anomalous activity, elevated risk conditions, or policy-triggered constraints are detected, the relationship may enter a suspended state 1910, in which operations are restricted until remediation or verification input is received, although relationship metadata may be retained.

Optionally, a relationship may be further bound to an account or service function, which associates the relationship identifier with a service record and updates metadata accordingly.

A terminal revoked state 1912 represents a condition in which validation material has been invalidated and future communications are treated as unverified. Additionally, a delegated state 1914 may be used to indicate that validation authority or continuity responsibilities have been delegated to another peer or sub-entity. The referenced states may be maintained in association with the relationship datastore, which stores state transitions, validation material, continuity data, and/or trust-ledger updates supporting enforcement, verification, and lifecycle governance of each relationship record.

Figure 20:
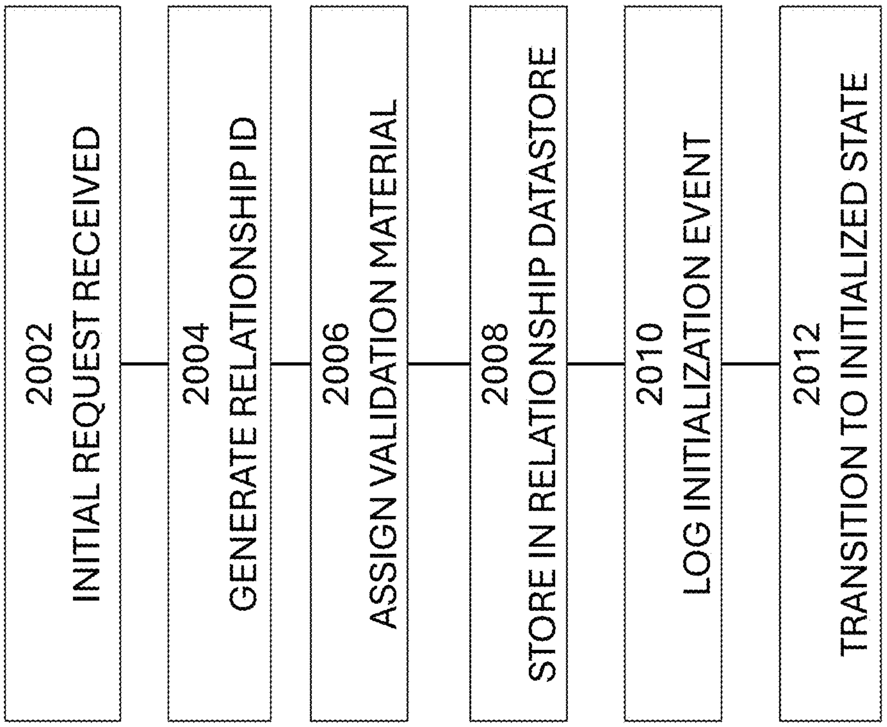
FIG. 20 illustrates an example relationship initialization process.

FIG. 20 illustrates an example initialization process in which a relationship is created and transitioned from an unestablished state to an initialized state. As similarly discussed elsewhere herein, identity may be utilized at bind-time for establishing a relationship. Once the relationship is established at the active state, run-time enforcement relies on relationship state and relationship-scoped artifacts, not identity attributes. For example, identity (or identity assurance) may be used to confirm the legitimate counterparties before a relationship is activated. The specific identity method may be policy-defined (e.g., brand-defined, context-defined, etc.). Initialization may utilize QR codes, NFC (Near Field Communication), a link, brand session, and/or the like.

At block 2002, initialization begins when an initial relationship request is received. At block 2004, the system generates a unique relationship id. At block 2006, validation material is assigned (e.g., cryptographic tokens, derived values, hardware protected artifacts, and/or other technical indicators suitable for communication verification). At block 2008, the new record is stored in the relationship datastore. At block 2010, an initialization event is logged in a trust ledger. At block 2012, completion of these operations transitions the relationship into an initialized, engaged state.

Figure 21:
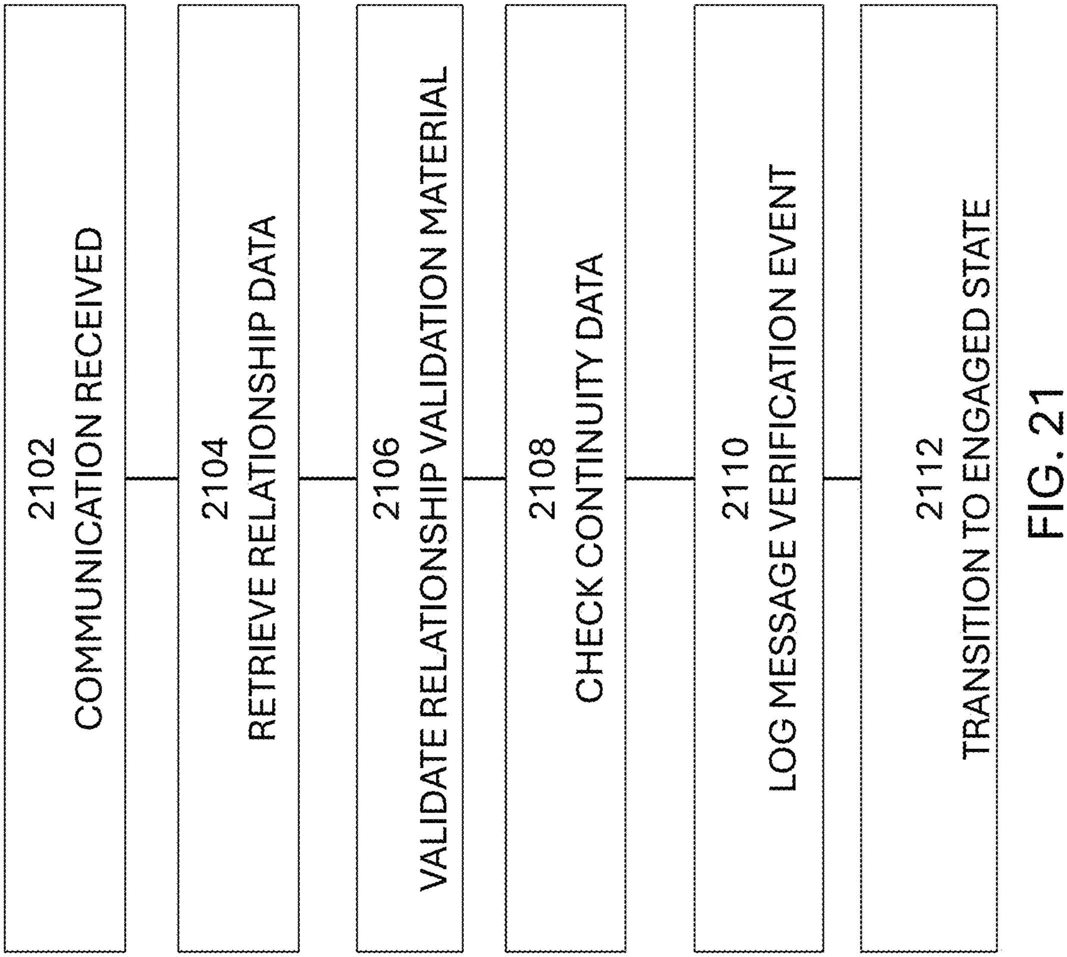
FIG. 21 illustrates an example engagement process.

Referring to FIG. 21, an example engagement process for incoming communications is illustrated. At block 2102, a communication is received. Upon receiving a communication, at block 2104, the process retrieves the corresponding relationship record. At block 2106, the previously assigned validation material is validated. At block 2108, as part of the validation process, the process checks continuity data such as counters or rolling values to determine if continuity is present. If validation succeeds, at block 2110, the system logs a message-verification event. At block 2112, the process enters or maintains the engaged state.

Figure 22:
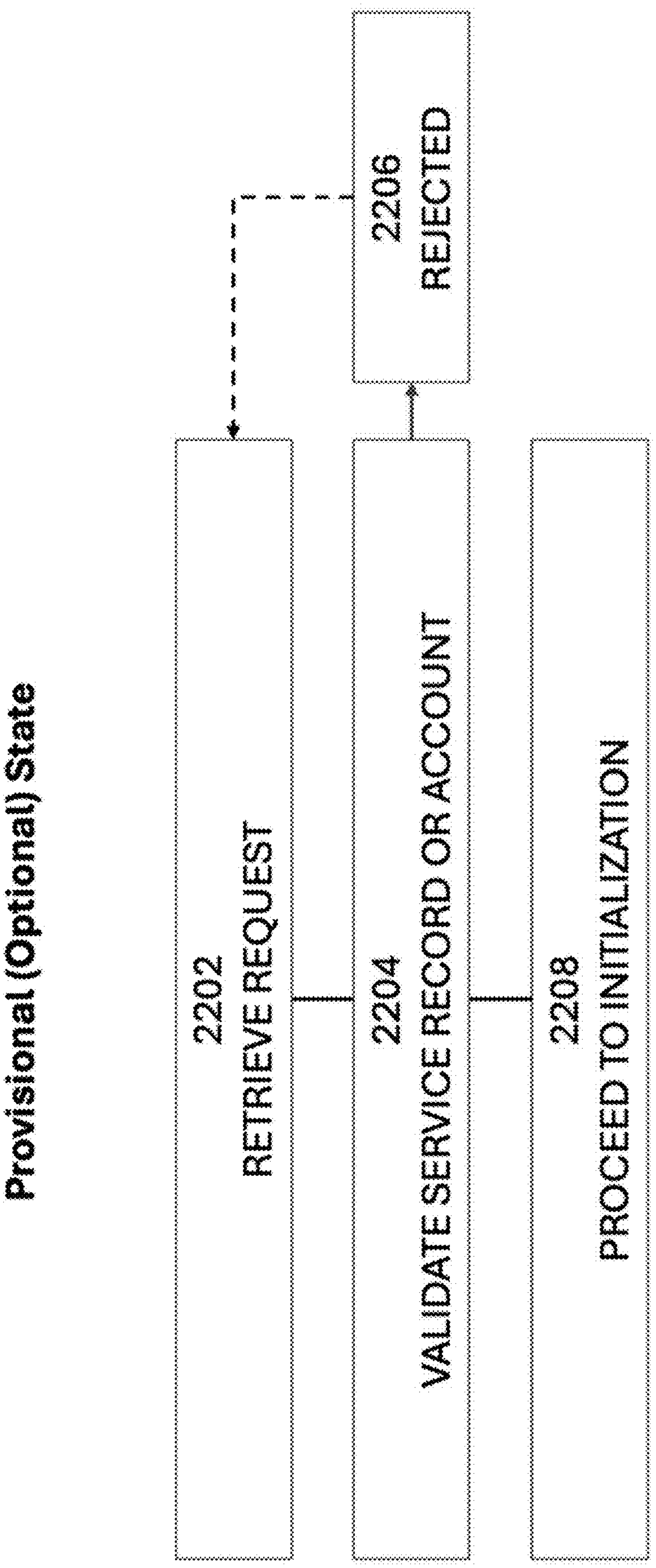
FIG. 22 illustrates an example provisional state process.

FIG. 22 illustrates an example provisional state process that may be employed during establishment of a relationship-based trust framework. In this example, at block 2202, a request to establish a trust relationship is retrieved by the system. Such a request may originate from a peer device, an application workflow, a service interaction, or an automated process seeking to initiate a governed communication relationship. Upon retrieval of the request, the process proceeds to block 2204, where a corresponding service record, account record, or contextual authorization artifact associated with the request is validated. This validation may include confirming that the referenced service, account, or workflow context satisfies one or more policy-defined criteria required for relationship establishment. If the validation fails, as determined at block 2206, the request is not advanced to relationship creation, and the process may return to block 2202 to await a subsequent request, a corrected request, or additional validation input. If, however, the service record or account is successfully validated, the process proceeds to block 2208, where initialization of the trust relationship is performed. During initialization, a relationship object may be created, a relationship identifier assigned, and relationship-scoped validation material generated and recorded, thereby transitioning the relationship out of the provisional state and enabling subsequent relationship-governed communication in accordance with the disclosed trust framework.

Figure 23:
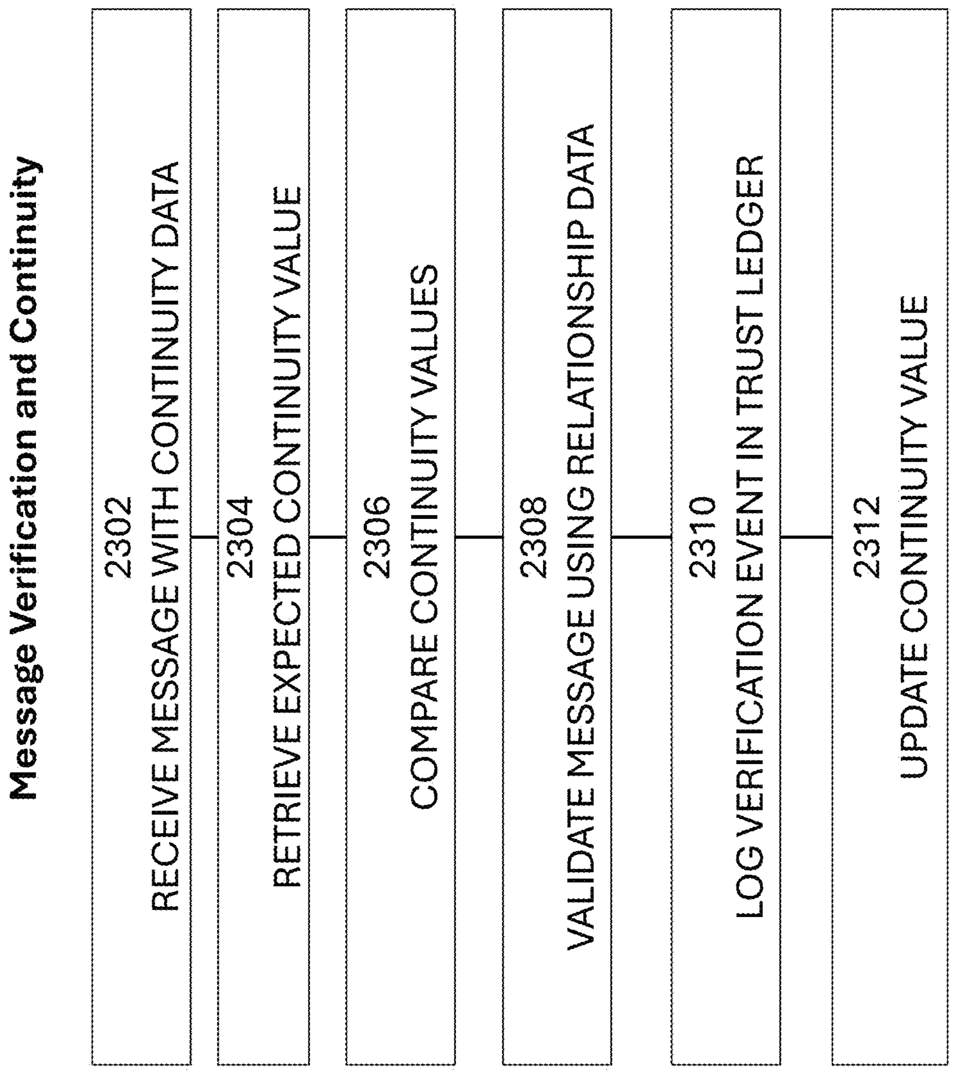
FIG. 23 illustrates an example message verification and continuity process.

Referring to FIG. 23, an example continuity-based message verification process is illustrated. At block 2302, for continuity enforcement, the process receives a message containing continuity data. At block 2304, the process retrieves the expected continuity value from the datastore. At block 2306, the process compares received versus expected values to detect replay, ordering faults, or tampering. When continuity passes, at block 2308, the process validates the message using relationship data, and at block 2310, logs a verification event in a trust ledger. At block 2312, the continuity value is updated to ensure forward-progress and sequence integrity.

Figure 24:
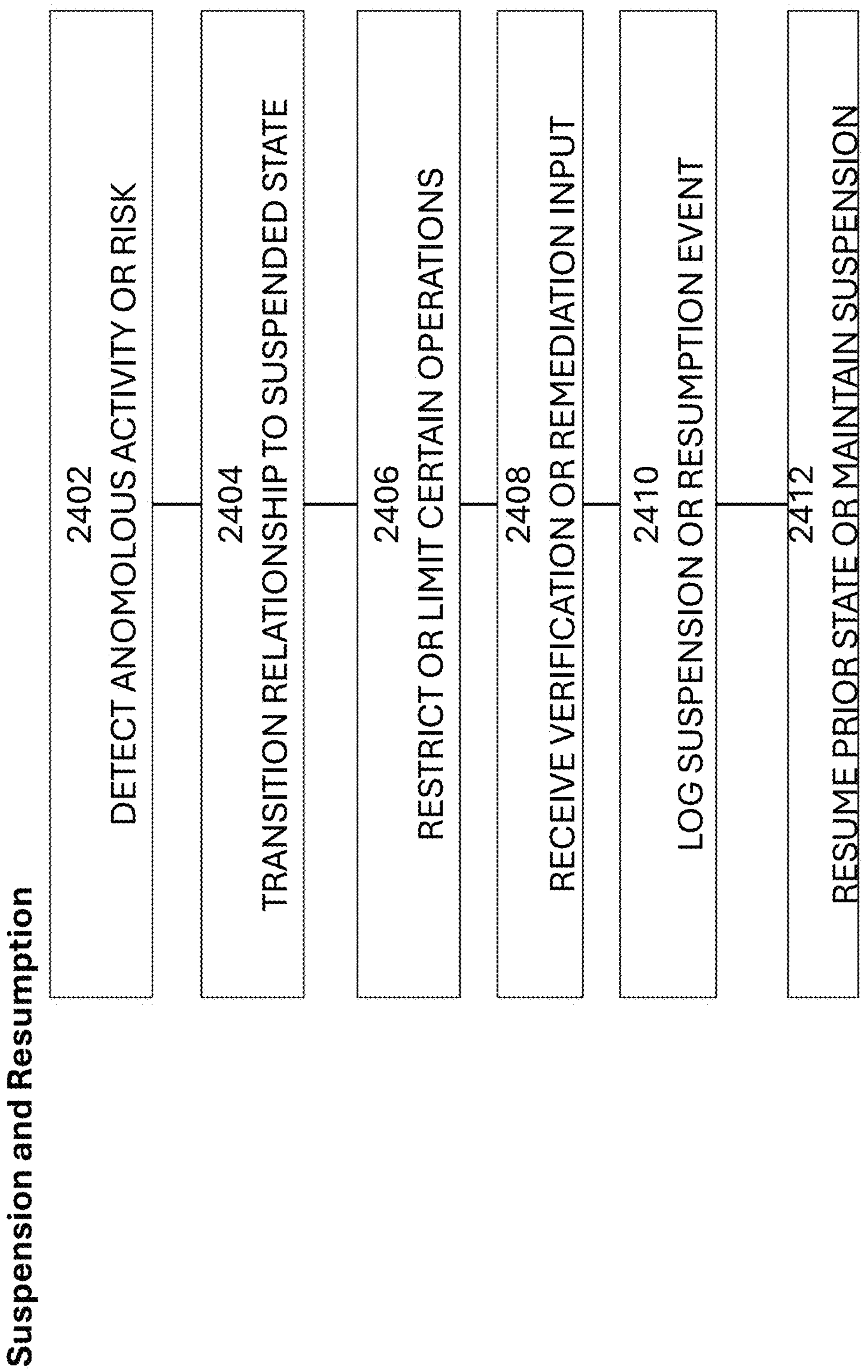
FIG. 24 illustrates an example suspension and resumption process.

FIG. 24 illustrates an example suspension and resumption flow in which relationship-governed communications are temporarily restricted based on policy-defined conditions or relationship state evaluations, and may later resume without terminating the underlying relationship. At block 2402, anomaly- or risk detection signals are detected. In response, at block 2404, the relationship is transitioned to a suspended state. At block 2406, operations are restricted or blocked in accordance with one or more policy rules. At block 2408, remediation or re-verification inputs are received. At block 2410, the process logs the suspension or resumption event. At block 2412, the process resumes the prior state or maintains suspension based on the evaluated risk.

Figure 25:
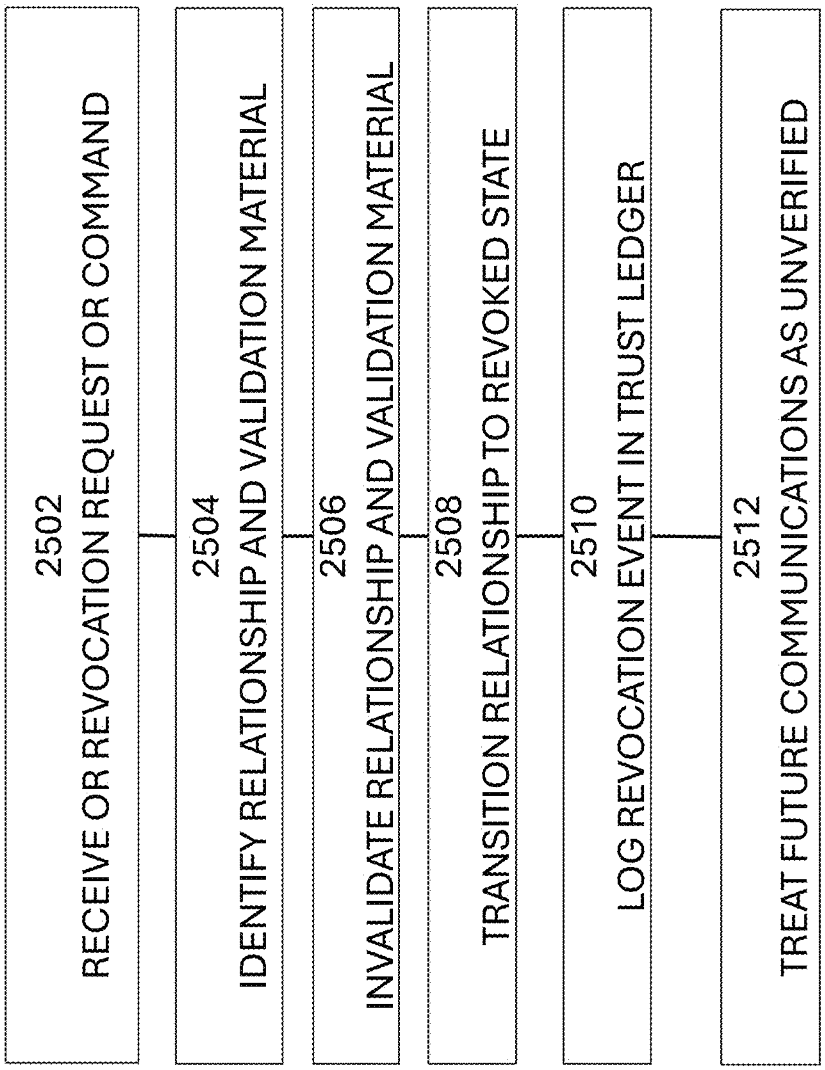
FIG. 25 illustrates an example revocation process.

FIG. 25 illustrates an example revocation flow in which a relationship is permanently terminated by invalidating relationship-scoped validation material, transitioning the relationship to a revoked state, recording a revocation event, and rejecting subsequent communications associated with the revoked relationship. It is understood the account-binding process may be similarly performed between peer and sub-peer delegates, except that a revocation revokes delegate authority, without affecting the underlying relationship.

At block 2502, revocation begins with a received revocation request or command. At block 2504, the process identifies the relationship and associated validation material and at block 2506, invalidates them. At block 2508, the process transitions the relationship record to a revoked state, and at block 2510, a revocation event is logged in the trust ledger. At block 2512, subsequent communications associated with the relationship are treated as unverified and are blocked.

Figure 26:
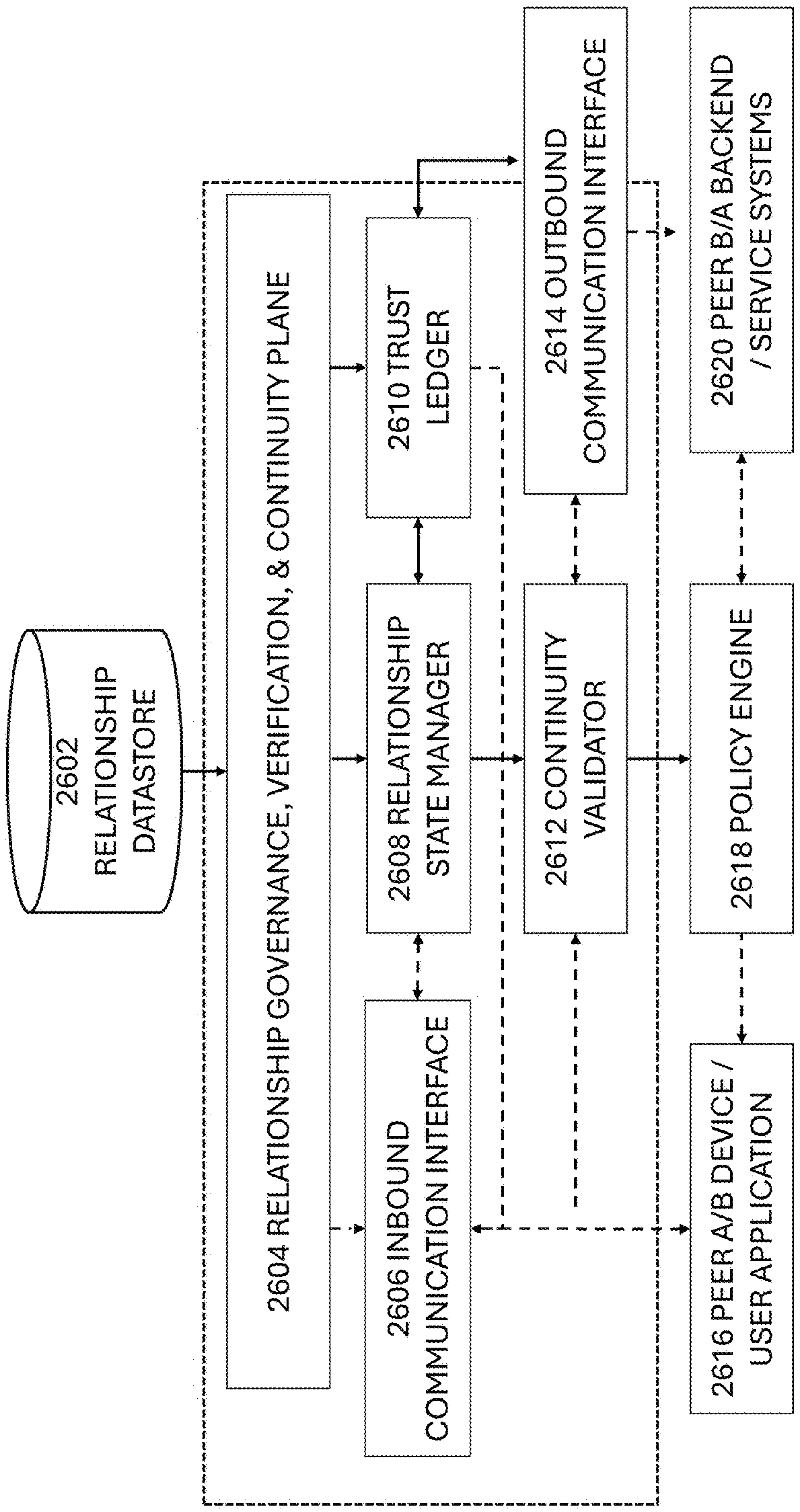
FIG. 26 illustrates an example system architecture for relationship-based communication governance, verification, and continuity enforcement.

FIG. 26 illustrates an example system architecture for relationship-based communication governance, verification, and continuity enforcement. The example architecture includes a relationship datastore 2602 and the data stored therein (e.g., state, continuity values, validation artifacts, and/or metadata) is accessed for relationship governance, verification, and continuity plane 2604 that orchestrates enforcement logic. For example, the continuity plane 2604 may comprise a system layer configured to enforce temporal and sequential correctness of communications governed by a relationship object by validating continuity indicators (e.g., rotating values, sequence counters, positional references, and/or freshness markers) against expected values stored in a trust ledger, thereby providing deterministic protection against replay, reordering, and tampering.

An inbound communication interface 2606 and outbound communication interface 2614 are configured to process transport handling. A relationship state manager 2608 is configured to govern relationship transitions as discussed herein. A cryptographically auditable, verifiable trust ledger 2610 such as discussed herein is provided that comprises event-driven records that store technical metadata associated with a given relationship object. A continuity validator 2612 is configured checking for continuity and for ordering and replay protection. A policy engine 2618 is configured as a rule-evaluation layer that decides how communications are handled, whether trust states change, and how continuity and delegation rules are enforced, forming the governance mechanism of the relationship-based security layer.

Peer devices (peer A/B device/user application 2616) and backend systems (peer B/A backend/service systems 2620) interact with these components to conduct verified communications subject to the rules executed by the policy engine 2618.

Figure 27:
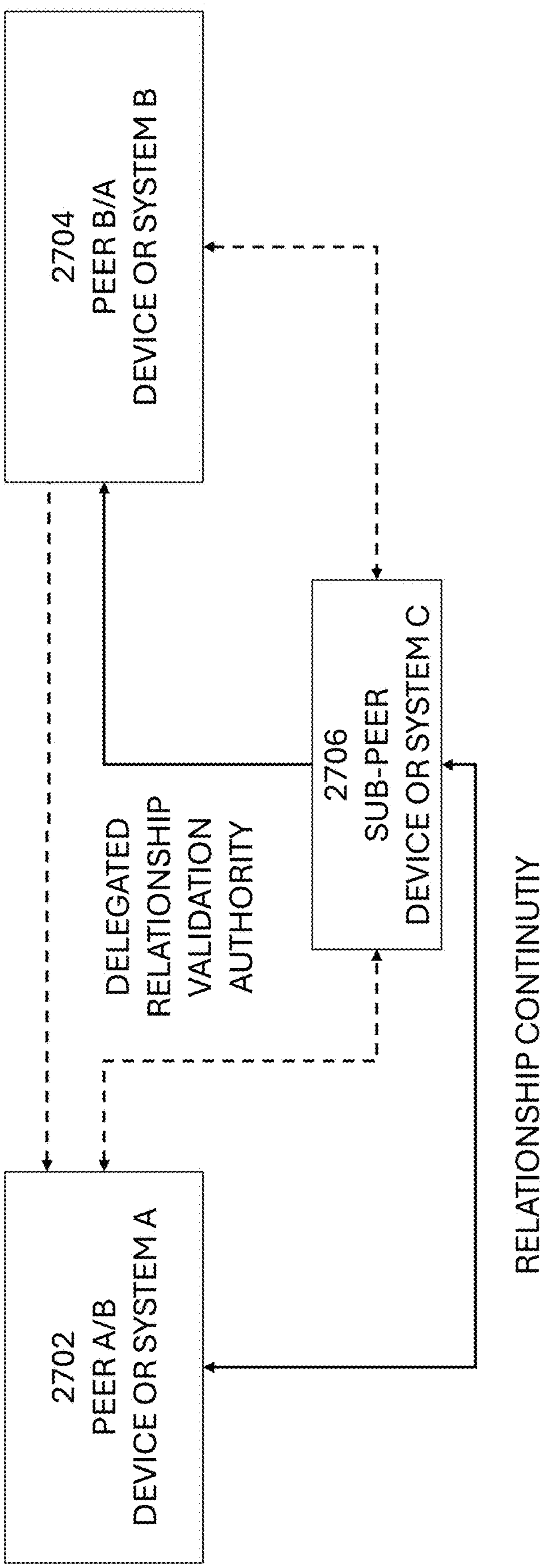
FIG. 27 illustrates an example delegated trust model.

FIG. 27 illustrates an example delegated trust model in which limited, derived authority associated with a relationship is granted to additional devices, processes, or agents without transferring ownership or control of the underlying relationship. A primary peer (device A 2702) may delegate certain validation authority to a sub-peer (device C 2706) while interacting with a brand or service backend brand/service (peer B 2704). The process maintains continuity and validation across primary and delegated paths, ensuring that delegated operations follow the same policy-controlled trust principles and continuity expectations as described herein.

Figure 28:
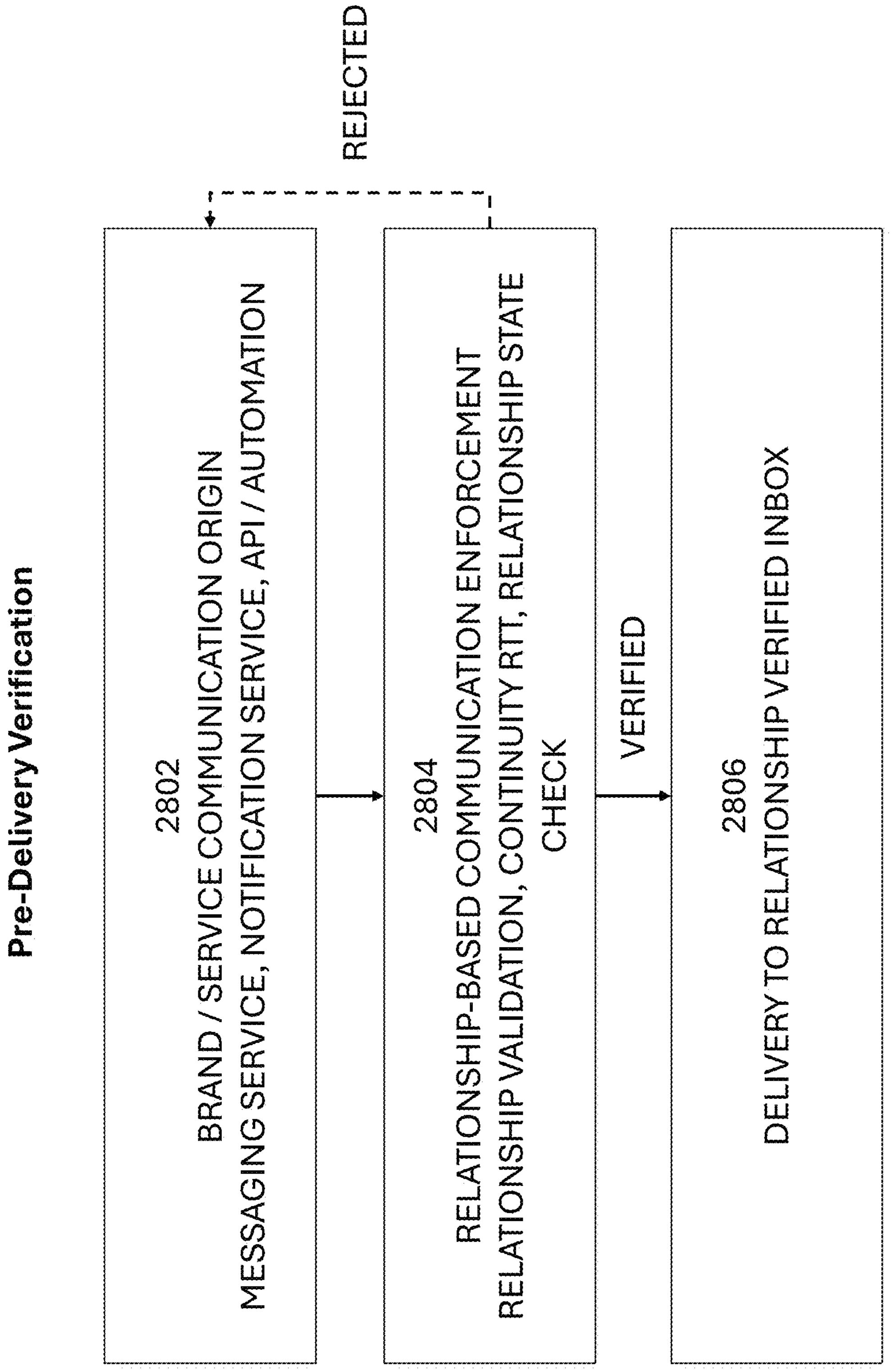
FIG. 28 illustrates an example pre-delivery communication verification.

Referring to FIG. 28, an example pre-delivery relationship-based verification process is illustrated in which communications selected for relationship-based delivery are submitted to a relationship-based enforcement system at the point of origin, prior to delivery or presentation. The figure depicts deterministic rejection of unverified communications before delivery and delivery of verified communications into a unified verified inbox, including real-time verification mechanisms for voice interactions. At block 2802, before delivery, communications originating from messaging, notification, or automation systems undergo relationship-based enforcement 2804, including state checks, relationship validation, and continuity verification. Messages that pass are delivered to a verified inbox or a real time trust channel 2806, while messages that fail may be rejected or logged for forensic review.

Thus, example systems and methods are disclosed for managing digital communications using a relationship based trust framework while reducing reliance on traditional identity and credential-based systems. A relationship object associated with a relationship identifier and relationship scoped validation material governs communication acceptance or rejection, optionally based on a structured relationship state model. Optionally, communications referencing the relationship identifier are evaluated deterministically and accepted or rejected prior to delivery. Optionally, continuity and trust events are recorded in a relationship scoped ledger. The disclosed systems and methods optionally enable delegation, suspension, and revocation. Optionally service binding is provided that enables workflow integration without converting the relationship into an identity account.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, biometrics, command line interfaces, and other suitable interfaces.

Further, processing of the various components of the illustrated systems can be distributed across multiple machines, networks, and other computing resources, or may comprise a standalone system. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including (e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Aspects are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor (e.g., comprising an arithmetic logic unit, storage registers, internal and external buses, etc.) of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, biometrics, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above description explicitly defines such terms. Accordingly, the actual scope of the invention encompasses not only the disclosed examples, but also all equivalent ways of practicing or implementing the invention.

What is claimed is:

1. A system for governing digital communications, comprising:
- a processing device comprising registers and arithmetic logic units;
- non-transitory computer readable storage medium storing computer-executable instructions that, in response to execution by the processing device, cause the processing device to perform operations, comprising:
  - establish a relationship object representing a trust relationship between communicating parties;
  - generate relationship-scoped validation material associated with the relationship object;
  - maintain a trust ledger configured to store event-driven, non-identity metadata associated with the relationship;
  - maintain a relationship state model defining a plurality of relationship states and permitted communication behavior associated with respective states; and
  - instantiate a communication validation component configured to:
    - receive, prior to delivery or presentation, a communication associated with the relationship object;
    - evaluate the communication using the relationship-scoped validation material and expected continuity data derived from the trust ledger; and
    - deterministically accept, reject, or restrict the communication based at least in part on the relationship state and continuity evaluation,
    - wherein communication handling is performed at run-time independently of identity authentication, shared secrets, or probabilistic threat scoring.

2. The system of claim 1, wherein the relationship object comprises a unique relationship identifier that does not encode, expose, or require personally identifying information for communication evaluation.

3. The system of claim 1, wherein the trust ledger stores non-identity metadata including one or more of: relationship initialization events, validated communication events, continuity updates, relationship state transitions, delegation actions, suspension events, or revocation events.

4. The system of claim 1, wherein continuity indicators comprise one or more of:
- rotating or tumbling values, incremented or derived sequence values, ledger-referenced positional indicators, time-based or epoch-based freshness markers, or hash- or checksum-based derived indicators.

5. The system of claim 1, wherein continuity indicators comprise a tumbling value generated according to a deterministic progression algorithm, and wherein the communication validation component is further configured to:
- derive an expected tumbling value from the relationship-scoped validation material and continuity metadata stored in the trust ledger;
- compare the expected tumbling value to a tumbling value included within or derived from the received communication; and
- update the trust ledger to store a next expected tumbling value upon successful validation,
- wherein deviations from the expected tumbling value cause the communication to be rejected or restricted prior to delivery or presentation, thereby preventing replay, reordering, or stale message injection.

6. The system of claim 1, wherein the communication validation component compares continuity indicators contained in or derived for the communication to expected values obtained from the trust ledger and accepts the communication when the continuity indicators conform and rejects or restricts the communication when the continuity indicators deviate.

7. The system of claim 1, wherein the relationship state model comprises at least an unestablished state, an initialized state, an engaged state, an active state, a delegated state, a suspended state, and a revoked state.

8. The system of claim 1, the operations further comprising deriving secondary validation material to authorize delegated communication authority for additional devices, agents, and/or third parties without transferring ownership of the relationship, the delegated communication authority being suspendable or revocable.

9. The system of claim 1, the operations further comprising transitioning the relationship into a suspended state in response to a continuity violation, invalid validation material, policy-defined threshold, and/or explicit suspension instructions, and restricting communications referencing the suspended relationship until resumption criteria are satisfied.

10. The system of claim 1, wherein revocation permanently invalidates relationship-scoped validation material, terminates continuity mechanisms for the relationship, and causes subsequent communications referencing the relationship to be rejected without further evaluation.

11. The system of claim 1, the operations further comprising validating, at a point of origin, communications selected for delivery through a relationship-bound communication option and deterministically rejecting communications that fail relationship-based evaluation prior to presentation.

12. A method for governing communications in a relationship based trust framework, comprising:

establishing a relationship object associated with a communicating party;

assigning relationship scoped validation material;

maintaining a trust ledger that records relationship events;

maintaining a relationship state corresponding to the relationship object;

receiving a communication associated with the relationship object;

validating the communication using the relationship validation material and continuity indicators derived from the trust ledger; and deterministically accepting, rejecting, or restricting the communication based on the relationship state and continuity evaluation, wherein the validating and accepting or rejecting are performed independently of global identity, or account credentials.

13. The method of claim 12, wherein assigning the relationship-validation material comprises generating a rotating or tumbling continuity value configured to provide replay resistance and sequencing integrity.

14. The method of claim 12, wherein the continuity indicators comprise a tumbling value generated according to a deterministic progression algorithm, and wherein validating the communication further comprises:

derive an expected tumbling value from relationship validation material and continuity metadata stored in the trust ledger;

compare the expected tumbling value to a tumbling value included within or derived from the received communication; and update the trust ledger to store a next expected tumbling value upon successful validation, wherein the tumbling value is configured to prevent replay, reordering, or stale message injection by ensuring that deviations from the expected value cause the communication to be rejected or restricted.

15. The method of claim 12, wherein validating the communication further comprises comparing a continuity indicator contained within the communication to an expected continuity value derived from the trust ledger.

16. The method of claim 12, wherein a first continuity indicator comprises a sequence counter that incrementally advances following a given validated communication.

17. The method of claim 12, wherein maintaining the trust ledger comprises recording initialization events, validated communication events, continuity updates, relationship state transitions, suspension events, and/or revocation events.

18. The method of claim 12, wherein the relationship state comprises an unestablished state, an initialized state, an engaged state, an active state, a delegated state, a suspended state, or a revoked state, and deterministically accepting or rejecting the communication includes applying behavior rules associated with a current state.

19. The method of claim 12, the method further comprising transitioning the relationship to a suspended state in response to detecting a continuity violation or invalid validation material.

20. The method of claim 12, the method further comprising resuming communication under the relationship in response to receiving remediation or re-verification input following a suspension event.

21. The method of claim 12, wherein deterministically rejecting the communication comprises rejecting the communication prior to delivery to a receiving device.

22. The method of claim 12, wherein validating the communication is performed independently of identity authentication, shared secrets, email addresses, phone numbers, or device identifiers.

23. The method of claim 12, the method further comprising deriving secondary validation material to authorize delegated communication authority for one or more delegate devices or agents.

24. The method of claim 12, wherein receiving the communication comprises receiving a communication originating from a messaging system, notification system, automated system, or real-time voice system for pre-delivery verification.

* * * * *